(12) United States Patent
Otaki et al.

(10) Patent No.: US 6,482,489 B1
(45) Date of Patent: Nov. 19, 2002

(54) HOLOGRAM LAMINATES

(75) Inventors: Hiroyuki Otaki, Tokyo-To (JP); Kenji Ueda, Tokyo-To (JP); Fumiko Noujima, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/422,094

(22) Filed: Oct. 20, 1999

(30) Foreign Application Priority Data

| Oct. 20, 1998 | (JP) | 10-298708 |
| Dec. 8, 1998 | (JP) | 10-349068 |
| Dec. 8, 1998 | (JP) | 10-349090 |
| Mar. 30, 1999 | (JP) | 11-090062 |
| Jul. 28, 1999 | (JP) | 11-214331 |

(51) Int. Cl.⁷ ............................. B42D 15/00; G03H 1/18
(52) U.S. Cl. .................... 428/40.1; 428/40.2; 428/41.8; 428/41.9; 428/42.1; 428/42.2; 428/42.3; 428/43; 428/195; 428/201; 428/202; 428/203
(58) Field of Search ................ 428/40.1, 40.2, 428/41.8, 41.9, 42.1, 43, 42.2, 42.3, 195, 201, 202, 203; 359/1, 2

(56) References Cited

U.S. PATENT DOCUMENTS 6,066,378 A * 5/2000 Morii .................... 428/40.1

FOREIGN PATENT DOCUMENTS

JP 11-85028 3/1999

\* cited by examiner

*Primary Examiner*—Nasser Ahmad
(74) *Attorney, Agent, or Firm*—Parkhurst & Wendel, L.L.P.

(57) ABSTRACT

There are provided a hologram laminate and a hologram label which do not involve any problem in the production process per se of forging preventive labels using a volume hologram, can provide a reliable process of the attainment of forgery preventive effect, and can make difficult to notice the signs of the forgery preventive processing. In applying a protective film 108 onto a hologram 107 through a second pressure-sensitive adhesive 109, the adhesive strength is partially varied. By virtue of this construction, upon separation of the protective film 108, the second pressure-sensitive adhesive 109 is partially left on the hologram 107, so that the fact of the separation can be found out. Likewise, the adhesive strength of a first pressure-sensitive adhesive 106 can be partially changed. Further, the adhesive strength of the first pressure-sensitive adhesive 106 is larger than 1% tensile strength of the hologram 107. This can realize a property such that, as soon as the separation of the hologram 107 is attempted, the hologram 107 is elongated and undergoes a color change.

54 Claims, 10 Drawing Sheets

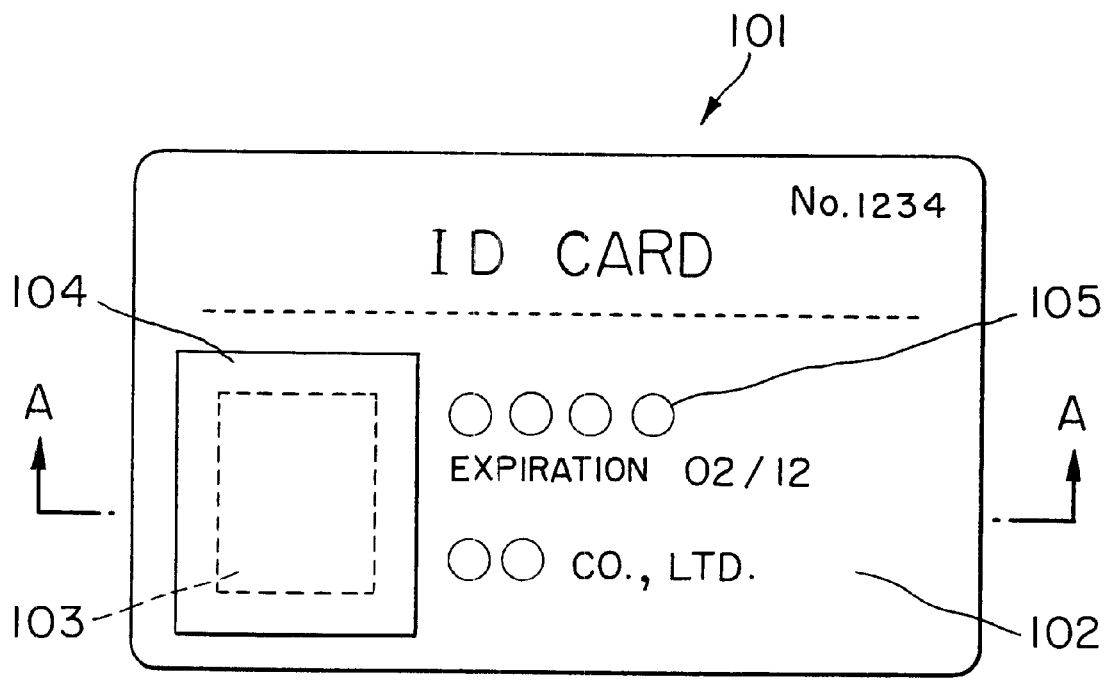
F I G. 1
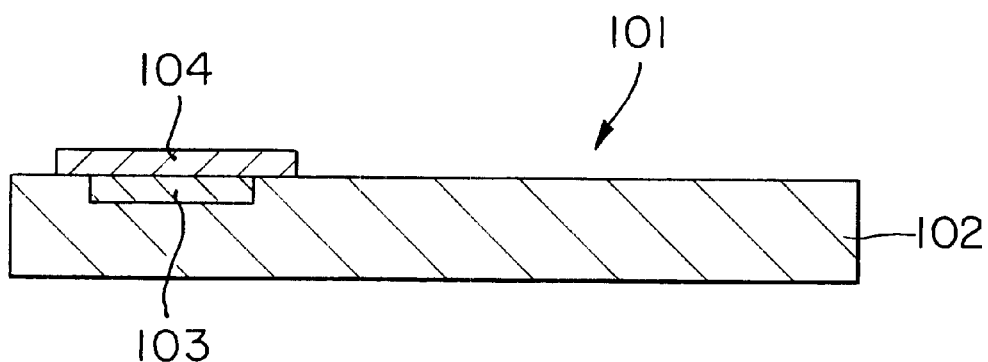
F I G. 2

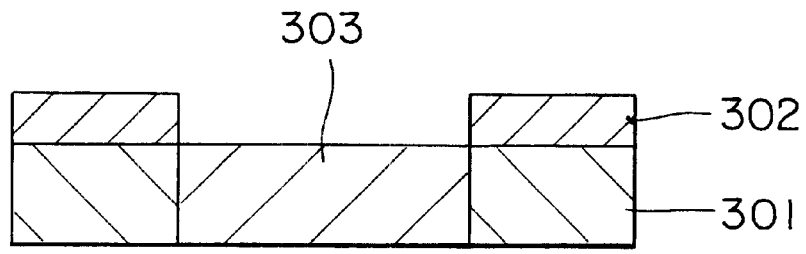
F I G. 11
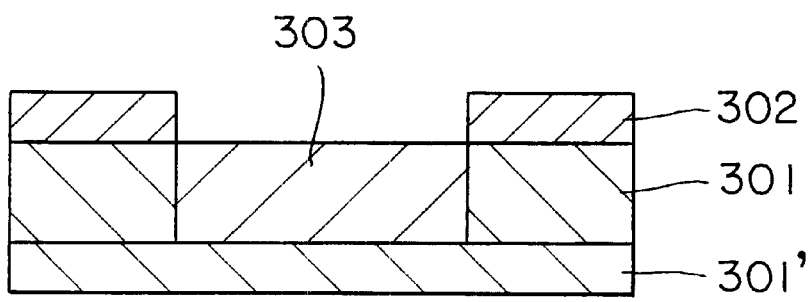
F I G. 12
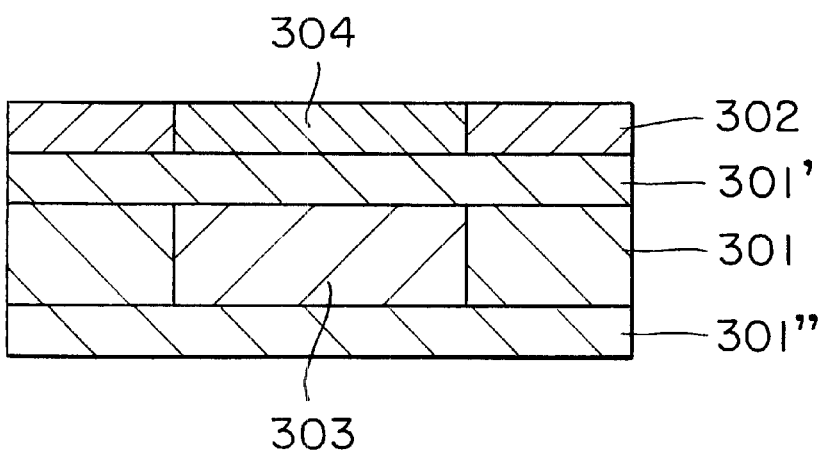
F I G. 13

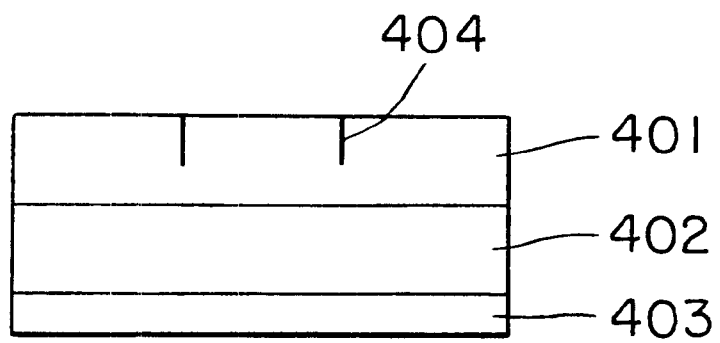
F I G. 21
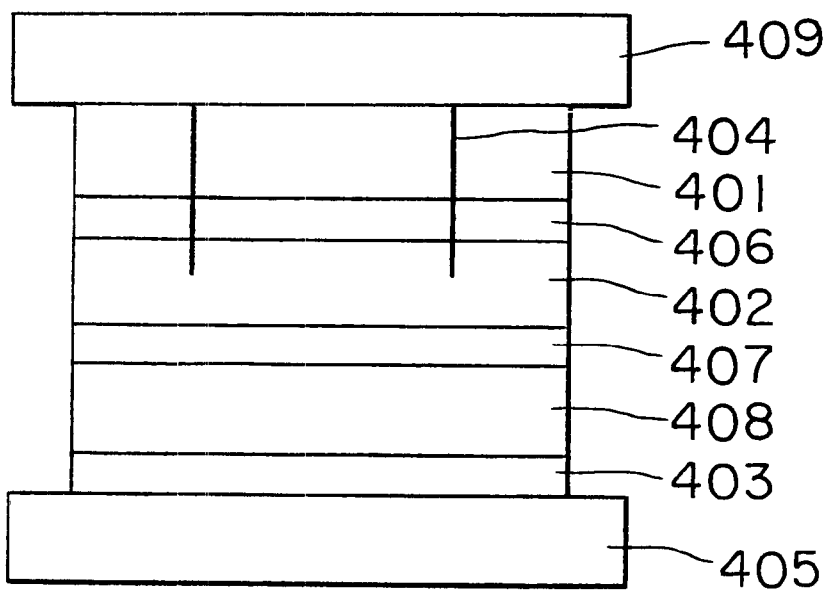
F I G. 22

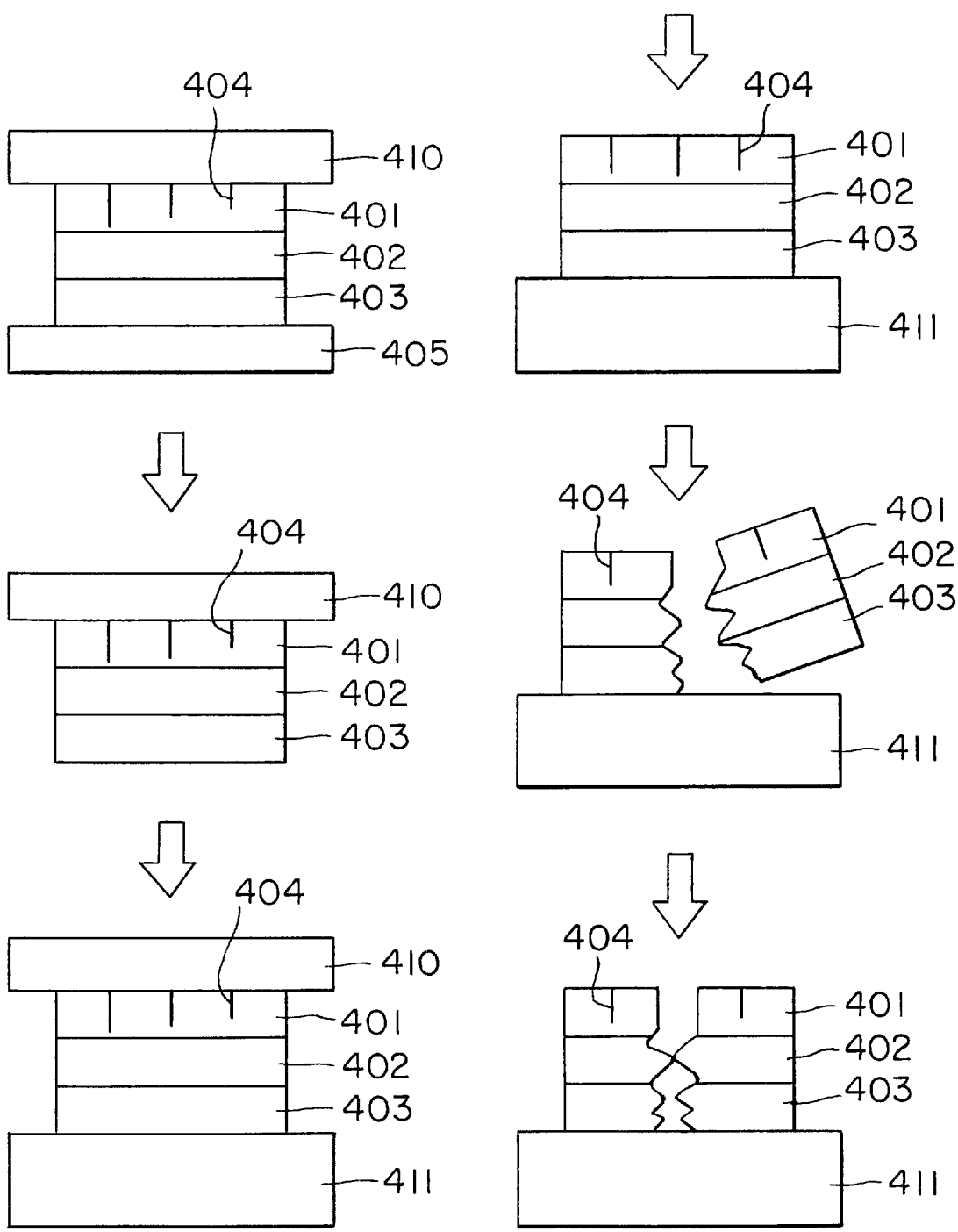
F I G. 23

HOLOGRAM LAMINATES

BACKGROUND OF THE INVENTION

The present invention relates to hologram laminates wherein, in order to verify that goods are genuine, a hologram label has been applied onto substrates, for example, those having monetary values, such as gold notes or securities, those as identification means for identifying the holder, such as identification cards or papers or credit cards, high-priced goods, such as high-grade watches, or gift boxes for these goods.

The present invention relates also to hologram application labels suitable for such applications.

The hologram laminates and the hologram labels according to the present invention having a special structure such that, when they are applied to a substrate followed by separation, a protective film as the surface film is separated while leaving a part of a pressure-sensitive adhesive on the hologram, or otherwise causes the separation of other layer while leaving a part of a pressure-sensitive adhesive on the separated portion, or when the exposed hologram is separated, the hologram is elongated, and that, as a result, in any event, a clear evidence of the separation is left.

The hologram per se is a product of photographic technology known for long, and has been formed by applying interference fringes, produced by interference of two laser beams, that is, reference light and object light containing information of an object, onto a photographic plate and conducting development to obtain the hologram as a silver salt photograph. In recent years, a relief hologram formed by applying interference fringes to a photosensitive resin and conducting development to record the interference fringes as concaves and convexes on the surface of the resin has become possible to be mass-duplicated by virtue of a duplication technique using a resin, and has become extensively used in various applications. In particular, since the hologram is difficult to produce, the hologram has been applied, as one of measures for the prevention of forgery, to various articles.

On the other hand, a volume hologram is among the holograms. In the volume hologram, interference fringes are three dimensionally recorded in the thicknesswise direction of a photosensitive resin. For example, the development of photosensitive resins and the development of peripheral technology in recent years have enabled mass production of the volume hologram. Although the volume hologram is duplicated using a photosensitive resin, the mechanical strength thereof is lower than that of the relief hologram formed of a fully cured resin. Further, in the application of the volume hologram to various applications, direct fabrication into a hologram layer is difficult. This restricts the prevention of forgery.

The volume hologram is difficult to produce as with the relief hologram. However, when a person obtains a genuine hologram, is separated from the hologram applied site, and is then applied to other article, since the hologram per se is genuine, it is very difficult to judge whether or not an illegal act has been made.

For this reason, various techniques have been proposed for preventing the replacement of the genuine hologram particularly in the latter hologram.

For example, Japanese Patent Laid-Open No. 86565/1998 describes a hologram laminate comprising a substrate and, applied onto the substrate, a hologram having thereon a transparent protective sheet, wherein distribution of adhesive strength is provided within the face of any one of an adhesive layer for adhering a transparent protective sheet to a hologram and an adhesive layer for adhering the hologram to a substrate and an attempt to conduct separation causes breaking of the hologram, thereby preventing the replacement of the hologram.

In order to create the distribution of the adhesive strength, two types of adhesives are used. This complicates working. Further, when different types of adhesives are used, there is a fear that the adoption of this technique becomes apparent from the appearance due to the difference in refractive index between these types of adhesives.

Japanese Patent Laid-Open No. 133552/1998 describes the same layer construction as described above, except that the tackiness of the pressure-sensitive adhesive layer between the protective film and the volume hologram layer is made lower than the tackiness of pressure-sensitive adhesive layer between the substrate and the volume hologram layer. In this technique, an attempt to conduct separation, a "peel line" is formed at a right angle to the direction of the separation, leaving an evidence of the separation.

Since, however, the peel line is not previously formed at a predetermined position but formed in the course of the separation, the state of the formation of the peel line varies depending upon, for example, the direction pulled and the force applied in the separation. Therefore, the certainty of the formation of the peel line is open to question.

Accordingly, it is an object of the first invention to provide a hologram laminate and a hologram label which has no problem in the production process thereof, has certainty in the process for attaining the forgery preventive effect, and can make it difficult to find out the evidence of the working for forgery preventive purposes.

In addition to use in display of three-dimensional images, measurement, optical elements and the like, the hologram, by virtue of the necessity of advanced techniques and specialty apparatus in the production of the hologram and the difficulty of forging the hologram, is often applied to materials for verifying that the holder is truly a qualified person, such as identification cards or papers, or to goods and the like which should be verified to be genuine.

For example, for some credit cards, a hologram is stacked onto the surface thereof to verify that the card has been prepared through prescribed procedures. Further, a hologram is formed on a part of the surface of gold notes having values similar to money, such as tickets for goods. Furthermore, a hologram is often applied onto the surface of goods, for example, the surface of the case for selling of high-grade watches and the surface of the cassette half of videotapes having a fear of unauthorized tapes being spread.

In all the above cases, when the hologram is illegally separated and is successfully diverted to other object, since the hologram per se is not a forged one, a credit card, which is not originally valid, is seen like a valid one. In this case, also in the case of forged gold notes or goods, erroneous assumption of the forged notes or goods as genuine notes or goods are likely to occur.

These adherends, onto which the hologram is applied, have respective values. Gold notes and goods usually have economical values within the face value or the price of the genuine goods. On the other hand, since credit cards guarantee credit per se, in some cases, there is a fear of a vast sum of money being lost. Therefore, the prevention of the forgery of the credit card is of great social significance.

In the credit card, in addition to the hologram, a photograph of the face or an autograph of the holder is provided on the surface of the card from the viewpoint of ensuring the security. If the hologram is integral with and inseparable from the credit card, it is difficult to conduct forgery. In fact, however, unfortunately, it is not impossible to separate the hologram from the credit card although this separation is difficult.

Therefore, a person obtains an unused credit card, conducts necessary working, and applies a hologram separated from a properly published credit card onto the worked credit card, the forged credit card apparently should be regarded as a genuine one.

Accordingly, it is an object of the second invention to provide a hologram laminate, having high forgery preventive properties, wherein, in objects typified by credit cards and the like, for each object, for example, for each card, inherent information has been made inseparable from the hologram, and a process for producing the same.

As described above, for some credit cards, a hologram is stacked onto a photograph of the face or an autograph provided on the surface of the credit card. In this case, however, when the hologram is illegally separated and is successfully diverted to other object, since the hologram per se is not a forged one, a credit card, which is not originally valid, is seen like a valid one. In this case, also in the case of forged gold notes or goods, erroneous assumption of the forged notes or goods as genuine notes or goods are likely to occur.

In the forgery of an unused substrate for credit cards, since any forgery preventive means, such as watermark in paper money, is not used in the substrate for credit cards, the outside of the substrate can be duplicated by the photomechanical process.

Likewise, for various certificates, securities, stock certificates, gold notes and the like, a ground tint or the like is printed on papers to prevent forgery. The forgery, however, is not impossible. Although the judgment of the forgery is possible, magnification or a special technique has often been required for the judgment.

Forgery of these papers incurs a loss corresponding to the preparation cost. In addition, the economical loss caused by the use of the forged papers is huge. Therefore, taking measures to prevent the forgery is of high social significance.

Accordingly, it is an object of the third invention to provide an improved product wherein, regarding not only credit cards or the like but also various articles in a sheet form or articles in other forms, for example, patterns, such as ground tints or figures, or coloration formed mainly by printing and the like cannot be easily duplicated by mere copying of the shape and color tone.

In recent years, the volume hologram, by virtue of the difficulty of forging the hologram per se, has become used as the so-called security label, for example, in the application onto identification cards or papers or as breaking seal of confidential documents and the like, and in the application onto CD. In this hologram, however, there is a fear of the hologram-applied medium being forged in such a manner that a hologram laminate is separated from the hologram-applied medium and is again applied.

In order to prevent the forgery of the hologram-applied medium by the re-application, a construction has been used wherein, upon the separation of a hologram laminate, the hologram laminate is broken and even the re-application of the hologram laminate cannot reproduce the original state before the separation. Such hologram laminates include a type wherein, after the application of the hologram laminate, an attempt to separate the hologram laminate causes the separation of the substrate alone and a type wherein, after the application of the hologram laminate, an attempt to separate the hologram laminate causes an adhesive to be partially left. Leaving of a part of the hologram laminate poses a problem in applications where, after the use of a label for the judgment on whether the object is a genuine one or a forged one, the label is removed.

Japanese Patent Laid-Open Nos. 86565/1998 and 153944/1998 and the like describe a method wherein the dynamical properties of the volume hologram layer and the pressure-sensitive adhesive layer are optimized so that an attempt to separate a hologram laminate causes breaking of the hologram layer, and a method wherein distribution is provided in the peel strength of the pressure-sensitive adhesive so that an attempt to separate a hologram laminate causes breaking of the hologram layer. In the method wherein the hologram-applied medium is separated, in some cases, the hologram laminate can be separated without breaking the hologram layer. Therefore, the forgery preventive effect is not perfect, and a higher level of security has been demanded in the art. Further, in this hologram laminate, the forgery preventive effect by the breaking of the hologram layer varies depending upon the adhesion to media, on which the hologram laminate is applied.

Accordingly, it is an object of the fourth invention to provide a volume hologram laminate and a label for the preparation of a volume hologram laminate which, upon the separation of the hologram laminate from the hologram-applied medium, can surely cause breaking of the hologram layer and, at the same time, enables the hologram laminate in its broken part left on the medium to be easily removed from the application medium, such as an identification card or paper, and, in addition, can be suitably used for application media having various adhesive properties.

DISCLOSURE OF THE INVENTION

First Invention

According to the first invention, in the application of a hologram onto an object, the adhesive strength between the protective film and the pressure-sensitive adhesive in contact with the protective film is partially differentiated. In this constitution, an attempt to remove the protective film causes a part of the pressure-sensitive adhesive to be disadvantageously left on the hologram, leaving an evidence for the separation of the hologram. Further, according to the present invention, preferably, the adhesive strength between the hologram and the substrate is brought to a value larger than 1% tensile strength of the hologram. In this constitution, an attempt to separate the hologram causes the hologram to be elongated, leaving an evidence for the separation of the hologram.

The first embodiment of the first invention relates to a hologram laminate comprising: a substrate; a hologram layer provided on the substrate through a first pressure-sensitive adhesive layer; and a transparent film provided on the hologram layer through a second pressure-sensitive adhesive layer, the adhesive strength between the substrate and the hologram layer being larger than the adhesive strength between the hologram layer and the transparent film, the second pressure-sensitive adhesive layer having a first portion and a second portion, the first portion having an adhesive property such that the adhesive strength between the first portion and the transparent film is larger than the adhesive strength between the first portion and the hologram layer and, hence, when the transparent film is peeled off, the first portion is left on the transparent film side, the second portion having an adhesive property such that the adhesive strength between the second portion and the transparent film is smaller than the adhesive strength between the second portion and the hologram layer and, hence, when the transparent film is peeled off, the second portion is left on the hologram layer.

The second embodiment of the first invention relates to a hologram laminate wherein, in the first embodiment, a layer for lowering the adhesive strength between the transparent film and the second pressure-sensitive adhesive layer is partially provided between the transparent film and the second pressure-sensitive adhesive layer.

The third embodiment of the first invention relates to a hologram laminate wherein, in the first embodiment, a layer for enhancing the adhesive strength between the transparent film and the second pressure-sensitive adhesive layer is partially provided between the transparent film and the second pressure-sensitive adhesive layer.

The fourth embodiment of the first invention relates to a hologram laminate wherein, in any one of the first to third embodiments, the adhesive strength between the hologram layer and the substrate is larger than 1% tensile strength of the hologram.

The fifth embodiment of the first invention relates to a hologram label comprising a first pressure-sensitive adhesive layer as the lowermost layer, a hologram layer, a second pressure-sensitive adhesive layer, and a transparent film as the uppermost layer stacked in that order, the second pressure-sensitive adhesive layer having a first portion and a second portion, the first portion having an adhesive property such that the adhesive strength between the first portion and the transparent film is larger than the adhesive strength between the first portion and the hologram layer and, hence, when the transparent film is peeled off, the first portion is left on the transparent film side, the second portion having an adhesive property such that the adhesive strength between the second portion and the transparent film is smaller than the adhesive strength between the second portion and the hologram layer and, hence, when the transparent film is peeled off, the second portion is left on the hologram layer.

The sixth embodiment of the first invention relates to a hologram label wherein, in the fifth embodiment, a layer for lowering the adhesive strength between the second pressure-sensitive adhesive layer and the transparent film is partially provided between the second pressure-sensitive adhesive layer and the transparent film.

The seventh embodiment of the first invention relates to a hologram label wherein, in the fifth embodiment, a layer for enhancing the adhesive strength between the second pressure-sensitive adhesive layer and the transparent film is partially provided between the second pressure-sensitive adhesive layer and the transparent film.

The eighth embodiment of the first invention relates to a hologram label wherein, in any one of the fifth to seventh embodiments, the adhesive strength between the hologram layer and the substrate is larger than 1% tensile strength of the hologram layer.

The ninth embodiment of the first invention relates to a hologram label wherein, in any one of the fifth to eighth embodiments, a release sheet is additionally stacked on the underside of the first pressure-sensitive adhesive layer.

The tenth embodiment of the first invention relates to a hologram laminate comprising: a substrate; and, provided on the substrate in the following order, a hologram layer stacked on the substrate through a first pressure-sensitive adhesive layer and a first transparent film stacked on the hologram layer through a second pressure-sensitive adhesive layer provided on the underside of the transparent film, and a second transparent film stacked on the hologram layer through a third pressure-sensitive adhesive layer, the adhesive strength between the substrate and the first transparent film being larger than the adhesive strength between the hologram layer and the second transparent film, the third pressure-sensitive adhesive layer having a first portion and a second portion, the first portion having an adhesive property such that the adhesive strength between the first portion and the second transparent film is larger than the adhesive strength between the first portion and the hologram layer and, hence, when the second transparent film is peeled off, the first portion is left on the second transparent film side, the second portion having an adhesive property such that the adhesive strength between the second portion and the second transparent film is smaller than the adhesive strength between the second portion and the hologram layer and, hence, when the second transparent film is peeled off, the second portion is left on the hologram layer.

The eleventh embodiment of the first invention relates to a hologram laminate wherein, in the tenth embodiment, a layer for lowering the adhesive strength between the second transparent film and the third pressure-sensitive adhesive layer is partially provided between the second transparent film and the third pressure-sensitive adhesive layer.

The twelfth embodiment of the first invention relates to a hologram laminate wherein, in the tenth embodiment, a layer for enhancing the adhesive strength between the second transparent film and the third pressure-sensitive adhesive layer is partially provided between the second transparent film and the third pressure-sensitive adhesive layer.

The thirteenth embodiment of the first invention relates to a hologram laminate wherein, in any one of the tenth to twelfth embodiments, the adhesive strength between the first transparent film and the substrate is larger than 1% tensile strength of the hologram.

The fourteenth embodiment of the first invention relates to a hologram label comprising a first pressure-sensitive adhesive layer as the lowermost layer, a first transparent film, a second pressure-sensitive adhesive layer, a hologram layer, a third pressure-sensitive adhesive layer, and a second transparent film as the uppermost layer stacked in that order on top of one another, the adhesive strength between the substrate and the first transparent film being larger than the adhesive strength between the hologram layer and the second transparent film, the third pressure-sensitive adhesive layer having a first portion and a second portion, the first portion having an adhesive property such that the adhesive strength between the first portion and the second transparent film is larger than the adhesive strength between the first portion and the hologram layer and, hence, when the second transparent film is peeled off, the first portion is left on the second transparent film side, the second portion having an adhesive property such that the adhesive strength between the second portion and the second. transparent film is smaller than the adhesive strength between the second portion and the hologram layer and, hence, when the second transparent film is peeled off, the second portion is left on the hologram layer.

The fifteenth embodiment of the first invention relates to a hologram label wherein, in the fourteenth embodiment, a layer for lowering the adhesive strength between the third pressure-sensitive adhesive layer and the second transparent film is partially provided between the third pressure-sensitive adhesive layer and the second transparent film.

The sixteenth embodiment of the first invention relates to a hologram label wherein, in the fourteenth embodiment, a layer for enhancing the adhesive strength between the third pressure-sensitive adhesive layer and the second transparent film is partially provided between the third pressure-sensitive adhesive layer and the second transparent film.

The seventeenth embodiment of the first invention relates to a hologram label wherein, in any one of the fourteenth to sixteenth embodiments, the adhesive strength between the first transparent film and the substrate is larger than 1% tensile strength of the hologram layer.

The eighteenth embodiment of the first invention relates to a hologram label wherein, in any one of the fourteenth to seventeenth embodiments, a release sheet is additionally stacked on the underside of the first pressure-sensitive adhesive layer.

The nineteenth embodiment of the first invention relates to a hologram laminate comprising: a substrate; a hologram layer stacked on the substrate through a first pressure-sensitive adhesive layer; and a transparent film stacked on the hologram layer through a second pressure-sensitive adhesive layer, the adhesive strength between the substrate and the hologram layer being smaller than the adhesive strength between the hologram layer and the transparent film, the first pressure-sensitive adhesive layer having a first portion and a second portion, the first portion having an adhesive property such that the adhesive strength between the first portion and the hologram layer is larger than the adhesive strength between the first portion and the substrate and, hence, when the hologram layer is separated from the substrate, the first portion is left on the hologram layer side, the second portion having an adhesive property such that the adhesive strength between the second portion and the hologram layer is smaller than the adhesive strength between the second portion and the substrate and, hence, when the hologram layer is separated from the substrate, the second portion is left on the substrate.

The twentieth embodiment of the first invention relates to a hologram laminate comprising: a substrate; a hologram layer stacked on the substrate through a first pressure-sensitive adhesive layer; and a transparent film stacked on the hologram layer through a second pressure-sensitive adhesive layer, the adhesive strength between the substrate and the hologram layer being larger or smaller than the adhesive strength between the hologram layer and the transparent film, both the first and second pressure-sensitive adhesive layers having a portion which, at the time of separation, is left on the overlying layer side and a portion which, at the time of separation, is left on the underlying layer side.

The twenty-first embodiment of the first invention relates to a hologram label comprising a first pressure-sensitive adhesive layer as the lowermost layer, a hologram layer, a second pressure-sensitive adhesive layer, and a transparent film as the uppermost layer stacked in that order on top of one another, the first pressure-sensitive adhesive layer having a first portion and a second portion, the first portion having an adhesive property such that the adhesive strength between the first portion and the hologram layer is larger and, hence, when the hologram layer is peeled off, the first portion is left on the hologram layer side, the second portion having an adhesive property such that the adhesive strength between the second portion and the hologram layer is smaller.

The twenty-second embodiment of the first invention relates to a hologram laminate comprising: a substrate; a hologram layer stacked on the substrate through a first pressure-sensitive adhesive layer; a first transparent film stacked on the underside of the hologram layer through a second pressure-sensitive adhesive layer; and a second transparent film stacked on the hologram layer through a third pressure-sensitive adhesive layer, the adhesive strength between the substrate and the first transparent film being smaller than the adhesive strength between the hologram layer and the second transparent film, the first pressure-sensitive adhesive layer having a first portion and a second portion, the first portion having an adhesive property such that the adhesive strength between the first portion and the first transparent film is larger than the adhesive strength between the first portion and the substrate and, hence, when the first transparent film is peeled off, the first portion is left on the first transparent film side, the second portion having an adhesive property such that the adhesive strength between the second portion and the first transparent film is smaller than the adhesive strength between the second portion and the substrate and, hence, when the first transparent film is peeled off, the second portion is left on the substrate.

The twenty-third embodiment of the first invention relates to a hologram label comprising a first pressure-sensitive adhesive layer as the lowermost layer, a first transparent film, a second pressure-sensitive adhesive layer, a hologram layer, a third pressure-sensitive adhesive layer, and a second transparent film as the uppermost layer stacked in that order on top of one another, the adhesive strength between the substrate and the first transparent film being smaller than the adhesive strength between the hologram layer and the second transparent film, the first pressure-sensitive adhesive layer having a first portion and a second portion, the first portion having an adhesive property such that the adhesive strength between the first portion and the first transparent film is larger and, hence, when the first transparent film is peeled off, the first portion is left on the first transparent film side, the second portion having an adhesive property such that the adhesive strength between the second portion and the second transparent film is smaller.

The twenty-fourth embodiment of the first invention relates to a hologram laminate comprising: a substrate; a hologram layer stacked on the substrate through a first pressure-sensitive adhesive layer; a first transparent film stacked on the underside of the hologram layer through a second pressure-sensitive adhesive layer; and a second transparent film stacked on the hologram layer through a third pressure-sensitive adhesive layer, the first to third pressure-sensitive adhesive layers having an adhesive property such that, for each of the first to third pressure-sensitive adhesive layers, the adhesive strength between the pressure-sensitive adhesive layer and a layer overlying the pressure-sensitive adhesive layer is different from the adhesive strength between the pressure-sensitive adhesive layer and a layer underlying the pressure-sensitive adhesive layer and each of the first to third pressure-sensitive adhesive layers has a portion which, at the time of separation in the pressure-sensitive adhesive layer, is left on the side of a layer overlying the pressure-sensitive adhesive layer and a portion which, at the time of separation in the pressure-sensitive adhesive layer, is left on a layer underlying the pressure-sensitive adhesive layer.

The twenty-fifth embodiment of the first invention relates to a hologram label comprising a first pressure-sensitive adhesive layer as the lowermost layer, a first transparent film, a second pressure-sensitive adhesive layer, a hologram layer, a third pressure-sensitive adhesive layer, and a second transparent film as the uppermost layer stacked in that order on top of one another, the first to third pressure-sensitive adhesive layers having different adhesive strengths and each having a portion which, at the time of separation in the pressure-sensitive adhesive layer, is left on the side of a layer overlying the pressure-sensitive adhesive layer and a portion which, at the time of separation in the pressure-sensitive adhesive layer, is not left on the side of the layer overlying the pressure-sensitive adhesive layer.

Second Invention

According to the second invention, there is provided a highly forgery-preventive hologram laminate, for use in objects typified by credit cards, wherein, for each object, for example, for one card, inherent information has been made unseparable from the hologram, and a process for producing the same.

The first embodiment of the second invention relates to a hologram laminate comprising at least a volume hologram layer, an information-recorded transparent film, and an adherend substrate stacked in that order on top of one another from the outermost surface side.

The second embodiment of the second invention relates to a hologram laminate wherein, in the above embodiment, a transparent pressure-sensitive adhesive layer is stacked between the volume hologram layer and the information-recorded transparent film and/or between the information-recorded transparent film and the adherend substrate.

The third embodiment of the second invention relates to a hologram laminate wherein, in the above embodiment, a transparent protective film is stacked on the surface of the volume hologram layer.

The fourth embodiment of the second invention relates to a hologram laminate wherein, in the above embodiment, the transparent protective film is stacked onto the volume hologram layer through a transparent pressure-sensitive adhesive layer.

The fifth embodiment of the second invention relates to a hologram laminate comprising a first transparent film, a first transparent pressure-sensitive adhesive layer, a volume hologram layer, a second transparent pressure-sensitive adhesive layer, an information-recorded second transparent film, a third transparent pressure-sensitive adhesive layer, and an adherend substrate stacked in that order on top of one another from the outermost surface side.

The sixth embodiment of the second invention relates to a hologram laminate wherein, in the first embodiment, the peel strength of the second transparent pressure-sensitive adhesive layer is larger than the peel strength of the third transparent pressure-sensitive adhesive layer.

The seventh embodiment of the second invention relates to a process for producing a hologram laminate, comprising the steps of: stacking a transparent film on the surface of an adherend substrate and recording information on the transparent film, the stacking step and the information recording step being carried out in no special order; and putting a hologram label, comprising at least two layers of a volume hologram layer and a transparent pressure-sensitive adhesive layer stacked on top of the other, on top of the information-recorded transparent film so that the pressure-sensitive adhesive layer faces the information-recorded transparent film.

The eighth embodiment of the second invention relates to a process for producing a hologram laminate, wherein, in the seventh embodiment, a transparent pressure-sensitive adhesive layer has been previously stacked on the underside of the transparent film.

The ninth embodiment of the second invention relates to a process for producing a hologram laminate, wherein, in the above embodiment, a transparent protective film is stacked on the surface of the volume hologram layer.

The tenth embodiment of the second invention relates to a process for producing a hologram laminate, wherein, in the above embodiment, the transparent protective film is stacked onto the volume hologram layer through a transparent pressure-sensitive adhesive layer.

The eleventh embodiment of the second invention relates to a process for producing a hologram laminate, comprising the steps of: providing two labels, one of which is a hologram label comprising a first transparent film, a first transparent pressure-sensitive adhesive layer, a volume hologram layer, and a second transparent pressure-sensitive adhesive layer stacked in that order on top of one another from the outermost surface side and the other is a transparent pressure-sensitive adhesive label comprising a transparent pressure-sensitive adhesive layer stacked onto a transparent film; stacking the transparent pressure-sensitive adhesive label onto the surface of an adherend substrate and recording information on the transparent film as the surface layer in the transparent pressure-sensitive adhesive label, the stacking step and the information recording step being carried out in no special order; and stacking the hologram label onto the information-recorded transparent film so that the second transparent pressure-sensitive adhesive layer faces the information-recorded transparent film.

The twelfth embodiment of the second invention relates to a process for producing a hologram laminate, wherein, in the above embodiment, the peel strength of the second transparent pressure-sensitive adhesive layer is larger than the peel strength of the third transparent pressure-sensitive adhesive layer.

Third Invention

According to the third invention, there are provided improved products including credit cards and various other articles in sheet or other forms, wherein patterns, such as ground tints and figures, coloration and the like, which are mainly formed by printing or the like, cannot be easily reproduced by mere copying of the shape and the hue.

According to the present invention, the improved products could have been provided by providing a hologram layer in the interior of a decorated substrate per se, or by stacking a hologram layer on a decorated substrate.

The first embodiment of the third invention relates to a hologram composite comprising a volume hologram layer fixed in at least a part of a decorated substrate.

The second embodiment of the third invention relates to a hologram laminate wherein, in the above embodiment, the substrate has been decorated by coloration or by imparting a pattern onto the substrate.

The third embodiment of the third invention relates to a hologram composite, wherein, in the above embodiment, the decorated substrate partially has cut off portions and the volume hologram layer is fitted and fixed into the cut off portions.

The fourth embodiment of the third invention relates to a hologram composite wherein, in any one of the above embodiments, a transparent protective layer is additionally stacked on the whole upper surface thereof and/or the whole lower surface thereof.

The fifth embodiment of the third invention relates to a hologram composite wherein, in any one of the above embodiments, the decoration and/or recorded information are provided on the upside of the substrate in its portion fitted with the volume hologram layer.

The sixth embodiment of the third invention relates to a hologram composite wherein, in any one of the above embodiments, the decoration and/or recorded information are provided on the upside of the substrate in its portion not fitted with the volume hologram layer.

The seventh embodiment of the third invention relates to a hologram laminate, wherein, in the first embodiment, the volume hologram layer is stacked on at least a part of the decorated substrate.

The eighth embodiment of the third invention relates to a hologram laminate, wherein, in the seventh embodiment, the substrate has been decorated by coloration or by imparting a pattern onto the substrate.

The ninth embodiment of the third invention relates to a hologram laminate wherein, in the seventh or eighth embodiment, the volume hologram layer has been stacked through a transparent pressure-sensitive adhesive layer.

The tenth embodiment of the third invention relates to a hologram laminate, wherein, in the above embodiment, a transparent protective layer is additionally stacked on the surface of the volume hologram layer.

The eleventh embodiment of the third invention relates to a hologram laminate wherein, in the above embodiment, the transparent protective layer has been stacked on the volume hologram layer through a transparent pressure-sensitive adhesive layer.

The twelfth embodiment of the third invention relates to a hologram laminate comprising: a decorated substrate; and, stacked on at least a part of the decorated substrate in the following order, a first transparent pressure-sensitive adhesive layer, a volume hologram layer, a second transparent pressure-sensitive adhesive layer, and a transparent protective layer.

The thirteenth embodiment of the third invention relates to a hologram laminate, wherein, in any one of the above embodiments, information has been recorded above the stacked volume hologram layer.

Fourth Invention

According to the fourth invention, there are provided a volume hologram laminate and a label for the preparation of a volume hologram laminate, wherein, upon the separation of a hologram laminate from a medium with a hologram applied thereto, the hologram layer is surely damaged and a part of the hologram laminate, which has been left after damaging, can be easily removed from a medium with the hologram applied thereto, such as an identification card (ID card), and, in addition, which are suitable for use in media having various adhesive properties.

It has been found that the provision of a cut in at least one layer constituting a volume hologram laminate can provide a volume hologram laminate having the above properties, which has led to the completion of the present invention.

Accordingly, the volume hologram laminate of the present invention comprises at least a first pressure-sensitive adhesive layers a volume hologram layer, and a protective layer stacked in that order on top of one another, a cut being provided in at least one of the layers constituting the volume hologram laminate.

BRIEF DESCRIPTION OF THE DRAWINGS

FIG. 1 is a plan view of a hologram laminate according to the present invention, which is suitable for use in identification cards;

FIG. 2 is a cross-sectional view taken on line A—A of the identification card shown in FIG. 1;

FIG. 11 is a cross-sectional view showing a basic structure of a hologram composite;

FIG. 12 is a cross-sectional view showing an embodiment of a hologram composite which includes a substrate having a two-layer structure;

FIG. 13 is a cross-sectional view showing an embodiment of a hologram composite which includes a substrate having a three-layer structure and has recorded information;

FIG. 21 is a cross-sectional view showing one embodiment of the hologram laminate according to the present invention;

FIG. 22 is a cross-sectional view showing one embodiment of the label for the preparation of a hologram laminate according to the present invention;

FIG. 23 is a diagram illustrating one embodiment of the case wherein, after the application of a hologram laminate, using the label for the preparation of a hologram laminate according to the present invention, to a medium, the separation of the hologram is attempted.

BEST MODE FOR CARRYING OUT THE INVENTION

First Invention

Figure 3A:
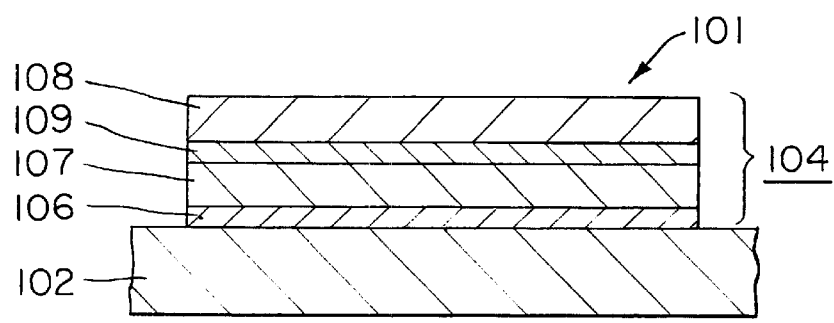
FIGS. 3A and 3B are respectively a cross-sectional view of a hologram laminate and a cross-sectional view of a hologram label.

FIG. 1 is a plan view showing an embodiment wherein the laminate according to the first invention has been applied to an identification card. In an identification card 101, a photograph 103 is stacked onto a substrate 102, and a hologram seal 104 is stacked onto the photograph 103 to seal the photograph 103. In this connection, it should be noted that, although "label" has substantially the same meaning as "seal," the "seal" refers to one used for sealing the "label." Letters 105 inherent in the identification card, such as the name of the holder, the publishing office, the expiration, and the serial number, are printed or typed on the substrate 102. In addition, a magnetic stripe, IC or LSI, an imprint, a writing layer and the like (not shown) may be provided on a part of the substrate. The photograph 103 may be any of a silver salt type photograph, a photograph formed by dye transfer, and a photograph formed using a toner by electrophotography.

In this embodiment, the hologram seal 104 is stacked onto the photograph 103 to prevent the replacement of the photograph with another photograph. The hologram seal 104, however, may be stacked onto any portion other than the portion of the imprint having concaves and convexes. When the hologram described below is a colorless, transparent hologram or a colored, transparent hologram, the hologram seal 104 may be stacked onto a print, such as a letter.

FIG. 2 is a cross-sectional view taken on line A—A of FIG. 1. As can be seen from FIG. 2, a part of the substrate 102 is depressed, the photograph 103 is buried in the substrate in its depressed portion, and the hologram seal 104 is stacked so as to cover a portion just above and around the photograph 103.

In the description given above with reference to FIGS. 1 and 2, the substrate 102 is a card for identification cards. According to the present invention, however, various substrates may be used as the substrate 102 in the hologram laminate.

Objects similar to the identification card include passports and credit cards, and these objects may be used as the substrate 102 in the hologram laminate according to the present invention.

Further, the present invention is also applicable to objects having the value of money, such as gold notes or securities. Gold notes include: those having the value of money in a limited range, such as merchandise certificates and gift cards used, for example, in department stores; those exchangeable for specific goods, such as tickets for beer, tickets for ice cream, or tickets for rice which are used for an exchange of goods; and prepaid cards used, for example, in transport facilities and play grounds.

Further examples of gold notes include those which come to have the value of money upon entry, such as checks and promissory notes. Further, the present invention is applicable to objects the nature of which is different from the above gold notes, for example, check books or bank books and the like used, for example, in financial constitutions, such as banks.

Securities are those which, although they have the value of money, cannot be immediately exchanged for money, and examples thereof include stock certificates, bond certificates, and insurance policies.

Portable and valuable objects, for example, high-grade watches, lighters for cigarettes, cigars, or tobacco, are goods which are likely to be objects for forgery. These objects may also be used as the substrate in the laminate according to the present invention. For example, dials or backside of watches and decorative cases used at the time of selling of the watches may be used as the substrate in the laminate according to the present invention. In addition, written statement or reports, certificates and the like associated with the evaluation or expert opinion on precious metals, art objects and antiques, such as pictures, which support the value of articles or goods, are also likely to be objects for forgery, and can be used as the substrate in the laminate according to the present invention.

Furthermore, the laminate according to the present invention can also be applied to objects, wherein the appearance of unauthorized copied products thereof is likely to cause loss in the owner of copyright or the selling agency, for example, video tapes with information recorded thereon, compact discs for music or pictures, CD-ROMs (compact disc read-only memory) containing computer softwares, and softwares for popular games.

For famous top-brand goods in the field of clothing mainly for outdoor purposes, such as jackets or rainwear having excellent air permeability and moisture permeability, famous top-brand goods mainly in the field of leather goods or bags, such as handbags, and other famous top-brand goods, there is a possibility that, due to their high prices, low-priced imitation thereof appears.

These goods and packages containing these goods can be utilized as the substrate in the laminate according to the present invention.

Objects contemplated to be utilized as the substrate 102 in the laminate according to the present invention may be classified roughly into those which are likely to become a target for forgery due to their high economical values including high monetary value and high value in selling, and those which, although the direct economical value thereof is not very high, are likely to become a target for forgery for illegally obtaining certain social status or qualification, for example, identification cards or papers, passports, and ID cards, such as credit cards.

Regarding materials for the substrate 102, vinyl chloride resin has hitherto been mainly used in the case of ID cards. Other resins, however, are also usable as materials for substrate 102, and examples thereof include polyolefin resins, such as polyethylene and polypropylene resins, acrylic resins, polycarbonate resins, polyethylene terephthalate resins, and triacetylcellulose resins.

Other materials for the substrate 102 include papers, synthetic papers, rubbers, cloths, woody substrates, such as wood and bamboo, metals, and ceramics. Goods obtained by fabricating these materials may also be used as the substrate 102.

The substrate 102 may be in any form of a sheet, a flat plate, an object having a quadritic curve, an object having a three-dimensional surface and the like.

Figure 3B:
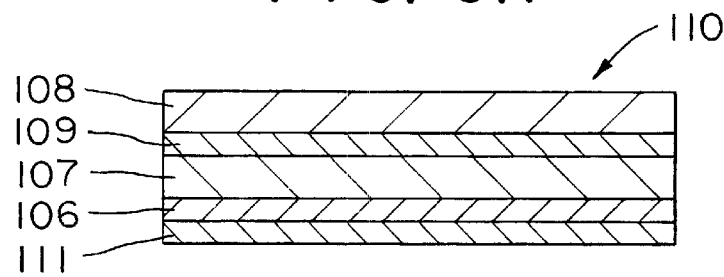

FIG. 3A is a detailed view of a laminate 101 comprising a substrate 102 and a hologram label 104 stacked onto the substrate 102, and FIG. 3B a detailed view of a label 110 for use in the laminate 101 shown in FIG. 3A.

As shown in FIG. 3A, in the laminate 101 according to the present invention, a hologram layer 107 is stacked onto the substrate 102 through a first pressure-sensitive adhesive layer 106, and a transparent film 108 is stacked onto the hologram layer 107 through a second pressure-sensitive adhesive layer 109. The label 110 for use in the laminate 101 is shown in FIG. 3B. The four upper layers of the label 110 is the same as the layers constituting the hologram label 104 in the laminate 101, and the only difference in layer construction between the label 110 and the hologram label 104 in the laminate 101 is that, in the label 110, a release sheet 111 is stacked onto the lowermost layer.

The hologram in the hologram layer 107 is preferably a volume hologram, although the hologram may be a relief hologram. In the volume hologram, interference light formed by interference of object light with reference light is recorded on a photosensitive material having a thickness which is sufficiently larger than interference fringe spacings, and the three-dimensional structure of the interference fringes as such is recorded.

The volume hologram is formed by recording interference light formed by interference of object light with reference light directly on a volume hologram-forming material stacked onto a support film, or by brining an original plate of a volume hologram into intimate contact with the volume hologram-forming material and exposing the assembly to duplicate the volume hologram. The latter method is used in the production of the volume hologram on a commercial scale.

Materials and methods for the formation of the volume hologram will be described in more detail.

Examples of the support film, on which the volume hologram-forming material is to be coated, include polyethylene terephthalate films, polyethylene films, polypropylene films, polyvinyl chloride films, acrylic films, triacetylcellulose films, and cellulose acetate butyrate films, these films having a thickness of 1 µm to 1 mm, preferably 10 to 100 µm. The support film is preferably highly transparent and highly smooth.

In general, hologram-forming materials include conventional volume hologram-recording materials, such as silver salt materials, bichromated gelatin emulsions, photopolymerizable resins, and photocrosslinkable resins. In the volume hologram according to the present invention, the use of a photosensitive material, for dry volume phase hologram recording applications, comprising a matrix polymer, a photopolymerizable compound, a photopolymerization initiator, and a sensitizing dye is preferred from the viewpoint of production efficiency as the volume hologram-forming material.

Matrix polymers as binder resins include polymethacrylic esters or partial hydrolyzates thereof, polyvinyl acetate or hydrolyzates thereof, polyvinyl alcohol or partial acetalization products thereof, triacetylcellulose, polyisoprene, polybutadiene, polychloroprene, silicone rubber, polystyrene, polyvinyl butyral, polychloroprene, polyvinyl chloride, chlorinated polyethylene, chlorinated polypropylene, poly-N-vinylcarbazole or derivatives thereof, poly-N-vinylpyrrolidone or derivatives thereof, copolymer of styrene with maleic anhydride or semi-esters thereof, and copolymers using, as a comonomer, at least one monomer selected from copolymerizable monomers, such as acrylic acid, acrylic esters, methacrylic acid, methacrylic esters, acrylamide, acrylonitrile, ethylene, propylene, vinyl chloride, and vinyl acetate, and mixtures of the above polymers. Preferred are polyisoprene, polybutadiene, polychloroprene, polyvinyl alcohol or partial acetalization products of polyvinyl alcohol, e.g., polyvinyl acetal, polyvinyl butyral, polyvinyl acetate, and vinyl chloride/vinyl acetate copolymer, or mixtures of the above polymers.

The recorded hologram may be stabilized through monomer transfer by heating. To this end, the matrix polymer preferably has a relatively low glass transition temperature and can facilitate the monomer transfer.

Photopolymerizable compounds include photopolymerizable, photocrosslinkable monomers, oligomers, and prepolymers having at least one ethylenically unsaturated bond per molecule which will be described later, and mixtures of the above compounds, for example, unsaturated carboxylic acids and salts thereof, esters of unsaturated carboxylic acids with aliphatic polyhydric alcohol compounds, and compounds in which unsaturated carboxylic acids are linked to aliphatic polyamine compounds by an amide linkage.

Specific examples of monomers of unsaturated carboxylic acids include acrylic acid, methacrylic acid, itaconic acid, crotonic acid, isocrotonic acid, maleic acid, and halogen-substituted unsaturated carboxylic acids, for example, chlorinated unsaturated carboxylic acids, brominated unsaturated carboxylic acids, and fluorinated unsaturated carboxylic acids. Salts of unsaturated carboxylic acids include sodium and potassium salts of the above acids.

Regarding specific examples of monomers of esters of aliphatic polyhydric alcohol compounds with unsaturated carboxylic acids, acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl) ether of bisphenol A, ethoxylated bisphenol A diacrylate, 2-(1-naphthyloxy)ethyl acrylate, and o-biphenyl acrylate.

Regarding specific examples of monomers of esters of aliphatic polyhydric alcohol compounds with unsaturated carboxylic acids, methacrylic esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl]dimethylmethane, bis-[p-(acryloxyethoxy)phenyl]dimethylmethane, 2,2-bis(4-methacryloyloxyphenyl)propane, and 2-naphthyl methacrylate.

Regarding specific examples of monomers of esters of aliphatic polyhydric alcohol compounds with unsaturated carboxylic acids, itaconic esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Regarding specific examples of monomers of esters of aliphatic polyhydric alcohol compounds with unsaturated carboxylic acids, crotonic esters include ethylene glycol dicrotonate, tetramethylene glycol dicrotonate, pentaerythritol dicrotonate, and sorbitol tetracrotonate.

Regarding specific examples of monomers of esters of aliphatic polyhydric alcohol compounds with unsaturated carboxylic acids, isocrotonic esters include ethylene glycol diisocrotonate, pentaerythritol diisocrotonate, and sorbitol tetraisocrotonate.

Regarding specific examples of monomers of esters of aliphatic polyhydric alcohol compounds with unsaturated carboxylic acids, maleic esters include ethylene glycol dimaleate, triethylene glycol dimaleate, pentaerythritol dimaleate, and sorbitol tetramaleate.

Halogenated unsaturated carboxylic acids usable herein include 2,2,3,3-tetrafluoropropyl acrylate, 1H,1H,2H,2H-heptadecafluorodecyl acrylate, 2,2,3,3-tetrafluoropropyl methacrylate, 1H,1H,2H, 2H-heptadecafluorodecyl methacrylate, 2,4,6-tribromophenyl methacrylate, dibromoneopentyl dimethacrylate (NK Ester DBN (tradename), manufactured by Shin-Nakamura Chemical Co., Ltd.), dibromopropyl acrylate (NK Ester A-DBP (tradename), manufactured by Shin-Nakamura Chemical Co., Ltd.), dibromopropyl methacrylate (NK Ester DBP (tradename), manufactured by Shin-Nakamura Chemical Co., Ltd.), methacrylic acid chloride, 2,4,6-trichlorophenyl methacrylate, p-chlorostyrene, methyl 2-chloroacrylate, ethyl 2-chloroacrylate, n-butyl-2-chloroacrylate, tribromophenol acrylate, and tetrabromophenol acrylate.

Specific examples of monomers of compounds, in which unsaturated carboxylic acids are linked to aliphatic polyamine compounds by an amide linkage, include methylenebisacrylamide, methylenebismethacrylamide, 1,6-hexamethylenebisacrylamide, 1,6-hexamethylenebismethacrylamide, diethylenetriamine trisacrylamide, xylylenebisacrylamide, xylylenebismethacrylamide, N-phenylmethacrylamide, and diacetoneacrylamide.

Other examples include polyisocyanate compounds having two or more isocyanate groups per molecule described in Japanese Patent Publication No. 41708/1973 and vinyl urethane compounds having two or more polymerizable vinyl groups per molecule with a hydroxyl-containing vinyl monomer represented by formula $CH_2=C(R)COOCH_2(R')OH$ (wherein R and R' each independently represent a hydrogen or a methyl group) being added thereto.

Urethane acrylates described in Japanese Patent Laid-Open No. 37193/1976 and polyester acrylates and polyfunctional acrylates and methacrylates, prepared from epoxy groups and (meth)acrylic acid or the like, described in Japanese Patent Laid-Open No. 64183/1973 and Japanese Patent Publication Nos. 43191/1974 and 30490/1977 may also be used.

Further, compounds introduced as photocurable monomers and oligomers in Journal of the Adhesion Society of Japan, Vol. 20, No. 7, 300–308 may also be used.

Regarding other examples, phosphorus-containing monomers include: mono(acryloyloxyethyl) acid phosphate (Light Ester PA (tradename), manufactured by Kyoeisha Chemical Co., Ltd.) and mono(2-methacryloyloxyethyl) acid phosphate (Light Ester PM (tradename), manufactured by Kyoeisha Chemical Co., Ltd.); and epoxy acrylate monomers (Ripoxy VR-60 (tradename), manufactured by Showa High Polymer Co., Ltd.; and Ripoxy VR-90 (tradename), manufactured by Showa High Polymer Co., Ltd.).

Further, NK Ester M-230G (tradename) manufactured by Shin-Nakamura Chemical Co., Ltd. and NK Ester 23G (tradename) manufactured by Shin-Nakamura Chemical Co., Ltd. are usable.

Further examples of monomers include: a triacrylate having a structure represented by formula

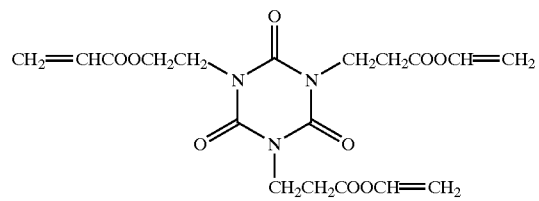

(tradename: Aronix M-315, manufactured by Toa Gosei Chemical Industry Co., Ltd.); a triacrylate having a structure represented by formula

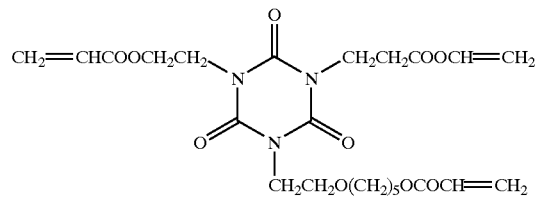

(tradename: Aronix M-325, manufactured by Toa Gosei Chemical Industry Co., Ltd.); 2, 2'-bis(4-acryloxy-diethoxyphenyl)propane (NK Ester A-BPE-4 (tradename); and tetramethylolmethane tetraacrylate (NK ester A-TMMT (tradename) manufactured by Shin-Nakamura Chemical Co., Ltd.).

Regarding initiator systems, photopolymerization initiators include, for example, 1,3-di(t-butyldioxycarbonyl) benzophenone, 3,3',4, 4'-tetrakis(t-butyldioxycarbonyl) benzophenone, N-phenylglycine, 2,4,6-tris (trichloromethyl)-s-triazine, 3-phenyl-5-isoxazolone, 2-mercaptobenzimidazole, and dimers of imidazole.

Preferably, the photopolymerization initiator is decomposed after recording of the hologram from the viewpoint of stabilizing the recorded hologram. For example, an organic peroxide system is preferred because it can be easily decomposed upon ultraviolet irradiation.

Examples of sensitizing dyes include dyes having absorption of light at 350 to 600 nm, such as thiopyrilium salt, merocyanine, quinoline, styrylquinoline, ketocoumarin, thioxanthene, xanthene, oxonol, cyanine, rhodamine, thiopyrilium salt, pyrilium ion, and diphenyliodonium ion dyes. Sensitizing dyes having absorption of light in a wavelength region of not more than 350 nm or not less than 600 nm may also be used.

In the volume hologram-forming material comprising a matrix polymer, a photopolymerizable compound, a photopolymerization initiator, and a sensitizing dye, the mixing ratio of the components is as follows.

The amount of the photopolymerizable compound used is generally 10 to 1,000 parts by weight, preferably 10 to 100 parts by weight, based on 100 parts by weight of the binder resin.

The amount of the photopolymerization initiator used is generally 1 to 10 parts by weight, preferably 5 to 10 parts by weight, based on 100 parts by weight of the binder resin.

The amount of the sensitizing dye used is generally 0.01 to 1 part by weight, preferably 0.01 to 0.5 part by weight, based on 100 parts by weight of the binder resin.

Other components usable in the volume hologram-forming material include, for example, plasticizers, glycerin, diethylene glycol, triethylene glycol, and various nonionic surfactants, cationic surfactants, and anionic surfactants.

The volume hologram-forming material is added to a solvent, such as acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, or isopropanol, or a mixed solvent composed of the above solvents to prepare a coating liquid having a solid content of about 15 to 25%. Commercially available products usable as this type of coating liquid include, for example, Omnidex 352 and Omnidex 706, manufactured by E. I. du Pont de Nemours & Co.

When the support film is in the form of sheets (handled in each piece), the coating liquid may be coated by bar coating, spin coating, dipping or the like. On the other hand, when the support film is in a continuous form, such as in a roll form, the coating liquid may be coated by gravure coating, roll coating, die coating, Komma coating or the like. In both the cases, after the coating, drying or curing is carried out according to the kind of the coating liquid to fix the volume hologram-forming material to the supporting film. The thickness of the volume hologram-forming material thus obtained is 0.1 to 50 $\mu$m, preferably 5 to 20 $\mu$m.

A protective film may be in the state of being applied onto the volume hologram-forming material coated onto the substrate film until hologram information is exposed.

Protective films usable herein are highly transparent, highly smooth resin films having a thickness of 1 $\mu$m to 1 mm, preferably 10 to 100 $\mu$m, and examples thereof include polyethylene terephthalate films, polyethylene films, polypropylene films, polyvinyl chloride films, acrylic films, triacetylcellulose films, and cellulose acetate butyrate films. The protective film may be laminated onto the volume hologram-forming material by means of a rubber roller or the like.

Alternatively, instead of the lamination of the transparent resin film, a coating composition with a film-forming material, such as triacetylcellulose, polyvinyl alcohol, or polymethyl methacrylate, dissolved therein may be coated by spin coating or the like to form a protective film.

Methods for recording on the volume hologram-forming material provided on the support film include a method wherein, when the protective film is in the state of lamination onto the volume hologram-forming material, the volume hologram-forming material, either as such or after the removal of the protective film, is directly exposed to a laser beam (two fluxes), for example, an argon laser (wavelength 514.5 nm) or a krypton laser (wavelength 647 nm) from the support film side to record interference fringes, or alternatively is subjected to recording of interference light formed by interference of object light with reference light, and a method wherein, after the removal of the protective film, an original plate of a volume hologram is directly brought into intimate contact with the volume hologram-forming material followed by application of an argon laser (wavelength 514.5 nm) to the volume hologram-forming material from the support film side to record fringes of interference of light reflected from the original plate with the incident light, thereby providing volume hologram information.

Thereafter, a series of steps, that is, the step of applying ultraviolet light at 0.1 to 10,000 mJ/cm$^2$, preferably 10 to 1,000 mJ/cm$^2$, from a light source, such as an ultrahigh-pressure mercury lamp, a high-pressure mercury lamp, a carbon arc lamp, a xenon arc lamp, or a metal halide lamp, to decompose the photopolymerization initiator and the step of heating, for example, the step of heating the assembly at 120° C. for 120 min to diffuse and move the photopolymerizable compound, are successively carried out to prepare a stable volume hologram.

In the hologram laminate according to the present invention, a hologram layer 107 formed by using the above volume hologram-forming materials and method is stacked onto a substrate 102 through a first pressure-sensitive adhesive 106, and a transparent film 108 is stacked onto the hologram layer 107 through a second pressure-sensitive adhesive layer 109.

Next, the transparent film 108 will be described. The transparent film 108 is the uppermost layer of the hologram laminate or the hologram label, or covers the underside of the hologram layer 107.

Examples of films usable as the transparent film 108 include films of polyethylene, polypropylene, polyethylene fluoride, polyvinylidene fluoride, polyvinyl chloride, polyvinylidene chloride, ethylene/vinyl alcohol, polyvinyl alcohol, polymethyl methacrylate, polyether sulfone, polyether ether ketone, polyamide, tetrafluoroethylene/perfluoroalkyl vinyl ether copolymer, polyester films, such as polyethylene terephthalate, and polyimide films. The thickness of the transparent film 108 is 2 to 200 $\mu$m, preferably 10 to 50 $\mu$m.

If necessary, a hardcoat may be provided on the transparent film 108 particularly when applied as the uppermost layer of the hologram laminate or hologram label, from the viewpoint of enhancing the function of protecting the surface.

The hardcoat may be formed, for example, by coating a silicone, fluorosilicone, melamine alkyd, urethane acrylate (ultraviolet-curable) or other system by dipping, spraying, roll coating or other method to a thickness of 1 to 50 $\mu$m.

The surface of the transparent film 108 or the surface of the hardcoat may be subjected to release treatment. The release treatment may be carried out by coating a fluoro release agent, a silicone release agent, a stearic acid release agent, a wax release agent or the like by dipping, spraying, roll coating or the like.

The transparent film 108, particularly when located on the underside of the hologram layer 107, may be colored.

In the embodiment shown in FIG. 3, the first pressure-sensitive adhesive layer 106 functions to stack the hologram layer 107 onto the substrate 102, and the second pressure-sensitive adhesive layer 109 functions to stack the transparent film 108 onto the hologram layer 107.

In this case, the adhesive strength S1, derived from the first pressure-sensitive adhesive layer 106, between the substrate 102 and the hologram layer 107 is larger than, preferably at least 100 gf/2.5 cm larger than, the adhesive strength S2, derived from the second pressure-sensitive adhesive layer 109, between the hologram layer 107 and the transparent film 108. By virtue of this construction, an attempt to separate the hologram label 104 from the hologram laminate 101 of the present invention causes the transparent film 108 to be first separated.

Further, in bonding the second pressure-sensitive adhesive layer 109 to the transparent film 108, a portion having unsatisfactory adhesive strength is provided. In the separation of the transparent film 108, a part of the pressure-sensitive adhesive in the second pressure-sensitive adhesive layer 109 is left on the hologram layer 107, and the remainder is removed together with the transparent film 108.

Pressure-sensitive adhesives usable for constituting the first pressure-sensitive adhesive layer 106 and the second pressure-sensitive adhesive layer 109 and, in addition, the third pressure-sensitive adhesive layer 109' described below include, for example, acrylic resin, acrylic ester resin or acrylic or acrylic ester copolymer, styrene-butadiene copolymer, naturally occurring rubbers, casein, gelatin, rosin ester, terpene resin, phenolic resin, styrene resin, coumarone-indene resin, polyvinyl ether, and silicone resin. Additional examples thereof include a -cyanoacrylate, silicone, maleimide, styrol, polyolefin, resorcinol, polyvinyl ether, and silicone adhesives.

Besides the above pressure-sensitive adhesives, heat sealant may be used as the pressure-sensitive adhesive for constituting the first pressure-sensitive adhesive layer 106, and examples thereof include ethylene/vinyl acetate copolymer resin, polyamide resin, polyester resin, polyethylene resin, ethylene/isobutyl acrylate copolymer resin, butyral resin, polyvinyl acetate or vinyl acetate copolymer resin, cellulose derivative, polymethyl methacrylate resin, polyvinyl ether resin, polyurethane resin, polycarbonate resin, polypropylene resin, epoxy resin, and phenolic resin.

Alternatively, thermoplastic elastomers, such as SBS (styrene-butadiene-styrene block copolymer), SIS (styrene-isoprene-styrene block copolymer), and SEBS (styrene-ethylene-butylene-styrene block copolymer), reactive hot-melt resins and the like may be used.

The first pressure-sensitive adhesive layer 106, the second pressure-sensitive adhesive layer 109, and the third pressure-sensitive adhesive layer 109' may be formed using the above material in a thickness of 4 to 20 μm.

There are several methods for applying the pressure-sensitive adhesive to conduct bonding. One of the methods comprises coating any one of or both bonding faces with the pressure-sensitive adhesive, optionally drying the coating, and applying both layers to each other. At the time of the application, if necessary, heating may be carried out.

Another method comprises coating the pressure-sensitive adhesive onto the surface of a releasable sheet having a releasable surface, called "separator", applying the coated sheet onto any bonding face, separating the separator after the application, and applying other bonding face to the surface of the pressure-sensitive adhesive exposed by the separation. When the application is carried out immediately after the coating of the pressure-sensitive adhesive onto the separator, the use of a single separator suffices for satisfactory results. However, it is also possible to use a method, using a "double face adhesive tape", which comprises sandwiching a pressure-sensitive adhesive layer between two separators, removing one of the separators, conducting bonding, removing the other separator, and conducting bonding. A suitable method may be selected and used according to need.

In the embodiment shown in FIG. 3, the adhesive strength S1, derived from the first pressure-sensitive adhesive layer 106, between the substrate 102 and the hologram layer 107 may be made larger than the adhesive strength S2, derived from the second pressure-sensitive adhesive layer 109, between the hologram layer 107 and the transparent film 108 by any of a method wherein different pressure-sensitive adhesives having different adhesive strengths are used for respective pressure-sensitive adhesive layers, a method wherein pressure-sensitive adhesives having different adhesive strengths are mixed together to prepare two mixed adhesives having different mixing ratios which are then used to create a suitable adhesive strength difference, and a method wherein a pressure-sensitive adhesive common to two adhesives is provided as a main component and the amounts of a crosslinking agent, such as an isocyanate crosslinking agent, and a tackifier resin added to the pressure-sensitive adhesive are varied to create an adhesive strength different between the two adhesives.

This is true of the case where the adhesive strength of the first to third pressure-sensitive adhesive layers is varied.

For bonding between the second pressure-sensitive adhesive layer 109 and the transparent film 108, portions having satisfactory adhesive strength and portions having unsatisfactory adhesive strength are provided.

Figure 5:
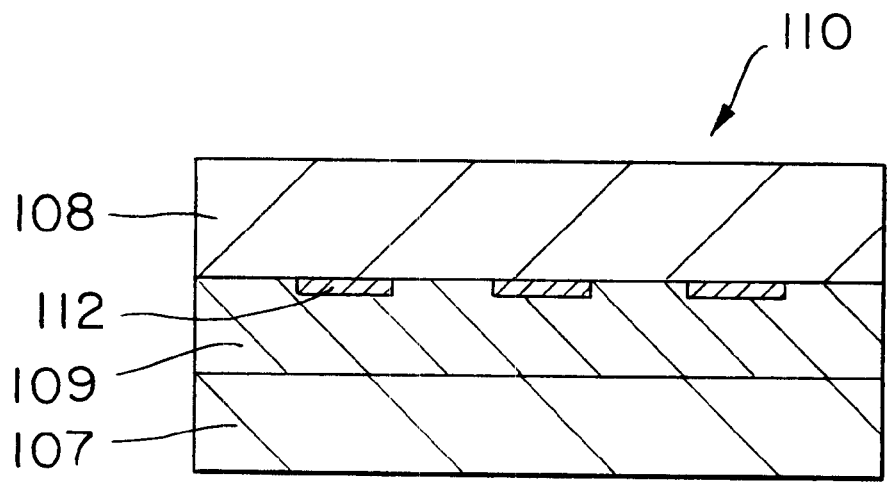
FIG. 5 is a diagram showing a structure for partial separation of a transparent protective film.

This will be described with reference to FIGS. 5 and 6. A coating composition for imparting releasability, for example, a coating composition comprising a binder resin, having adhesion to the transparent film 108, as a main component and a material, capable of imparting releasability, such as wax or silicone, as an additive is coated or printed in a pattern form onto the transparent film 108 in its surface to be contacted with the second pressure-sensitive adhesive layer 109, to form a releasable pattern 112, thus permitting the second pressure-sensitive adhesive layer 109 not to be satisfactorily adhered on the releasable pattern 112.

On the other hand, it is also possible to use a method wherein a coating composition containing a material serving as a primer capable of enhancing the adhesive strength between the transparent film 108 and the second pressure-sensitive adhesive layer 109 is coated or printed in a pattern form so that, in the coated portions, the second pressure-sensitive adhesive layer 109 is satisfactorily adhered to the transparent film 108, or a method wherein a component capable of crosslinking the pressure-sensitive adhesive is coated or printed in a pattern form on the transparent film 108 side.

In all the above cases, patterns include dots, stripes, lattice, symbols, and other designs or letters. When letters are provided, words indicating an evidence of the separation are provided such as "SHIYO ZUMI (USED)," "MUKO (INVALID)," "KAIFU ZUMI (OPENED)," and "VOID" (which means invalid).

The pressure-sensitive adhesive layer may be optionally colored with a colorant, such as a pigment or a dye.

Alternatively, a method is also be used wherein an ionizing radiation, such as ultraviolet light or electron beam, is pattern-wise applied to partially cause crosslinking.

When the adhesive strength is partially enhanced, confirmation is carried out on whether or not the adhesive strength regarding the whole transparent film 108 is lower than the adhesive strength derived from the underlying first pressure-sensitive adhesive layer 106, and, when the transparent film 108 is separated, care should be taken so as not to cause the separation of the hologram layer 107.

The above regulation of the adhesive strength may also be carried out between the second pressure-sensitive adhesive layer 109 and the hologram layer 107. Further, the regulation of the adhesive strength may be carried out by the magnitude of both the adhesive strength between the second pressure-sensitive adhesive layer 109 and the hologram layer 107 and the adhesive strength between the transparent film 108 and the second pressure-sensitive adhesive layer 109.

Since, however, the hologram layer 107 of a volume hologram is not very tough, is likely to be elongated upon pulling, and is somewhat soft, the regulation of the adhesive strength is preferably carried out between the transparent protective film 108 and the second pressure-sensitive adhesive layer 109.

In bonding between the second pressure-sensitive adhesive layer 109 and the transparent film 108, when portions having satisfactory adhesive strength and portions having unsatisfactory adhesive strength are provided, care should be taken so as not to cause the pattern 112 to become visible due to the refractive index difference. This is so because, when division into portions having satisfactory adhesive strength and portions having unsatisfactory adhesive strength renders the pattern 112 visible, a person who illegally attempts to separate the laminate would become increasingly cautious.

Figure 6:
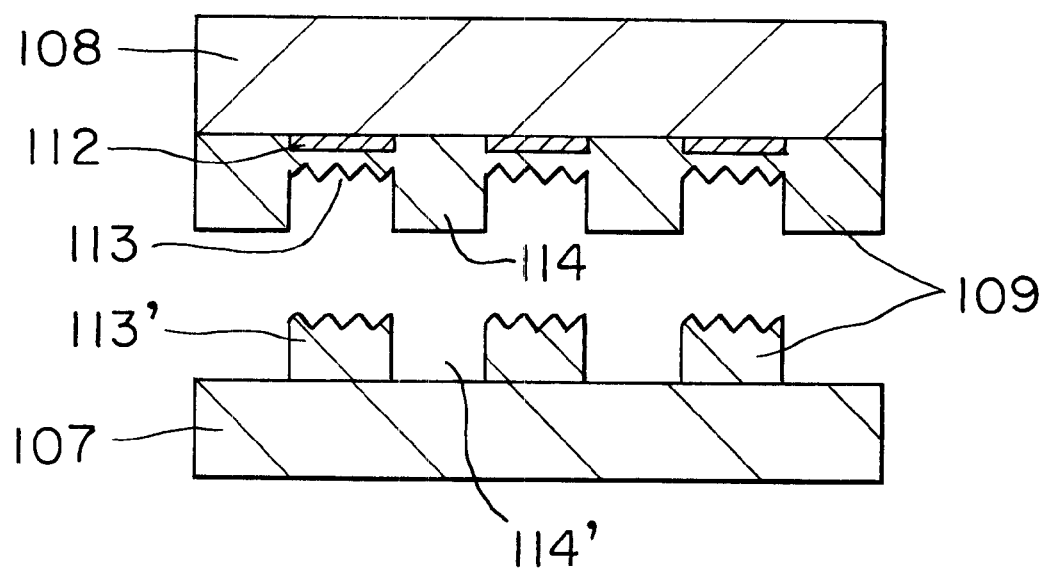
FIG. 6 is a diagram showing the state of separation of a transparent protective film.

The provision of portions having satisfactory adhesive strength and portions having unsatisfactory adhesive strength between the hologram layer 107 and the transparent film 108, assuming that releasability has been partially imparted, upon an attempt to separate the transparent film 108, as shown in FIG. 6, causes separation on the surface of or around the pattern 112 due to relatively low adhesive strength of the pressure-sensitive adhesive constituting the second pressure-sensitive adhesive layer 109 on the pattern 112. As a result, on the pattern 112, only a small amount of the pressure-sensitive adhesive is left upon the separation, whereas, on the hologram layer 107 in its position corresponding to the pattern 112, a major part of the pressure-sensitive adhesive is not removed and is left. In portions other than the pattern 112, since the pressure-sensitive adhesive is bonded with usual adhesive strength, as compared with on the pattern 112, a larger amount of the pressure-sensitive adhesive is removed together with the transparent film 108. Thus, the degree of the removal of the pressure-sensitive adhesive varies depending upon whether the pattern 112 is present or absent.

In FIG. 6, in the portions free from the pattern 112, the whole pressure-sensitive adhesive is shown as removed together with the transparent film. However, it should be noted that this occurs only when the adhesive strength between the second pressure-sensitive adhesive layer 109 and the transparent film is satisfactorily larger than the adhesive strength between the second pressure-sensitive adhesive layer 109 and the hologram layer 107. When the hologram layer 107 has been cured by crosslinking, the adhesive strength between the second pressure-sensitive adhesive layer 109 and the hologram layer 107 is less likely to be increased. In this case, the state of separation becomes close to that as shown in FIG. 6.

As shown in FIG. 6, when the transparent film 108 has been separated, the second pressure-sensitive adhesive layer 109 in its portions corresponding to the releasable pattern 112 is separated between layers close to the transparent film 108. Since the separated face on both sides is rough, a whitish visible pattern is created on the surface of the hologram layer 107 and the separated face of the transparent film. This becomes an evidence of the separation of the transparent film 108. When the laminate is attempted to be returned to the original state, the rough surface, which has been once created, cannot be eliminated even by careful re-application. This can prevent the separation of the hologram label which is then transferred to other object.

The whitish portion corresponding to the pattern 112 significantly occurs when the separation of the transparent film 108 is attempted. In addition, an attempt to separate also the underlying hologram layer creates a cloudy state despite that there is no intention of the separation between the transparent protective film 108 and the hologram layer 107. Also in this case, it is possible to prevent the separation of the hologram label which is then transferred to another object.

The reason for this is considered as follows. Probably, pulling for the separation of the sheet in the above state requires bending of the sheet by 90 degrees or above. In the bent portion, the second pressure-sensitive adhesive layer 109 is compressed, attempts to find a refuge and consequently is bulged toward the separation of the transparent film. Therefore, although the whole transparent film 108 is in the state of lamination, separation occurs at a position having low adhesive strength.

In the hologram laminate 101 according to the present invention, means for preventing the forgery is provided between the transparent film 108 and the second pressure-sensitive adhesive layer 109. In addition, even though an attempt has been made such that, after the separation of the transparent film 108, the residual pressure-sensitive adhesive is removed from the hologram layer 107 which is then applied to other article, this illegal act can be prevented by establishing the following given relationship between the hologram layer 107 and the first pressure-sensitive adhesive layer 106.

As described above, the hologram layer 107 of a volume hologram is not very tough and, when pulled, is likely to be elongated, and is somewhat soft. These properties are utilized. Specifically, the adhesive strength between the hologram layer 107 and the substrate 102 is made larger than the 1% tensile strength (tensile force required for elongating the hologram layer 107 by 1%) of the hologram layer 107 so that an attempt to separate the hologram layer 107 elongates the hologram layer 107.

When the size of the hologram label is assumed to be 2 cm in length×2 cm in width, an elongation of 1% corresponds to 0.2 mm. This change cannot be regarded as a significant change by visual inspection unless precision measurement is carried out. In the volume hologram, however, since several interference fringes are present in the so-called thickness-wise direction, elongation reduces the spacing between the interference fringes. This causes a shift of the color of the whole hologram to blue side. Therefore, the fact of the elongation can be viewed with the naked eye as a change in color. Thus, the fact of the separation can be confirmed.

The change in color of the hologram layer 107 is created by a solvent. Specifically, an attempt to remove the residual pressure-sensitive adhesive with a solvent after the separation of the transparent film 108 causes the penetration of the solvent into the hologram layer 107 which swells the hologram layer 107. This increases the spacing between the interference fringes. As a result, the color of the whole hologram is shifted to red side. Thus, the fact of the elongation can be visually confirmed as a change in color. As with the previous case, the fact of the separation can be confirmed.

Thus, the volume hologram 107 per se has forgery preventive properties.

In the relief hologram as well, the change in color by the elongation or contraction can be realized by, instead of use of a conventional hard hologram, regulating the crosslinking density to such an extent as will cause the hologram to be easily elongated. In this case, the spacing between the interference fringes is increased in both cases of pulling and swelling, resulting in a shift in hue of the hologram layer to a red side.

The release sheet 111 is in some cases omitted or stacked in the field of pressure-sensitive adhesive labels. When the upper surface of the transparent protective film 108 is releasable, the hologram label can be stored without posing any problem by putting a hologram label having the same structure as the hologram seal indicated by numeral 110 in FIG. 3B, or by winding.

Since, however, the hologram label of the present invention is generally small although the size varies depending upon the articles, on which the label is to be applied, the adoption of the following embodiment is preferred. Specifically, the release sheet 111 is stacked to bring the hologram label to a form shown in FIG. 4B. Several to several tens of labels are collectively brought to a single sheet. All the layers except for the release sheet 111 are subjected to stamping generally called "half blanking" into a predetermined outer shape. This label sheet is convenient to use because, every time the label is needed, the hologram label can be separated from the release sheet.

When the hologram label is mechanically applied, with the release sheet applied thereto, only the hologram label may be subjected to "half blanking" followed by winding using the continuous release sheet to a roll form which is easy to use.

Suitable release sheets include synthetic resin laminate papers, synthetic papers, and synthetic resin films, which have been treated for rendering the surface releasable, for example, a PET film the surface of which has been treated, with a fluoro release agent, a silicone release agent, a stearic acid release agent, a wax release agent or the like, for rendering the surface releasable.

For the layers constituting the hologram label 110 except for the release sheet 111, the description thereof will be omitted because these layers are the same as those described above in connection with the layers constituting the hologram laminate. The production process of the hologram label 110 shown in FIG. 3 will be described.

Before the production of the hologram label 110, the substrate 102 is provided. Separately, provided are a laminate of a hologram-forming material and a protective film stacked on a support film, and a pressure-sensitive adhesive, for applying the hologram layer 107 onto the substrate 102, prepared in the form of a double face adhesive tape with a separator applied onto both sides of the adhesive. Further, after the formation of, for example, a release pattern on the transparent protective film 108, a pressure-sensitive adhesive is applied thereon, followed by stacking of a separator to prepare a pressure-sensitive adhesive sheet.

At the outset, the protective film in the hologram-forming material is removed, and light is then applied thereto from the support film side to record a hologram. Subsequently, ultraviolet irradiation and heat treatment is carried out to prepare a hologram.

After the preparation of the hologram, the pressure-sensitive adhesive prepared in the form of a double face adhesive tape is applied to the portion after the removal of the protective film. Thus, a pressure-sensitive adhesive label for applying the hologram layer 107 is prepared. The other separator in the double face adhesive tape is left as it is.

Next, the support film is removed to expose the hologram layer 107, and the transparent film after the separation of the separator is applied to the exposed surface. In this stage, a label is provided wherein the transparent film 108, the second pressure-sensitive adhesive layer 109, the hologram layer 107, the first pressure-sensitive adhesive layer 106, and the separator have been stacked in that order on top of one another from the surface side.

Finally, the separator underlying the first pressure-sensitive adhesive layer is removed, and the label is then applied to the substrate.

The above process can provide the hologram label of the present invention and the hologram laminate of the present invention.

The embodiments shown in FIGS. 3A and 3B have been mainly described above. In this case, the provision of portions having satisfactory adhesive strength and portions having unsatisfactory adhesive strength has been carried out on the second pressure-sensitive adhesive layer 109 provided between the transparent film 108 as the uppermost layer and the hologram layer 107 underlying the transparent film 108. However, the provision of portions having unsatisfactory adhesive strength may be carried out on the pressure-sensitive adhesive layer formed at other site.

For example, in the layer constructions shown in FIGS. 3A and 3B, the provision of portions having satisfactory adhesive strength and portions having unsatisfactory adhesive strength has been carried out on the first pressure-sensitive adhesive layer 106. In this case, the adhesive strength, derived from the first pressure-sensitive adhesive layer, between the hologram layer and the substrate may be made smaller than the adhesive strength, derived from the second pressure-sensitive adhesive, between the transparent film and the hologram layer so that an attempt to separate the hologram label 104 applied onto the substrate 2 causes the separation at the position of the first pressure-sensitive adhesive layer 106.

Figure 4A:
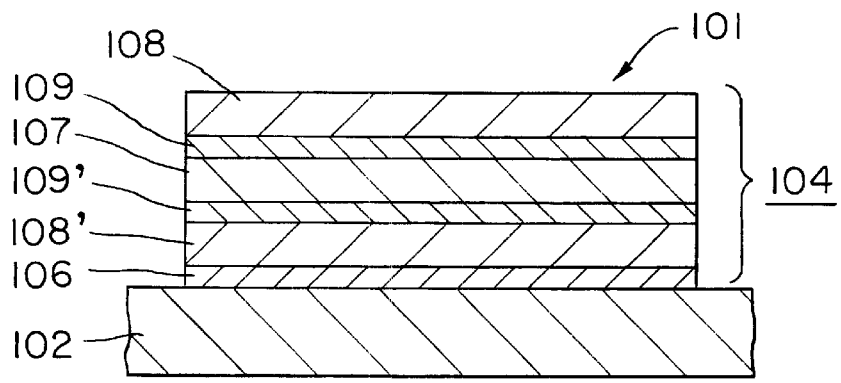
FIGS. 4A and 4B are respectively a cross-sectional view of another hologram laminate and a cross-sectional view of another hologram label.
Figure 4B:
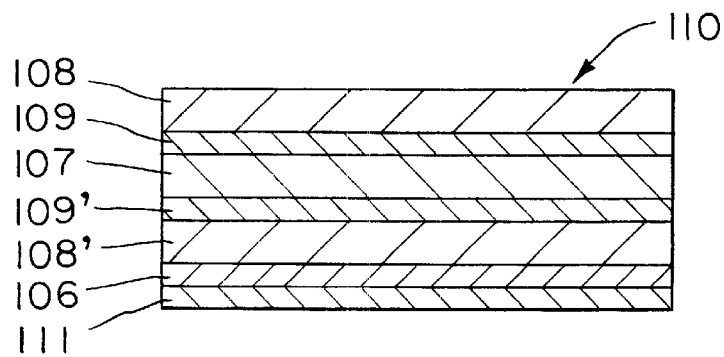

Embodiments shown in FIGS. 4A and 4B are somewhat more complicate than the embodiments shown in FIGS. 3A and 3B. These embodiments correspond to the replacement of the hologram layer 107 in the embodiments shown in FIGS. 3A and 3B with a laminate having a three-layer structure of a transparent film 108' stacked on the underside of the hologram layer 107 through a pressure-sensitive adhesive layer 109'.

In this case, three pressure-sensitive adhesive layers are present. Therefore, the provision of portions having satisfactory adhesive strength and portions having unsatisfactory adhesive strength may be carried out on any one of the pressure-sensitive adhesive layers, or on any two pressure-sensitive adhesive layers, or on all the three pressure-sensitive adhesive layers. In the hologram laminate or the hologram label as shown in FIG. 4A or 4B, among the three pressure-sensitive adhesive layers, the pressure-sensitive adhesive layer 106 as the lowermost pressure-sensitive adhesive layer may be formed of a pressure-sensitive adhesive layer colored with a colorant, such as a pigment or a dye.

When the adhesive strengths, derived from the pressure-sensitive adhesive layers, between the respective overlying and underlying layers are equal to one another, the separation site cannot be determined. Therefore, preferably, the adhesive strength, in the portion where the separation should first occur, is made the lowest, the adhesive strength, in the portion where the separation should secondly occur, is made the next lowest, and the adhesive strength, in the portion where the separation should last occur, is made the highest.

Second Invention

Figure 7:
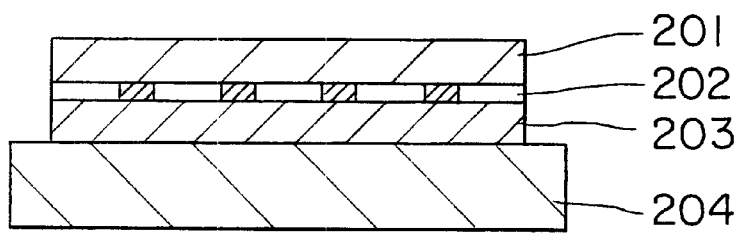
FIG. 7 is a cross-sectional view showing a basic structure of a hologram laminate.

As shown in FIG. 7, the hologram laminate according to the present invention basically comprises a volume hologram layer 201, a transparent film 203 having, for example, information 202 recorded on its upper surface, and an adherend substrate 204 stacked in that order onto of one another from the surface side.

The term "transparent" means that an article located at the opposite side of the hologram laminate is seen through the adherend substrate 204, and, hence, refers to not only a colorless, transparent state but also a colored, transparent state.

In the laminate according to the present invention, a hologram has been stacked which is difficult to forge. In addition, information 202 inherent to each of the same type of adherends is provided on a transparent film, and sandwiched between the upper and lower adherends. Therefore, it is impossible to separate only the hologram layer which is then applied to another card to pretend to be a genuine one. Alternatively, the volume hologram layer 201 may be stacked as a lower layer, and the transparent film having information 202 recorded thereon may be stacked thereon. However, when the information 202 is stacked as an upper layer, the forgery and alteration are easier than the stacking of the information as the lower layer. Therefore, stacking of the volume hologram layer 201 on the information is preferred.

In an actual hologram laminate, in consideration of various requirements and the convenience of the preparation, various variation of and addition of various layers to the hologram laminate shown in FIG. 7 may be carried out.

Figure 8:
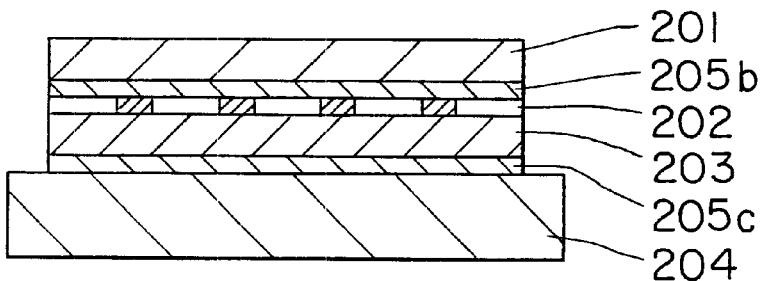
FIG. 8 is a cross-sectional view showing an embodiment of a hologram laminate wherein layers constituting the hologram laminate have been stacked on top of one another through a transparent pressure-sensitive adhesive layer.
Figure 9:
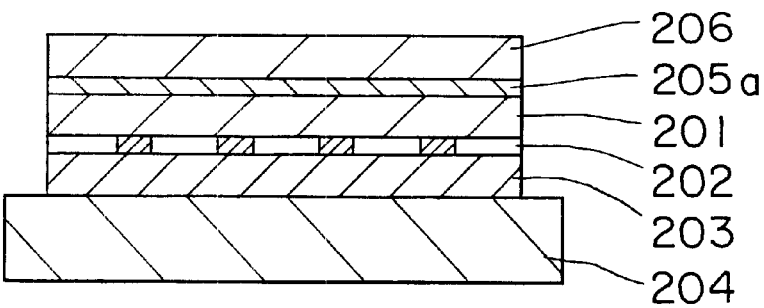
FIG. 9 is a cross-sectional view showing an embodiment of a hologram laminate with a transparent protective film stacked thereon.
Figure 10:
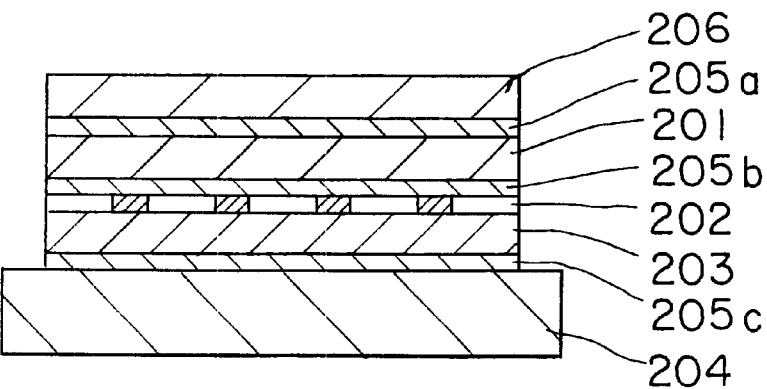
FIG. 10 is a cross-sectional view showing an embodiment of a hologram laminate with a transparent protective film and a transparent pressure-sensitive adhesive layer stacked thereon.

Examples of such variations and addition of layers are shown in FIGS. 8 to 10.

A transparent pressure-sensitive adhesive layer may be stacked between the volume hologram layer 201 and the information 202 and/or between the transparent film 203 and the adherend substrate 204. As shown in FIG. 8, for identification, the former is indicated by a reference character 205b, and the latter is indicated by a reference character 205c.

Further, a transparent protective film 206 may be stacked onto the volume hologram layer 201 for protection purposes. The transparent protective film 206 may be stacked on the volume hologram layer 201 directly or through a transparent pressure-sensitive adhesive layer 205a.

FIG. 10 shows an embodiment wherein all of various variations and addition of layers described above with reference to FIGS. 8 and 9 are included. Specifically, a transparent protective film 206, a transparent pressure-sensitive adhesive layer 205a, a volume hologram layer 201, a transparent pressure-sensitive adhesive layer 205b, information 202, a transparent film 203, a transparent pressure-sensitive adhesive layer 205c, and an adherend substrate 204 are stacked in that order on top of one another from the surface side.

For facilitating the understanding of the laminate according to the present invention, the adherend substrate 204, the volume hologram layer 201, the transparent film 203 and information 202, the transparent pressure-sensitive adhesive layers (205a, 205b, and 205c), and the transparent protective film 206 will be described in that order in more detail.

As described above in connection with the "Problems to be solved by the invention," the adherend substrate 204 is typically an ID (ID being an abbreviation to identity or "identification" which means an act of identifying) card, such as a credit card, a bank card, or an identification card.

Even credit cards, which are of the same grade issued by the same credit company, may be objects of the present invention so far as the cards can have inherent information, such as a photograph of the face of the card holder and an autograph of the card holder.

Further, for example, paper money, various gold notes, membership cards, permits, and production certificates and quality certificates having production numbers, which can have a series of numbers strictly controlled so as not to avoid the repetition, may also be objects of the present invention.

In the case of ID cards, such as credit cards, bank cards, or identification cards, the adherend substrate 4 is formed of a sheet, such as a polyvinyl chloride resin, polyester, or polyolefin (for example, polyethylene or polypropylene) sheet. The adherend substrate 4 is often a composite laminate sheet of the same or dissimilar plastics. The adherend substrate 4 may have information selected from printed letters or patterns, imprints (relief letters), magnetic recording layers, ICs or LSIS, optical recording layers, autograph entry columns, photograph application columns, or have portions which can have information.

The paper money, various gold notes, membership cards, permits, and quality certificates having production numbers are in many cases made of paper or plastic. Alternatively, they may be made of a metal or wood. When the products directly have a carved seal or in an integrally molded form, they may be made of stone, such as marble, in addition to a metal or plastic. When the product has a case or a cover which has a display or an indication, acrylic or other transparent plastic plates or glass plates, cloths, leathers and the like may also be used as the adherend substrate 4.

The volume hologram 201 may be prepared by various materials and methods.

Materials used for the mass duplication of the hologram include conventional hologram recording materials, such as silver salt materials, bichromated gelatin emulsions, photopolymerizable resins, and photocrosslinkable resins.

According to the present invention, from the viewpoint of production efficiency, the duplication of the volume hologram is preferably carried out by a method which comprises providing, as a hologram-forming resin composition, a photosensitive material for dry type volume phase hologram recording applications, comprising (1) a matrix polymer, (2) a photopolymerizable compound, (3) a photopolymerization initiator, and (4) a sensitizing dye, applying the hologram-forming resin composition onto a suitable substrate to form a hologram-forming resin composition layer, and applying hologram information of an original plate for a volume hologram to the hologram-forming resin composition layer to duplicate the volume hologram.

Matrix polymers (1) usable as the component of the photosensitive material include poly(meth)acrylic esters or partial hydrolyzates thereof, polyvinyl acetate or hydrolyzates thereof, polyvinyl alcohol or partial acetalization products thereof, triacetylcellulose, polyisoprene, polybutadiene, polychloroprene, silicone rubber, polystyrene, polyvinyl butyral, polychloroprene, polyvinyl chloride, chlorinated polyethylene, chlorinated polypropylene, poly-N-vinylcarbazole or derivatives thereof, poly-N-vinylpyrrolidone or derivatives thereof, copolymer of styrene with maleic anhydride or semi-esters thereof, and copolymers using, as a comonomer, at least one monomer selected from copolymerizable monomers, such as acrylic acid, acrylic esters, methacrylic acid, methacrylic esters, acrylamide, acrylonitrile, ethylene, propylene, vinyl chloride, and vinyl acetate, and mixtures of the above polymers. Preferred are polyisoprene, polybutadiene, polychloroprene, polyvinyl alcohol or partial acetalization products of polyvinyl alcohol, e.g., polyvinyl acetal, polyvinyl butyral, polyvinyl acetate, and vinyl chloride/vinyl acetate copolymer, or mixtures of the above polymers.

The recorded hologram may be stabilized through monomer transfer by heating. To this end, the matrix polymer preferably has a relatively low glass transition temperature and can facilitate the monomer transfer.

Photopolymerizable compounds (2) usable as the component of the photosensitive material include photopolymerizable, photocrosslinkable monomers, oligomers, and prepolymers having at least one ethylenically unsaturated bond per molecule which will be described later, and mixtures of the above compounds, for example, unsaturated carboxylic acids and salts thereof, esters of unsaturated carboxylic acids with aliphatic polyhydric alcohol compounds, and compounds in which unsaturated carboxylic acids are linked to aliphatic polyamine compounds by an amide linkage.

Specific examples of monomers of unsaturated carboxylic acids include acrylic acid, methacrylic acid, itaconic acid, crotonic acid, isocrotonic acid, maleic acid, and halogen-substituted unsaturated carboxylic acids, for example, chlorinated unsaturated carboxylic acids, brominated unsaturated carboxylic acids, and fluorinated unsaturated carboxylic acids. Salts of unsaturated carboxylic acids include sodium and potassium salts of the above acids.

Specific examples of monomers of esters of aliphatic polyhydric alcohol compounds with unsaturated carboxylic acids are as follows.

Since there are a large number of examples, the specific examples will be classified into acrylic esters and methacrylic esters.

At the outset, acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl) ether of bisphenol A, ethoxylated bisphenol A diacrylate, 2-(1-naphthyloxy)ethyl acrylate, and o-biphenyl acrylate.

Methacrylic esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl]dimethylmethane, bis-[p-(acryloxyethoxy)phenyl]dimethylmethane, 2,2-bis(4-methacryloyloxyphenyl)propane, and 2-naphthyl methacrylate.

Regarding specific examples of monomers of esters of aliphatic polyhydric alcohol compounds with unsaturated carboxylic acids, itaconic esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Regarding specific examples of monomers of esters of aliphatic polyhydric alcohol compounds with unsaturated carboxylic acids, crotonic esters include ethylene glycol dicrotonate, tetramethylene glycol dicrotonate, pentaerythritol dicrotonate, and sorbitol tetracrotonate.

Regarding specific examples of monomers of esters of aliphatic polyhydric alcohol compounds with unsaturated carboxylic acids, isocrotonic esters include ethylene glycol diisocrotonate, pentaerythritol diisocrotonate, and sorbitol tetraisocrotonate.

Regarding specific examples of monomers of esters of aliphatic polyhydric alcohol compounds with unsaturated carboxylic acids, maleic esters include ethylene glycol dimaleate, triethylene glycol dimaleate, pentaerythritol dimaleate, and sorbitol tetramaleate.

Halogenated unsaturated carboxylic acids usable herein include 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (NK Ester DBN (tradename), manufactured by Shin-Nakamura Chemical Co., Ltd.), dibromopropyl acrylate (NK Ester A-DBP (tradename), manufactured by Shin-Nakamura Chemical Co., Ltd.), dibromopropyl methacrylate (NK Ester DBP (tradename), manufactured by Shin-Nakamura Chemical Co., Ltd.), methacrylic acid chloride, 2,4,6-trichlorophenyl methacrylate, p-chlorostyrene, methyl 2-chloroacrylate, ethyl 2-chloroacrylate, n-butyl-2-chloroacrylate, tribromophenol acrylate, and tetrabromophenol acrylate.

Specific examples of monomers of compounds, in which unsaturated carboxylic acids are linked to aliphatic polyamine compounds by an amide linkage, include methylenebisacrylamide, methylenebismethacrylamide, 1,6-hexamethylenebisacrylamide, 1,6-hexamethylenebismethacrylamide, diethylenetriamine trisacrylamide, xylylenebisacrylamide, xylylenebismethacrylamide, N-phenylmethacrylamide, and diacetoneacrylamide.

Other examples include polyisocyanate compounds having two or more isocyanate groups per molecule described in Japanese Patent Publication No. 41708/1973 and vinyl urethane compounds having two or more polymerizable vinyl groups per molecule with a hydroxyl-containing vinyl monomer represented by formula $CH_2=C(R)COOCH_2(R')OH$ (wherein R and R' each independently represent a hydrogen or a methyl group) being added thereto.

Urethane acrylates described in Japanese Patent Laid-Open No. 37193/1976 and polyester acrylates and polyfunctional acrylates and methacrylates, prepared from epoxy groups and (meth)acrylic acid or the like, described in Japanese Patent Laid-Open No. 64183/1973 and Japanese Patent Publication Nos. 43191/1974 and 30490/1977 may also be used.

Further, compounds introduced as photocurable monomers and oligomers in Journal of the Adhesion Society of Japan, Vol. 20, No. 7, 300–308 may also be used.

Regarding other examples, phosphorus-containing monomers include: mono(acryloyloxyethyl) acid phosphate (Light Ester PA (tradename), manufactured by Kyoeisha Chemical Co., Ltd.) and mono(2-methacryloyloxyethyl) acid phosphate (Light Ester PM (tradename), manufactured by Kyoeisha Chemical Co., Ltd.); and epoxy acrylate monomers (Ripoxy VR-60 (tradename), manufactured by Showa High Polymer Co., Ltd.; and Ripoxy VR-90 (tradename), manufactured by Showa High Polymer Co., Ltd.).

Further, NK Ester M-230G (tradename) manufactured by Shin-Nakamura Chemical Co., Ltd. and NK Ester 23G (tradename) manufactured by Shin-Nakamura Chemical Co., Ltd. are usable.

Further examples of monomers include: a triacrylate having a structure represented by formula

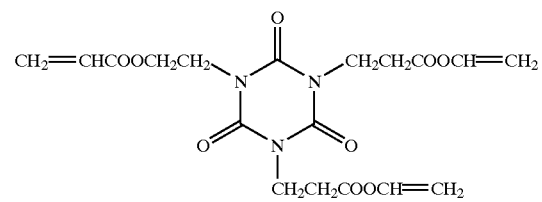

(tradename: Aronix M-315, manufactured by Toa Gosei Chemical Industry Co., Ltd.); a triacrylate having a structure represented by formula

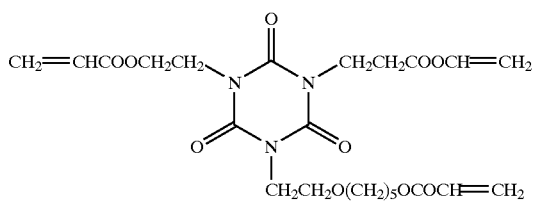

(tradename: Aronix M-325, manufactured by Toa Gosei Chemical Industry Co., Ltd.); 2, 2'-bis(4-acryloxydiethoxyphenyl)propane (NK Ester A-BPE-4 (tradename); and tetramethylolmethane tetraacrylate (NK ester A-TMMT (tradename) manufactured by Shin-Nakamura Chemical Co., Ltd.).

Photopolymerization initiators (3) usable as the component of the photosensitive material include, for example, 1,3-di(t-butyldioxycarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isoxazolone, 2-mercaptobenzimidazole, and dimers of imidazole.

Preferably, the photopolymerization initiator is decomposed after recording of the hologram from the viewpoint of stabilizing the recorded hologram. For example, an organic peroxide system is preferred because it can be easily decomposed upon ultraviolet irradiation.

Sensitizing dyes (4) usable as the component of the photosensitive material include, for example, dyes having absorption of light at 350 to 600 nm, such as thiopyrilium salt, merocyanine, quinoline, styrylquinoline, ketocoumarin, thioxanthene, xanthene, oxonol, cyanine, rhodamine, thiopyrilium salt, pyrilium ion, and diphenyliodonium ion dyes. Sensitizing dyes having absorption of light in a wavelength region of not more than 350 nm or not less than 600 nm may also be used.

In the volume hologram-forming resin composition comprising (1) the matrix polymer, (2) the photopolymerizable compound, (3) the photopolymerization initiator, and (4) the sensitizing dye, the mixing ratio (parts by weight based on 100 parts by weight of the matrix polymer) of the components is as follows.

The amount of the photopolymerizable compound (2) used is 10 to 1,000 parts by weight, preferably 10 to 100 parts by weight.

The amount of the photopolymerization initiator (3) used is 1 to 10 parts by weight, preferably 5 to 10 parts by weight.

The amount of the sensitizing dye (4) used is 0.01 to 1 part by weight, preferably 0.01 to 0.5 part by weight.

Other components usable in the hologram-forming resin composition include, for example, plasticizers, glycerin, diethylene glycol, triethylene glycol, and various nonionic surfactants, cationic surfactants, and anionic surfactants.

The hologram-forming resin composition is added to a solvent, such as acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, or isopropanol, or a mixed solvent composed of the above solvents to prepare a coating liquid having a solid content of about 15 to 25%.

The coating liquid may be coated onto a suitable substrate by bar coating, spin coating, dipping or the like, or alternatively by gravure roll coating, roll coating, die coating, Komma coating or the like to form a coating which is then dried to a hologram-forming resin composition layer. Thus, a hologram-forming photosensitive material is prepared.

Specific examples of substrates usable for the preparation of the hologram-forming photosensitive material include glass plates, plastic plates, such as acrylic resin plates, and plastic films, such as films of polyethylene terephthalate, polyethylene, polypropylene, polyvinyl chloride, acryl, triacetylcellulose, and cellulose acetate butyrate. The substrate preferably has high smoothness. When the substrate as such is used as a part of the laminate, the substrate preferably has high transparency.

Alternatively, an embodiment may be used wherein two substrates are provided and a hologram-forming resin composition layer is formed between these two substrates. In this case, the substrate, through which light for exposure enters, should be transparent. When two substrates are used, the laminate composed of a hologram-forming resin composition layer sandwiched between two substrates may be produced as follows and be used as the photosensitive material. The hologram-forming resin composition may be coated onto one of or both the substrates and, immediate after the coating, both the substrates are put on top of each other followed by pressing. Alternatively, a method may be used wherein, after the coating is solidified by drying or curing means according to the coating liquid, both the substrates are put on top of each other followed by pressing, if necessary, while heating. In this case, preferably, the substrates are linearly brought into contact with each other little by little while somewhat bending the substrates so as to avoid entry of air bubbles and so as to avoid the contact of the whole area at a time. It is also possible to use a method which comprises coating the hologram-forming resin composition by means of a spinner onto one of the substrates and, immediately after that, putting the other substrate on the coating followed by rotation of the assembly.

The thickness of the hologram-forming resin composition layer is generally 0.1 to 50 µm, preferably 5 to 20 µm.

Except for the use of two substrates, a protective film is preferably stacked onto the exposure surface of the hologram-forming resin composition layer. This protective film may also serve as a transparent protective film 206 described below.

Protective films usable herein are highly transparent, highly smooth resin films having a thickness of 1 µm to 1 mm, preferably 10 to 100 µm, and examples thereof include polyethylene terephthalate films, polyethylene films, polypropylene films, polyvinyl chloride films, acrylic films, triacetylcellulose films, and cellulose acetate butyrate films. The protective film may be laminated onto the volume hologram-forming material by means of a rubber roller or the like.

Alternatively, instead of the lamination of the transparent resin film, a coating composition with a film-forming material, such as triacetylcellulose, polyvinyl alcohol, or polymethyl methacrylate, dissolved therein may be coated by spin coating or the like to form a protective film.

The protective film may be formed of a thermoplastic resin. Alternatively, the protective film may be formed by providing a thermosetting resin composition using a thermosetting resin or an ionizing radiation-curable resin composition curable upon ultraviolet light or electron beam irradiation, coating the composition, and heating the coating or applying an ionizing radiation to cure the coating by crosslinking to form a film having further improved physical and chemical various properties. In this case, when the hologram-forming photosensitive material is exposed followed by development by heating or the like, the protective film can prevent the expansion and contraction of the hologram-forming resin composition layer. When the protective film is regulated in its adhesion to the hologram-forming resin composition layer and releasably stacked, the protective film may be separated from the hologram-forming photosensitive material at the time of exposure.

In the hologram-forming photosensitive material, an antireflection layer may be provided on the backside of the substrate. This antireflection layer may be preferably formed of a material having a refractive index equal to or slightly different from the substrate, the hologram-forming resin composition layer, and the optional protective layer.

In order to prevent the reflection of light for exposure, the antireflection layer is preferably colored with a colorant, such as a dye capable of absorbing the wavelength of the light for exposure.

Exposure using an original plate for a volume hologram may be used as a method using the hologram-forming photosensitive material, for the production of a plate for the duplication of volume holograms or for the mass duplication of volume holograms.

The original plate for a volume hologram used is either the following original plate (1) or the following original plate (2). Specifically, (1) an original plate obtained by performing calculation by means of a computer so as to provide necessary properties and then performing exposure based on the calculation results by means of an electron beam exposure system; and (2) an original plate obtained by duplicating the volume hologram formed by the method (1) onto a hologram-forming resin composition layer on the substrate described below.

Both the plates obtained above may be used as the original plate for a volume hologram. In general, preferably, the plate (1) is duplicated to prepare several original plates (2) for the duplication which are used for the duplication of volume holograms.

The original plate for a volume hologram and the hologram-forming photosensitive material according to the present invention are provided, and exposure is generally carried out in such a state that an index matching liquid is interposed between the original plate and the hologram-forming photosensitive material. In the exposure, for example, a laser beam, such as an argon laser beam (wavelength 514.5 nm), is applied. This exposure causes interference of light, diffracted by the original plate for a volume hologram, with light which went straight without diffraction, thus providing hologram information in the hologram-forming resin composition layer.

After the exposure, the step of applying ultraviolet light at 0.1 to 10,000 $mJ/cm^2$, preferably 10 to 1,000 $mJ/cm^2$, from a light source, such as an ultrahigh-pressure mercury lamp, a high-pressure mercury lamp, a carbon arc lamp, a xenon arc lamp, or a metal halide lamp, to decompose the photopolymerization initiator and the step of heating, for example, the step of heating the assembly at 120° C. for 24 min to diffuse and move the photopolymerizable compound, are successively carried out to prepare a stable volume hologram. These ultraviolet irradiation and the heating are stabilization step and are also development step.

After the above steps, a duplicate of the original volume hologram is formed. The volume hologram thus obtained may be used as a product. Alternatively, the volume hologram may be used as an original plate for further duplicating a large quantity of volume hologram.

The volume hologram thus obtained has the substrate and optionally the protective film and the reflection layer. The volume hologram as such may be used so far as the whole volume hologram is transparent. Alternatively, all the layers may be separated to leave only the volume hologram layer which is independently used.

The volume hologram 201 may be colored and transparent so far as this does not pose any problem in the production thereof.

Next, a transparent film 203 having information 202 will be described.

The most typical example of this embodiment is such that an autograph of the holder of an ID card, such as a credit card, is provided on a transparent plastic sheet, or such that a photograph of the face of the card holder is stacked or printed. In the case of credit cards, fingerprints may also be utilized as information 202. The photograph of the face may be a conventional silver salt photograph applied onto the film or alternatively may be one formed by dye transfer or the like. For example, in the issue of credit cards or licenses, after a photograph-like image is formed by dye transfer or the like, one signature may be written in the place, followed by lamination. This can improve the forgery preventive effect.

Besides the above examples, a series of numbers controlled so as not to repeat the same number may also be utilized as the information 202. Further, numbers and other information may be recorded in the form of infrared-sensitive transparent bar codes.

The transparent film 203 has the above information 202.

A preferred material for the transparent film 203 has high transparency and adhesion and flexibility suitable for working. More specifically, the material may be selected from those described above as substrates and protective films for photosensitive materials used in the preparation of holograms.

The form of the provision of the information 202 in the transparent film 203 may be classified roughly into several types, for example, a type wherein the information is directly recorded, and a type wherein information recorded on other sheet is stacked. The information may be recorded on the front side or backside of the transparent film or the front side or backside of other sheet. When the information recorded on other sheet is stacked, this may be stacked on the front side or backside of the transparent film 203.

An autograph is generally written on the front side of the transparent film 203 or other sheet with a ballpoint pen or a fountain pen. An autograph is written on the backside, the left and right of the letter are reversed. Since, however, writing a skillfully forged signature of the signature written on the backside is considerably difficult, the forgery of the signature is advantageously difficult. When the left and light of the letter are reversed, for comparison with an autograph in a correct direction on other document, the signature may be viewed with the left and right of the letter being reversed by an optical system or a mirror or by image processing.

In order to improve the writing quality in an autograph, the surface may be roughened, or alternatively, a writing layer formed by coating a coating composition with fine particles, such as silica, being incorporated therein is provided, and an autograph is written thereon. Upon the stacking of the pressure-sensitive adhesive layer described below, the autograph preferably becomes substantially transparent. Alternatively, other sheet with an autograph written thereon may be applied.

A photograph or a fingerprint formed on other sheet may be applied. The formation thereof on other sheet or the formation thereof directly on the transparent film 203 may be printed using a transparent ink. The term "printing" used herein connotes printing by means of a printer connected to a computer.

Besides the above examples, a series of numbers controlled so as not to repeat the same number may also be utilized as the information 202. Further, numbers and other information may be recorded in the form of infrared-sensitive transparent bar codes. These photograph, fingerprint, bar code and the like may also be formed on the backside of the transparent film 203 or other sheet. The left and right of the image may be reversed.

Other sheet with the information formed thereon may be stacked onto the front side or backside of the transparent film 203.

The above other sheet and/or the transparent film 203 may be colored and transparent.

Transparent pressure-sensitive adhesive layers 205 (205a, 205b, and 205c) function respectively to conduct bonding between the transparent protective film 206 and the volume hologram layer 201, bonding between the volume hologram layer 201 and the transparent film 203 having information 202, and bonding the transparent film 203, on which an autograph or the like is written, and the adherend substrate 204.

According to the present invention, the transparent pressure-sensitive adhesive layers 205 (205a, 205b, and 205c) may be colored and transparent so far as any problem associated with the production or the use is not posed.

Pressure-sensitive adhesives usable for constituting the transparent pressure-sensitive adhesive layers 205 (205a, 205b, and 205c) include, for example, acrylic resin, acrylic ester resin or acrylic or acrylic ester copolymer, styrene-butadiene copolymer, naturally occurring rubbers, casein, gelatin, rosin ester, terpene resin, phenolic resin, styrene resin, coumarone-indene resin, polyvinyl ether, and silicone resin. Additional examples thereof include α-cyanoacrylate, silicone, maleimide, styrol, polyolefin, resorcinol, polyvinyl ether, and silicone adhesives.

Besides the above pressure-sensitive adhesives, heat sealant may be used as the pressure-sensitive adhesive for constituting the transparent pressure-sensitive adhesive layers 205, and examples thereof include ethylene/vinyl acetate copolymer resin, polyamide resin, polyester resin, polyethylene resin, ethylene/isobutyl acrylate copolymer resin, butyral resin, polyvinyl acetate or vinyl acetate copolymer resin, cellulose derivative, polymethyl methacrylate resin, polyvinyl ether resin, polyurethane resin, polycarbonate resin, polypropylene resin, epoxy resin, and phenolic resin.

Alternatively, thermoplastic elastomers, such as SBS (styrene-butadiene-styrene block copolymer), SIS (styrene-isoprene-styrene block copolymer), and SEBS (styrene-ethylene-butylene-styrene block copolymer), reactive hot-melt resins and the like may be used.

According to the hologram laminate of the present invention, when individual layers are directly heat fused to one another without relying upon the pressure-sensitive adhesive, a structure as shown in FIG. 7 may be provided. In this case, however, the materials used are limited. In addition, in this layer construction, that is, the provision of the information 202 on the transparent film 203 and the stacking of the volume hologram layer 201 on the information require a system for heat fusing for each issue or for each place for issue. By contrast, the layer construction through a pressure-sensitive adhesive which enables bonding by mere pressing can be more easily provided. In particular, the provision of the transparent pressure-sensitive adhesive layers 205b, 205c is preferred. The volume hologram layer 201, when heated, is likely to be stretched. This changes the lattice spacing in diffraction grating of the hologram, leading to a fear of the contemplated hologram being reproduced. Therefore, if possible, the application thereof onto other article through a pressure-sensitive adhesive layer is preferred.

For the adhesive strength of the transparent pressure-sensitive adhesive layers 205a, 205b, and 205c, the higher, the better. According to the laminate of the present invention, however, the separation of the information 202 from the volume hologram layer 201 deteriorates the forgery preventive effect. Therefore, bonding between the volume hologram layer 201 and the transparent film 203 or, when a layer having information 202 is stacked onto the transparent film 203, bonding between the volume hologram layer 201 and the information 202 is preferably strong.

In this sense, when layers are stacked on top of each other though an adhesive, at least the adhesive strength, derived from the transparent pressure-sensitive adhesive layer 205b, between the volume hologram layer 201 and the information 202 or between the volume hologram layer 201 and the transparent film 203 is larger than the adhesive strength, derived from the transparent pressure-sensitive adhesive layer 205c, between the adherend substrate 204 and the transparent film 203.

When the transparent protective film 206, which is optionally stacked onto the outermost surface, and the volume hologram layer 201 are stacked on top of each other with the aid of the transparent pressure-sensitive adhesive layer 205a, the adhesive strength derived from transparent pressure-sensitive adhesive layer 205a is preferably lower than at least the adhesive strength derived from the transparent pressure-sensitive adhesive layer 205b or lower than the adhesive strength derived from the transparent pressure-sensitive adhesive layer 205c, so that an attempt to conduct separation causes the separation of the transparent protective film 206 alone.

The magnitude of the adhesive strength of the transparent pressure-sensitive adhesive layers 205 may be regulated by a method wherein different pressure-sensitive adhesives having different adhesive strengths are used for respective pressure-sensitive adhesive layers, a method wherein pressure-sensitive adhesives having different adhesive strengths are mixed together to prepare two mixed adhesives having different mixing ratios which are then used to create a suitable adhesive strength difference, or a method wherein a pressure-sensitive adhesive common to two adhesives is provided as a main component and the amounts of a crosslinking agent, such as an isocyanate crosslinking agent, and a tackifier resin added to the pressure-sensitive adhesive are varied to create an adhesive strength difference between the two adhesives.

There are several methods for applying the pressure-sensitive adhesive to conduct bonding. One of the methods comprises coating any one of or both bonding faces with the pressure-sensitive adhesive, optionally drying the coating, and applying both layers to each other. At the time of the application, if necessary, heating may be carried out.

Another method comprises coating the pressure-sensitive adhesive onto the surface of a releasable sheet having a releasable surface, called "separator", applying the coated sheet onto any bonding face, separating the separator after the application, and applying other bonding face to the surface of the pressure-sensitive adhesive exposed by the separation. When the application is carried out immediately after the coating of the pressure-sensitive adhesive onto the separator, the use of a single separator suffices for satisfactory results. However, it is also possible to use a method, using a "double face adhesive tape," which comprises sandwiching a pressure-sensitive adhesive layer between two separators, removing one of the separators, conducting bonding, removing the other separator, and conducting bonding. A suitable method may be selected and used according to need. In the case of the "double face adhesive tape," a nonwoven fabric or a transparent plastic film may be interposed between the pressure-sensitive adhesive layers so far as the nonwoven fabric or the transparent plastic film is transparent at the time of the lamination.

The transparent protective film 206 functions to improve the physical and chemical properties of the volume hologram layer 201 in its surface and is preferably a transparent plastic film, and materials usable therefor are the same as those described above as materials for the transparent film 203 on which an autograph is written or a photograph of the face is applied.

The transparent protective film 206 also may be colored and transparent.

If necessary, the transparent protective film 206 has on its surface a protective layer. The protective layer may be formed of a thermoplastic resin. Preferably, however, the protective layer is formed by providing a thermosetting resin composition using a thermosetting resin or an ionizing radiation-curable resin composition curable upon ultraviolet light or electron beam irradiation, coating the composition, and heating the coating or applying an ionizing radiation to cure the coating by crosslinking to form a film having improved physical and chemical various properties.

In the production of the hologram laminate according to the present invention, fundamentally, the transparent film 203 is applied onto the adherend substrate 204, followed by recording of information. An alternative method is such that information 202 is previously recorded on the transparent film 203, the recorded transparent film 203 is applied onto the adherend substrate 204, followed by the formation of the volume hologram layer 201 thereon.

Stacking of a pressure-sensitive adhesive layer on the underside of the transparent film 203 used is preferred.

The volume hologram layer 201 preferably has on its underside a pressure-sensitive adhesive layer and on its upper side a transparent protective film 206 preferably through a pressure-sensitive adhesive layer.

Accordingly, the most preferred method is as follows.

At the outset, two labels are provided. One of the labels is a hologram label wherein a transparent protective film 206, a first transparent pressure-sensitive adhesive layer 205a, a volume hologram layer 201, and a second transparent pressure-sensitive adhesive layer 205b are stacked in that order from the surface side on top of one another. The other label is a transparent pressure-sensitive adhesive label wherein a transparent pressure-sensitive adhesive layer 205c is stacked onto a transparent film 203.

The transparent pressure-sensitive adhesive label is first stacked onto the surface of the adherend substrate 204. Thereafter, information is recorded on the transparent pressure-sensitive adhesive label. Conversely, information may be recorded on the transparent pressure-sensitive adhesive label, followed by stacking of the recorded transparent pressure-sensitive adhesive label onto the surface of the adherend substrate 204. Thereafter, the hologram label is stacked thereon so that the second transparent pressure-sensitive adhesive layer 205b faces the recorded transparent pressure-sensitive adhesive label.

In this case, as described above, the two transparent pressure-sensitive adhesive layers 205b and 205c are made different from each other in adhesive strength.

Third Invention

FIGS. 11 to 20 each are cross-sectional views of hologram composites or hologram laminates according to the present invention.

The hologram composite according to the present invention is not limited to a hologram composite wherein a hologram is stacked onto a substrate, and includes any form of hologram composite so far as the hologram is anchored to and integrated with the substrate, such as a hologram composite wherein a hologram is fitted into a substrate, and a hologram composite wherein a hologram is embedded in a substrate.

FIG. 11 is a cross-sectional view of a hologram composite comprising: a substrate 301 having decoration 302 on a part of the surface thereof, the substrate 301 having in a part thereof a cut off portion passed therethrough; and a volume hologram layer 303 fitted into the cut off portion. In the hologram composite shown in FIG. 11, in fitting the volume hologram layer 303 into the cut off portion, an adhesive is applied to a portion where the substrate 301 comes into contact with the volume hologram layer 303, or alternatively, the volume hologram layer 303 is integrated with the substrate 301 by induction heating or the like.

The term "cut off portion" as used herein refers to "cut off portion passed though the substrate" and excludes a mere cavity not passed through the substrate.

FIG. 12 is a cross-sectional view of a hologram composite comprising: a relatively thick substrate 301 having thereon decoration 302, the substrate 301 having a cut off portion; a volume hologram layer 303 fitted into the cut off portion; and a relatively thin another substrate 301' stacked on the whole underside of the substrate. According to this construction, the fixation of the volume hologram layer 303 to the substrate becomes more strong.

As with the hologram composite shown in FIG. 11, in the hologram composite shown in FIG. 12, the substrate 301 can be integrated with the volume hologram layer 303 by the application of an adhesive along the shape of the cut off portion or by induction heating. However, the integration of the upper side of the substrate 301' with the volume hologram layer 303 and the integration of the upper side of the substrate 301' with the decoration 302 are preferably carried out by heat fusing or by interposing an adhesive, such as a transparent pressure-sensitive adhesive between the two materials. The hologram composite shown in FIG. 12 also has decoration 302 in a part of the substrate 301.

The hologram composite shown in FIG. 12 is assumed to be viewed from the upper surface. When viewing from the lower surface is contemplated, the substrate 301' should be transparent. The substrate 301' in FIG. 12 may be disposed on the upper surface of the whole area including the substrate 301 and the decoration 302. In this case, the substrate 301' should be transparent. The term "transparent" as used herein means that the opposite side of the substrate 301' is seen through the substrate 301'. Therefore, "transparent" refers to not only colorless transparent state but also colored transparent state.

The substrate 301' may be regarded as being integrated with the substrate 301 to constitute a composite substrate. The substrate 301' serves also as a protective layer for protecting the substrate 301, the decoration 302, or the volume hologram layer 303.

The cut off portion may be in any proper form, and examples thereof include polygons, such as triangle, quadrangle (including rectangle and square), pentagon, and hexagon, geometrical forms, such as circle and ellipse, and letters and designs. In this connection, the formation of the cut off portion is not limited to the formation thereof in the inside of the outward form of the substrate, and may be cut out from the corner or side of the substrate and notched.

Figure 14:
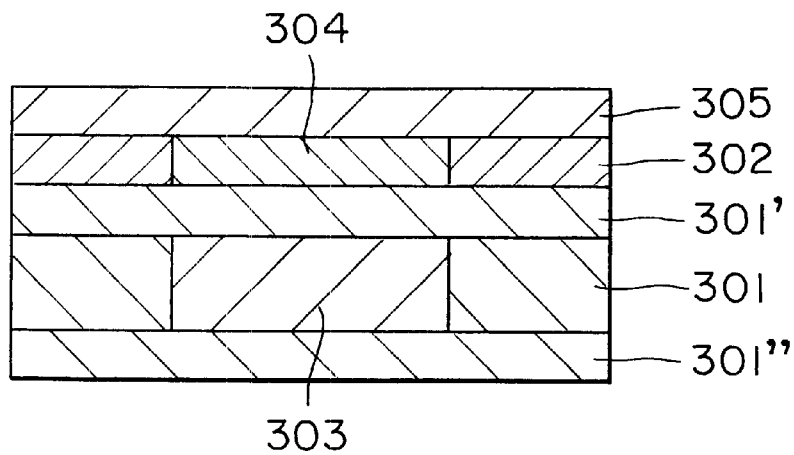
FIG. 14 is a cross-sectional view showing an embodiment of a hologram composite which has recorded information and includes a transparent protective layer.

FIGS. 13 and 14 show hologram composites. In these hologram composites, the substrate is a laminate substrate of three substrates, that is, a relatively thick substrate 301 and relatively thin substrates 301' and 301" stacked respectively on the front side and backside of the substrate 301. Among the substrates 301, 301' and 301", the thick substrate 301 as the core substrate has a cut off portion, and a volume hologram layer 303 is fitted into the cut off portion. As described above in connection with FIG. 12, one of the substrates 301' and 301", which is the observation side, should be transparent.

In all the hologram composites shown in FIGS. 11 to 14, decoration 302 is provided on the upper surface thereof in its portions free from the volume hologram layer 303. Further, the hologram composites shown in FIGS. 13 and 14 have information 304 recorded on the volume hologram layer 303 in its portion free from the decoration 302. The decoration 302 and/or the information 304 may be stacked between the substrate 301 and the thin substrate 301'. Alternatively, the decoration 302 and/or the information 304 may be stacked on the lower surface of the substrate 301", provided on the backside or between the substrate 301 and the substrate 301". When the information 304 is recorded later, a hologram composite may be previously provided wherein, in FIG. 13, decoration 302 is provided between the substrate 301 and the thin substrate 301', followed by recording of information 304.

When the decoration 302 and/or the information 304 are provided so that the opposite side is seen therethrough, they may be formed on the volume hologram layer 303 without posing any problem. When the size thereof is very small, they may be provided in any place without particular limitation.

FIG. 14 is a cross-sectional view of a hologram composite wherein a transparent protective layer 305 is stacked on the hologram composite shown in FIG. 13 so as to cover the whole uppermost surface thereof.

Figure 15:
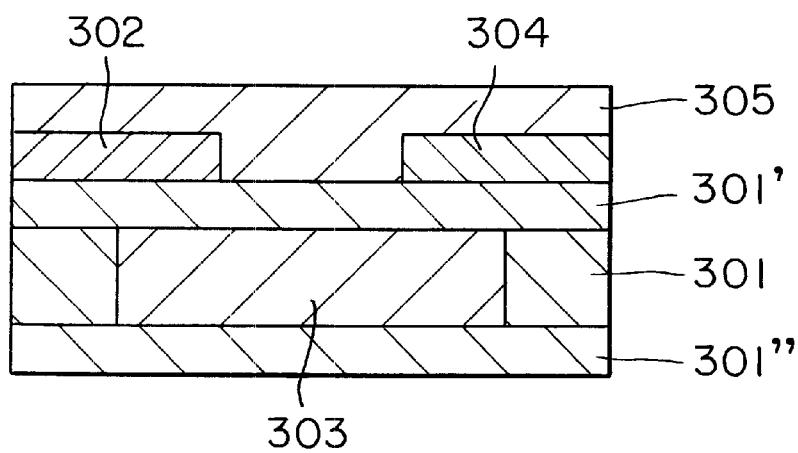
FIG. 15 is a cross-sectional view showing a variant of the hologram composite shown in FIG. 14.

FIG. 15 shows a hologram composite wherein the above-described elements have been collectively applied. The substrate is a laminate having a three-layer structure wherein the core substrate layer is thick with the upper and lower substrate layers being relatively thin. The core substrate layer 301 has a cut off portion, and a volume hologram layer 303 is fitted into the cut off portion. The substrate 301' and the substrate 301" are stacked respectively on the upper side and the lower side of the whole substrate 301 including the volume hologram layer 303. In this embodiment, at least the substrate 301' on the observation side is transparent.

Decoration 302 is provided above the volume hologram layer 303 on its left side, and information 304 is recorded above the volume hologram layer 303 on its right side. The decoration 302 and the information 304 have both a portion just under which the volume hologram layer 303 is present, and a portion just under which the volume hologram layer 303 is absent. The decoration 302 and/or the information 304 may be provided directly between the composite of the substrate 301 and the volume hologram layer 303 and the substrate 301', rather than on the upper surface of the substrate 301'.

When the information 304 is recorded later, previously provided a hologram composite having a structure such that the decoration 302 in FIG. 15 has been provided between the side defined by the substrate 301 and the volume hologram layer 303 and the thin substrate 301', followed by recording of the information 304.

In the above hologram composites, the decoration 302 and the information 304 have been provided on only one side of the substrate 301. However, the decoration 302 and the information 304 may be provided on both sides of the substrate 301. In this case, if necessary, the substrate 301" is transparent.

In structures described above with reference to FIGS. 12 to 15, bonding between the substrate 301' and the substrate 301 (or the volume hologram layer 303), bonding between the substrate 301" and the substrate 301 (or the volume hologram layer 303), covering of the uppermost surface with the transparent protective layer 305, and handwriting, printing or output from a printer on other sheet, rather than direct handwriting, printing, or output from a printer, are carried out with the aid of a transparent pressure-sensitive adhesive, the stacking is possible without use of any heating means.

In the embodiments described above with reference to FIGS. 11 to 15, the volume hologram layer 303 has been fitted into the substrate 301. On the other hand, in all embodiments described below with reference to FIGS. 16 to 20, the volume hologram layer 303 is stacked directly or indirectly on the substrate 301.

Figure 16:
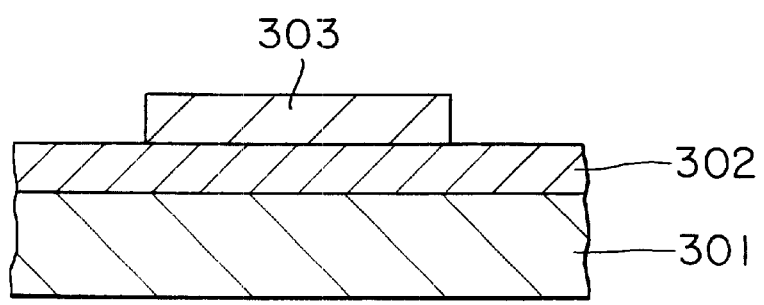
FIG. 16 is a cross-sectional view showing a basic structure of a hologram laminate.
Figure 17:
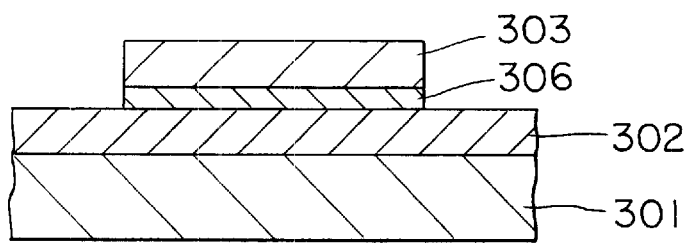
FIG. 17 is a cross-sectional view showing an embodiment of a hologram laminate wherein a hologram has been stacked through a transparent pressure-sensitive adhesive layer.
Figure 18:
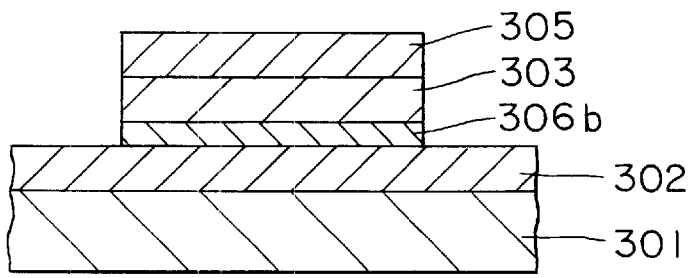
FIG. 18 is a cross-sectional view showing an embodiment of a hologram laminate with a transparent protective layer stacked thereon.

In the hologram laminate according to the present invention shown in FIG. 16, decoration 302 is provided on the substrate 301, and a volume hologram layer 303 is further stacked thereon. In this case, as shown in FIG. 17, the stacking of the volume hologram layer 303 may be carried out through a transparent pressure-sensitive adhesive layer 306b. As shown in FIG. 18, a transparent protective layer 305 may be stacked on the volume hologram layer 303.

Figure 19:
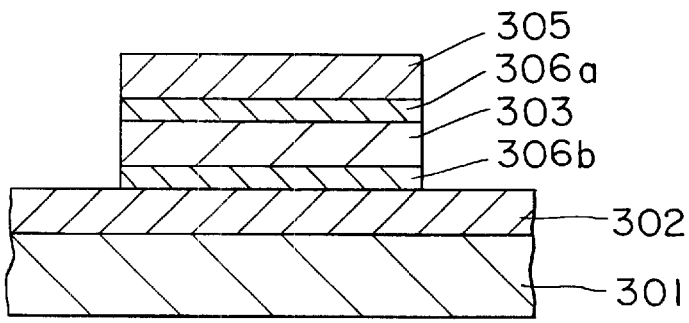
FIG. 19 is a cross-sectional view showing an embodiment of a hologram laminate with a transparent protective layer being stacked thereon through a transparent pressure-sensitive adhesive layer.

FIG. 19 shows a hologram composite wherein elements added to the hologram laminate of the present invention have been collectively provided. In this composite, decoration 302, a transparent pressure-sensitive adhesive layer 306b, a volume hologram layer 303, a transparent pressure-sensitive adhesive layer 306a, and a transparent protective layer 305 are stacked in that order on a substrate 301.

Figure 20:
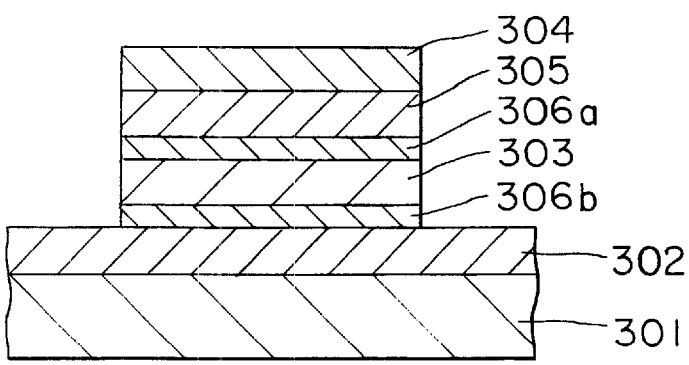
FIG. 20 is a cross-sectional view showing an embodiment of a hologram laminate with information recorded on the uppermost surface thereof.

Further, in the hologram laminate according to the present invention, as shown in FIG. 20, information 304 may be recorded on the uppermost surface of the hologram laminate shown in FIG. 19. In the hologram laminates shown in FIGS. 16 to 18, the information 304 may be recorded directly on the volume hologram layer 303 or on the uppermost surface (not shown).

In the hologram laminates shown in FIGS. 16 to 20, the volume hologram layer 303 and the like are stacked on the substrate 301 having the decoration 302 on its upper surface to form a convex portion. In all the drawings, the thickenss-swise direction is shown in an aggregated state, and, in fact, the convex portion is not so significant as shown in the drawings. When a flat surface is desired, the surface may be heat pressed to render the surface flat. Alternatively, a concave having a necessary depth may be previously formed in the substrate, followed by embedding of the volume hologram layer 303 and the like in the concave to render the surface flat.

Also in the hologram laminates shown in FIGS. 16 to 20, the decoration 302 and the information 304 may be provided on one side or both sides of the substrate 301.

For the hologram composite and hologram laminate according to the present invention, for facilitating the understanding, the substrate 301 and the decoration 302, the volume hologram layer 303, the information 304, the transparent protective layer 305, and the transparent pressure-sensitive adhesive layers 306 (306a and 306b) will be described in that order in detail.

The substrate 301 may be various articles with decoration described below.

Typical examples of substrates usable herein include ID (ID being an abbreviation to "identity" or "identification" which means an act of identifying) cards, such as credit cards, bank cards, or identification cards.

Cards, which are of the same grade and issued by the same company, the same bank, the corporation to which the holder of the card belongs and the like, such as ID cards, are particularly suitable as objects of the present invention so far as the cards can have inherent information, such as a photograph of the face of the card holder and an autograph of the card holder.

Further, for example, paper money, various gold notes, membership cards, permits, and production certificates and quality certificates having production numbers, which can have a series of numbers strictly controlled so as not to avoid the repetition, may also be objects of the present invention.

All the above objects have thereon decoration 302, such as ground color, ground tint, or pattern.

Materials for the substrate 301 will be described. In the case of ID cards, such as credit cards, bank cards, or identification cards, the substrate 301 is formed of a sheet, such as a polyvinyl chloride resin, polyester, or polyolefin (for example, polyethylene or polypropylene) sheet. The substrate 301 is often a composite laminate sheet of the same or dissimilar plastics. The substrate 301 generally has information selected from printed letters or patterns, imprints (relief letters), magnetic recording layers, ICs or LSIs, optical recording layers, autograph entry columns, photograph application columns, or have portions which can have information. Further, for example, when the substrate 301 is the so-called optical card having an optical recording layer, a hologram can be applied directly onto the optical recording layer because the hologram, when optical recording is carried out, is transparent to infrared light used.

When paper money, various gold notes, membership cards, permits, and quality certificates having production numbers are used as the substrate 301, they are in many cases made of paper or plastic. In this case, decoration 302 is provided by printing or embossing.

Other articles may be those made of, in addition to paper and plastics, metals, woods, stone, such as marble. In this case, they may have decoration 302, such as ground color, ground tint, or pattern, formed by surface working, such as printing, carved sealing, branding, or matte finishing.

The decoration 302 is generally a design, a pattern, or a solid print.

The volume hologram layer 303 may be prepared by various materials and methods.

Materials used for the mass duplication of the hologram include conventional hologram recording materials, such as silver salt materials, bichromated gelatin emulsions, photopolymerizable resins, and photocrosslinkable resins.

According to the present invention, from the viewpoint of production efficiency, the duplication of the volume hologram is preferably carried out by a method which comprises providing, as a hologram-forming resin composition, a photosensitive material for dry type volume phase hologram recording applications, comprising (1) a matrix polymer, (2) a photopolymerizable compound, (3) a photopolymerization initiator, and (4) a sensitizing dye, applying the hologram-forming resin composition onto a suitable substrate to form a hologram-forming resin composition layer, and applying hologram information of an original plate for a volume hologram to the hologram-forming resin composition layer to duplicate the volume hologram.

Matrix polymers (1) usable as the component of the photosensitive material include poly(meth)acrylic esters or partial hydrolyzates thereof, polyvinyl acetate or hydrolyzates thereof, polyvinyl alcohol or partial acetalization products thereof, triacetylcellulose, polyisoprene, polybutadiene, polychloroprene, silicone rubber, polystyrene, polyvinyl butyral, polychloroprene, polyvinyl chloride, chlorinated polyethylene, chlorinated polypropylene, poly-N-vinylcarbazole or derivatives thereof, poly-N-vinylpyrrolidone or derivatives thereof, copolymer of styrene with maleic anhydride or semi-esters thereof, and copolymers using, as a comonomer, at least one monomer selected from copolymerizable monomers, such as acrylic acid, acrylic esters, methacrylic acid, methacrylic esters, acrylamide, acrylonitrile, ethylene, propylene, vinyl chloride, and vinyl acetate, and mixtures of the above polymers. Preferred are polyisoprene, polybutadiene, polychloroprene, polyvinyl alcohol or partial acetalization products of polyvinyl alcohol, e.g., polyvinyl acetal, polyvinyl butyral, polyvinyl acetate, and vinyl chloride/vinyl acetate copolymer, or mixtures of the above polymers.

The recorded hologram may be stabilized through monomer transfer by heating. To this end, the matrix polymer preferably has a relatively low glass transition temperature and can facilitate the monomer transfer.

Photopolymerizable compounds (2) usable as the component of the photosensitive material include photopolymerizable, photocrosslinkable monomers, oligomers, and prepolymers having at least one ethylenically unsaturated bond per molecule which will be described later, and mixtures of the above compounds, for example, unsaturated carboxylic acids and salts thereof, esters of unsaturated carboxylic acids with aliphatic polyhydric alcohol compounds, and compounds in which unsaturated carboxylic acids are linked to aliphatic polyamine compounds by an amide linkage.

Specific examples of monomers of unsaturated carboxylic acids include acrylic acid, methacrylic acid, itaconic acid, crotonic acid, isocrotonic acid, maleic acid, and halogen-substituted unsaturated carboxylic acids, for example, chlorinated unsaturated carboxylic acids, brominated unsaturated carboxylic acids, and fluorinated unsaturated carboxylic acids. Salts of unsaturated carboxylic acids include sodium and potassium salts of the above acids.

Specific examples of monomers of esters of aliphatic polyhydric alcohol compounds with unsaturated carboxylic acids are as follows.

Since there are a large number of examples, the specific examples will be classified into acrylic esters and methacrylic esters.

At the outset, acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri (acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl) ether of bisphenol A, ethoxylated bisphenol A diacrylate, 2-(1-naphthyloxy)ethyl acrylate, and o-biphenyl acrylate.

Methacrylic esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl]dimethylmethane, bis-[p-(acryloxyethoxy)phenyl]dimethylmethane, 2,2-bis(4-methacryloyloxyphenyl)propane, and 2-naphthyl methacrylate.

Regarding specific examples of monomers of esters of aliphatic polyhydric alcohol compounds with unsaturated carboxylic acids, itaconic esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Regarding specific examples of monomers of esters of aliphatic polyhydric alcohol compounds with unsaturated carboxylic acids, crotonic esters include ethylene glycol dicrotonate, tetramethylene glycol dicrotonate, pentaerythritol dicrotonate, and sorbitol tetracrotonate.

Regarding specific examples of monomers of esters of aliphatic polyhydric alcohol compounds with unsaturated carboxylic acids, isocrotonic esters include ethylene glycol diisocrotonate, pentaerythritol diisocrotonate, and sorbitol tetraisocrotonate.

Regarding specific examples of monomers of esters of aliphatic polyhydric alcohol compounds with unsaturated carboxylic acids, maleic esters include ethylene glycol dimaleate, triethylene glycol dimaleate, pentaerythritol dimaleate, and sorbitol tetramaleate.

Halogenated unsaturated carboxylic acids usable herein include 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (NK Ester DBN (tradename), manufactured by Shin-Nakamura Chemical Co., Ltd.), dibromopropyl acrylate (NK Ester A-DBP (tradename), manufactured by Shin-Nakamura Chemical Co., Ltd.), dibromopropyl methacrylate (NK Ester DBP (tradename), manufactured by Shin-Nakamura Chemical Co., Ltd.), methacrylic acid chloride, 2,4,6-trichlorophenyl methacrylate, p-chlorostyrene, methyl 2-chloroacrylate, ethyl 2-chloroacrylate, n-butyl-2-chloroacrylate, tribromophenol acrylate, and tetrabromophenol acrylate.

Specific examples of monomers of compounds, in which unsaturated carboxylic acids are linked to aliphatic polyamine compounds by an amide linkage, include methylenebisacrylamide, methylenebismethacrylamide, 1,6-hexamethylenebisacrylamide, 1,6-hexamethylenebismethacrylamide, diethylenetriamine trisacrylamide, xylylenebisacrylamide, xylylenebismethacrylamide, N-phenylmethacrylamide, and diacetoneacrylamide.

Other examples include polyisocyanate compounds having two or more isocyanate groups per molecule described in Japanese Patent Publication No. 41708/1973 and vinyl urethane compounds having two or more polymerizable vinyl groups per molecule with a hydroxyl-containing vinyl monomer represented by formula $CH_2=C(R')COOCH_2(R')OH$ (wherein R and R' each independently represent a hydrogen or a methyl group) being added thereto.

Urethane acrylates described in Japanese Patent Laid-Open No. 37193/1979 and polyester acrylates and polyfunctional acrylates and methacrylates, prepared from epoxy groups and (meth)acrylic acid or the like, described in Japanese Patent Laid-Open No. 64183/1973 and Japanese Patent Publication Nos. 43191/1974 and 30490/1977 may also be used.

Further, compounds introduced as photocurable monomers and oligomers in Journal of the Adhesion Society of Japan, Vol. 20, No. 7, 300–308 may also be used.

Regarding other examples, phosphorus-containing monomers include: mono(acryloyloxyethyl) acid phosphate (Light Ester PA (tradename), manufactured by Kyoeisha Chemical Co., Ltd.) and mono(2-methacryloyloxyethyl) acid phosphate (Light Ester PM (tradename), manufactured by Kyoeisha Chemical Co., Ltd.); and epoxy acrylate monomers (Ripoxy VR-60 (tradename), manufactured by Showa High Polymer Co., Ltd.; and Ripoxy VR-90 (tradename), manufactured by Showa High Polymer Co., Ltd.).

Further, NK Ester M-2300 (tradename) manufactured by Shin-Nakamura Chemical Co., Ltd. and NK Ester 23G (tradename) manufactured by Shin-Nakamura Chemical Co., Ltd. are usable.

Further examples of monomers include: a triacrylate having a structure represented by formula

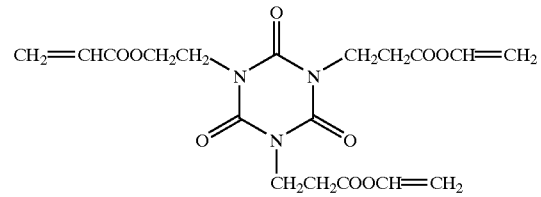

(tradename: Aronix M-315, manufactured by Toa Gosei Chemical Industry Co., Ltd.); a triacrylate having a structure represented by formula

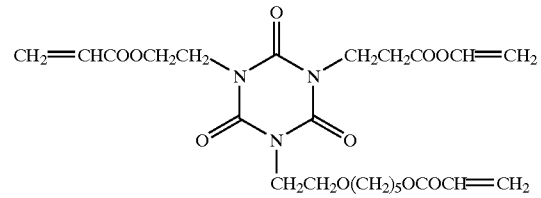

(tradename: Aronix M-325, manufactured by Toa Gosei Chemical Industry Co., Ltd.); 2, 2'-bis(4-acryloxydiethoxyphenyl)propane (NK Ester A-BPE-4 (tradename); and tetramethylolmethane tetraacrylate (NK ester A-TMMT (tradename) manufactured by Shin-Nakamura Chemical Co., Ltd.).

Photopolymerization initiators (3) usable as the component of the photosensitive material include, for example, 1,3-di(t-butyldioxycarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isoxazolone, 2-mercaptobenzimidazole, and dimers of imidazole.

Preferably, the photopolymerization initiator is decomposed after recording of the hologram from the viewpoint of stabilizing the recorded hologram. For example, an organic peroxide system is preferred because it can be easily decomposed upon ultraviolet irradiation.

Sensitizing dyes (4) usable as the component of the photosensitive material include, for example, dyes having absorption of light at 350 to 600 nm, such as thiopyrilium salt, merocyanine, quinoline, styrylquinoline, ketocoumarin, thioxanthene, xanthene, oxonol, cyanine, rhodamine, thiopyrilium salt, pyrilium ion, and diphenyliodonium ion dyes. Sensitizing dyes having absorption of light in a wavelength region of not more than 350 nm or not less than 600 nm may also be used.

In the volume hologram-forming resin composition comprising (1) the matrix polymer, (2) the photopolymerizable compound, (3) the photopolymerization initiator, and (4) the sensitizing dye, the mixing ratio (parts by weight based on 100 parts by weight of the matrix polymer) of the components is as follows.

The amount of the photopolymerizable compound (2) used is 10 to 1,000 parts by weight, preferably 10 to 100 parts by weight.

The amount of the photopolymerization initiator (3) used is 1 to 10 parts by weight, preferably 5 to 10 parts by weight.

The amount of the sensitizing dye (4) used is 0.01 to 1 part by weight, preferably 0.01 to 0.5 part by weight.

Other components usable in the hologram-forming resin composition include, for example, plasticizers, glycerin, diethylene glycol, triethylene glycol, and various nonionic surfactants, cationic surfactants, and anionic surfactants.

The hologram-forming resin composition is added to a solvent, such as acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, or isopropanol, or a mixed solvent composed of the above solvents to prepare a coating liquid having a solid content of about 15 to 25%.

The coating liquid may be coated onto a suitable substrate by bar coating, spin coating, dipping or the like, or alternatively by gravure roll coating, roll coating, die coating, Komma coating or the like to form a coating which is then dried to a hologram-forming resin composition layer. Thus, a hologram-forming photosensitive material is prepared.

Specific examples of substrates usable for the preparation of the hologram-forming photosensitive material include glass plates, plastic plates, such as acrylic resin plates, and plastic films, such as films of polyethylene terephthalate, polyethylene, polypropylene, polyvinyl chloride, acryl, triacetylcellulose, and cellulose acetate butyrate. The substrate preferably has high smoothness. When the substrate as such is used as a part of the laminate, the substrate preferably has high transparency.

Alternatively, an embodiment may be used wherein two substrates are provided and a hologram-forming resin composition layer is formed between these two substrates. In this case, the substrate, through which light for exposure enters, should be transparent. When two substrates are used, the laminate composed of a hologram-forming resin composition layer sandwiched between two substrates may be produced as follows and be used as the photosensitive material. The hologram-forming resin composition may be coated onto one of or both the substrates and, immediate after the coating, both the substrates are put on top of each other followed by pressing. Alternatively, a method may be used wherein, after the coating is solidified by drying or curing means according to the coating liquid, both the substrates are put on top of each other followed by pressing, if necessary, while heating. In this case, preferably, the substrates are linearly brought into contact with each other little by little while somewhat bending the substrates so as to avoid entry of air bubbles and so as to avoid the contact of the whole area at a time. It is also possible to use a method which comprises coating the hologram-forming resin composition by means of a spinner onto one of the substrates and, immediately after that, putting the other substrate on the coating followed by rotation of the assembly.

The thickness of the hologram-forming resin composition layer is generally 0.1 to 50 $\mu$m, preferably 5 to 20 $\mu$m.

Except for the use of two substrates, a protective film is preferably stacked onto the exposure surface of the hologram-forming resin composition layer. This protective film may also serve as a transparent protective layer 305 described below.

Protective films usable herein are highly transparent, highly smooth resin films having a thickness of 1 $\mu$m to 1 mm, preferably 10 to 100 $\mu$m, and examples thereof include polyethylene terephthalate films, polyethylene films, polypropylene films, polyvinyl chloride films, acrylic films, triacetylcellulose films, and cellulose acetate butyrate films. The protective film may be laminated onto the volume hologram-forming material by means of a rubber roller or the like.

Alternatively, instead of the lamination of the transparent resin film, a coating composition with a film-forming material, such as triacetylcellulose, polyvinyl alcohol, or polymethyl methacrylate, dissolved therein may be coated by spin coating or the like to form a protective film.

The protective film may be formed of a thermoplastic resin. Alternatively, the protective film may be formed by providing a thermosetting resin composition using a thermosetting resin or an ionizing radiation-curable resin composition curable upon ultraviolet light or electron beam irradiation, coating the composition, and heating the coating or applying an ionizing radiation to cure the coating by crosslinking to form a film having further improved physical and chemical various properties. In this case, when the hologram-forming photosensitive material is exposed followed by development by heating or the like, the protective film can prevent the expansion and contraction of the hologram-forming resin composition layer. When the protective film is regulated in its adhesion to the hologram-forming resin composition layer and releasably stacked, the protective film may be separated from the hologram-forming photosensitive material at the time of exposure.

In the hologram-forming photosensitive material, an antireflection layer may be provided on the backside of the substrate. This antireflection layer may be preferably formed of a material having a refractive index equal to or slightly different from the substrate, the hologram-forming resin composition layer, and the optional protective layer.

In order to prevent the reflection of light for exposure, the antireflection layer is preferably colored with a colorant, such as a dye capable of absorbing the wavelength of the light for exposure.

Exposure using an original plate for a volume hologram may be used as a method using the hologram-forming photosensitive material, for the production of a plate for the duplication of volume holograms or for the mass duplication of volume holograms.

The original plate for a volume hologram used is either the following original plate (1) or the following original plate (2). Specifically, (1) an original plate obtained by performing calculation by means of a computer so as to provide necessary properties and then performing exposure based on the calculation results by means of an electron beam exposure system; and (2) an original plate obtained by duplicating the volume hologram formed by the method (1) onto a hologram-forming resin composition layer on the substrate described below.

Both the plates obtained above may be used as the original plate for a volume hologram. In general, preferably, the plate (1) is duplicated to prepare several original plates (2) for the duplication which are used for the duplication of volume holograms.

The original plate for a volume hologram and the hologram-forming photosensitive material according to the present invention are provided, and exposure is generally carried out in such a state that an index matching liquid is interposed between the original plate and the hologram-forming photosensitive material. In the exposure, for example, a laser beam, such as an argon laser beam (wavelength 514.5 nm), is applied. This exposure causes interference of light, diffracted by the original plate for a volume hologram, with light which went straight without diffraction, thus providing hologram information in the hologram-forming resin composition layer.

After the exposure, the step of applying ultraviolet light at 0.1 to 10,000 mJ/cm$^2$, preferably 10 to 1,000 mJ/cm$^2$, from a light source, such as an ultrahigh-pressure mercury lamp, a high-pressure mercury lamp, a carbon arc lamp, a xenon arc lamp, or a metal halide lamp, to decompose the photopolymerization initiator and the step of heating, for example, the step of heating the assembly at 120° C. for 24 min to diffuse and move the photopolymerizable compound, are successively carried out to prepare a stable volume hologram. These ultraviolet irradiation and the heating are stabilization step and are also development step.

After the above steps, a duplicate of the original volume hologram is formed. The volume hologram thus obtained may be used as a product. Alternatively, the volume hologram may be used as an original plate for further duplicating a large quantity of volume hologram.

The volume hologram thus obtained has the substrate and optionally the protective film and the reflection layer. The volume hologram as such may be used so far as the whole volume hologram is transparent. Alternatively, all the layers may be separated to leave only the volume hologram layer which is independently used.

The volume hologram layer 303 may be colored and transparent so far as this does not pose any problem in the production thereof.

The most typical example of the information 304 is information inherent to the holder, such as an autograph and a photograph of the face of the holder in the ID card. In addition, fingerprints, the brilliance of eyeballs and the like may also be utilized as the information 304 although these are not very frequently used.

Besides the above information, a series of numbers controlled so as not to repeat the number and records of the numbers or other information in the form of conventional bar codes or infrared-sensitive transparent bar codes, and any other information may be used as the information 304.

When the layer underlying the portion wherein the information 304 is provided should be seen, the information 304 may be formed using a transparent colorant. Alternatively, the information may be formed in a dot form so that the layer underlying the information is seen through between dots. Further, infrared-sensitive transparent bar codes may be utilized. In the case of conventional bar codes and information having a very small area, the fine pattern portion of the information 304 may be lightproof.

As with the decoration 302, when the information is see-through or very small information, the information may be provided on the volume hologram layer 303 directly or indirectly through other layer.

The information 304 may be recorded as follows. (1) An autograph is handwritten by the holder. (2) In the case of a photograph of the face, a print on a silver salt photographic film, preferably only the emulsion layer after the separation, is applied. Alternatively, a photograph-like image of the face may be formed by dye transfer or the like. (3) In the case of patterns, letters, or bar codes may be printed or formed by means of a printer connected to a personal computer. The bar codes may be formed by a bar code printer. (4) In the case of fingerprints or eyeballs, after recording, data introduced by a video camera or the like are output, for example, by a printer.

The information 304 may be formed directly on the substrate 301 or the volume hologram layer 303. Alternatively, information formed on other sheet may be applied on the upper surface or the lower surface of the substrate 301. In this case, the application of the information formed on other sheet onto the backside often causes the left and right of the image to be seen in a reversed state. In this case, the left and right images are reversed.

Other sheet used herein is transparent. In a portion which may be lightproof, a lightproof sheet may be used.

The transparent protective layer 305 functions to improve physical or chemical properties of the surface of the hologram composite or hologram laminate according to the present invention, and is preferably a transparent plastic film. Materials usable for the transparent protective layer are the same as those described above in connection with the protective film for the hologram-forming photosensitive material.

The transparent protective layer 305 also may be colored and transparent.

If necessary, a coating may be provided on the surface of the transparent protective layer 305 from the viewpoint of reinforcement. Resin materials usable for the coating may be thermoplastic. Preferably, however, the transparent protective layer is formed by providing a thermosetting resin composition using a thermosetting resin or an ionizing radiation-curable resin composition curable upon ultraviolet light or electron beam irradiation, coating the composition, and heating the coating or applying an ionizing radiation to cure the coating by crosslinking to form a film having further improved physical and chemical various properties.

The transparent pressure-sensitive adhesive layers 306 (=306$a$ and 306$b$) may be used in the lamination of layers constituting the hologram composite or hologram laminate according to the present invention, particularly in the lamination of a portion where the underlying layer should be seen through the portion.

According to the present invention, the transparent pressure-sensitive adhesive layer 306 may be colored and transparent so far as any problem associated with the production or the use of the hologram composite or hologram laminate according to the present invention is not posed.

Pressure-sensitive adhesives usable for constituting the transparent pressure-sensitive adhesive layer 306 include, for example, acrylic resin, acrylic ester resin or acrylic or acrylic ester copolymer, styrene-butadiene copolymer, naturally occurring rubbers, casein, gelatin, rosin ester, terpene resin, phenolic resin, styrene resin, coumarone-indene resin, polyvinyl ether, and silicone resin. Additional examples thereof include α-cyanoacrylate, silicone, maleimide, styrol, polyolefin, resorcinol, polyvinyl ether, and silicone adhesives.

Besides the above pressure-sensitive adhesives usable for constituting the transparent pressure-sensitive adhesive layer 306, heat sealant may be used as the pressure-sensitive adhesive for constituting the transparent pressure-sensitive adhesive layer 306, and examples thereof include ethylene/vinyl acetate copolymer resin, polyamide resin, polyester resin, polyethylene resin, ethylene/isobutyl acrylate copolymer resin, butyral resin, polyvinyl acetate or vinyl acetate copolymer resin, cellulose derivative, polymethyl methacrylate resin, polyvinyl ether resin, polyurethane resin, polycarbonate resin, polypropylene resin, epoxy resin, and phenolic resin.

Alternatively, thermoplastic elastomers, such as SBS (styrene-butadiene-styrene block copolymer), SIS (styrene-isoprene-styrene block copolymer), and SEBS (styrene-ethylene-butylene-styrene block copolymer), reactive hot-melt resins and the like may be used.

There are several methods for applying the pressure-sensitive adhesive to conduct bonding. One of the methods comprises coating any one of or both bonding faces with the pressure-sensitive adhesive, optionally drying the coating, and applying both layers to each other. At the time of the application, if necessary, heating may be carried out.

Another method comprises coating the pressure-sensitive adhesive onto the surface of a releasable sheet having a releasable surface, called "separator", applying the coated sheet onto any bonding face, separating the separator after the application, and applying other bonding face to the surface of the pressure-sensitive adhesive exposed by the separation. When the application is carried out immediately after the coating of the pressure-sensitive adhesive onto the separator, the use of a single separator suffices for satisfactory results. However, it is also possible to use a method, using a "double face adhesive tape," which comprises sandwiching a pressure-sensitive adhesive layer between two separators, removing one of the separators, conducting bonding, removing the other separator, and conducting bonding. A suitable method may be selected and used according to need. In the case of the "double face adhesive tape," a nonwoven fabric or a transparent plastic film may be interposed between the pressure-sensitive adhesive layers so far as the nonwoven fabric or the transparent plastic film is transparent at the time of the lamination.

When stacking is carried out with the aid of the pressure-sensitive adhesive, in the fixation of the volume hologram layer 303 to the cut off portion described above with reference to FIGS. 11 to 15, all the adhesive joints desirably have high adhesive strength. In the hologram composite according to the present invention, however, preferably, the substrate 301 is most strongly bonded to the volume hologram layer 303.

Further, in the hologram laminate according to the present invention, the adhesive strength between the decoration 302 and the volume hologram layer 303, or, in the case of the provision of the volume hologram layer 303 in the portion free from the decoration, the adhesive strength between the substrate 301 and the volume hologram layer 303 is preferably the highest.

When the hologram laminate has information 304 recorded therein, in addition to high adhesive strength between the substrate 301 and the volume hologram layer 303, high adhesive strength between the information 304 and the volume hologram layer 303 can enhance the forgery preventive effect.

Conversely, an embodiment may be adopted wherein the pressure-sensitive adhesive for the lamination is left on one side or both sides of the separated portion and cannot be easily removed, thereby preventing an illegal act such that a part of the layers is separated from the hologram composite or hologram laminate according to the present invention and is then diverted to other object.

Fourth Invention

The volume hologram laminate according to the fourth invention comprises at least a first pressure-sensitive adhesive layer, a volume hologram layer, and a protective layer stacked in that order on top of one another, wherein a cut is provided in at least one of the layers constituting the volume hologram laminate.

Construction of Hologram Laminate and Label

FIG. 21 is a cross-sectional view showing one embodiment of the hologram laminate according to the present invention, and FIG. 22 a cross-sectional view showing one embodiment of the label for the preparation of a hologram laminate according to the present invention. As shown in FIG. 21, the hologram laminate of the present invention comprises at least a first pressure-sensitive adhesive layer 403 for press-bonding the volume hologram laminate to a hologram application medium, a volume hologram layer 402 for forming a hologram image, and a protective layer 401 for protecting the surface of the hologram layer stacked in that order on top of one another. In FIG. 21, a cut 404 is provided in the protective layer 401. If necessary, as shown in FIG. 22, a second pressure-sensitive adhesive layer 406 may be provided between the hologram layer 402 and the protective layer 401. A colored layer 408 for enhancing the visibility of the hologram may be provided on the hologram layer 402 in its application medium side, and a third pressure-sensitive adhesive layer 407 may be provided between the colored layer and the hologram layer. Before the application of the hologram laminate onto the application medium, bringing the hologram laminate to the form of a label for the preparation of a hologram laminate is preferred from the viewpoint of good handleability and the like. Labels for the preparation of a hologram laminate include a label wherein a release film 405 has been adhered to the first pressure-sensitive adhesive layer in the hologram laminate and a label wherein, in the above label, a removable pressure-sensitive adhesive sheet 409 is further additionally adhered to the protective layer. The release film is generally separated from the hologram laminate just before the application of the hologram laminate to the hologram application medium. The removable pressure-sensitive adhesive sheet is generally separated from the hologram laminate after the application of the hologram laminate onto the hologram application medium.

Breaking of Hologram Layer

With reference to FIG. 23, a specific example will be described in the case where a hologram laminate is applied using the label for the preparation of a hologram laminate according to the present invention and, thereafter, an attempt to separate the hologram laminate is made.

The label for the preparation of a hologram laminate, shown in FIG. 23, comprises a protective layer 401, a hologram layer 402, a first pressure-sensitive adhesive layer 403, a release film 405, and a removable pressure-sensitive adhesive sheet 410. In this case, a cut 404 is provided in the protective layer 401. In use, when the label stored in this state is applied to the application medium 411, the release film 405 is removed and the hologram laminate is then brought into intimate contact with the application medium 411. Subsequently, the removable pressure-sensitive adhesive sheet 410 is removed to prepare a hologram-applied medium with the hologram laminate applied thereto. Thereafter, an attempt to separate the hologram laminate causes breaking of the hologram layer 402. That is, the hologram layer 402 is cut or deformed. The cut or deformed hologram layer, even when again applied to the medium, cannot be returned to the original state. Thus, the fact of the re-application of the hologram laminate can be confirmed by the joint or the hologram layer which has been discolored by the deformation.

Cut

The cut provided in the hologram laminate according to the present invention is provided in at least one of the layers constituting the hologram laminate. The provision of the cut is advantageous in that an attempt to separate the hologram laminate, applied to the application medium, for abuse can cause cutting or deformation of the hologram layer. According to the present invention, the provision of the cut is advantageous in that the separation of only the hologram laminate without causing cutting or deformation of the hologram layer is very difficult, and that this cutting or deformation occurs without significant influence on the adhesion of the hologram application medium. When the hologram laminate, which had been once separated, is re-applied, the fact of the re-application can be easily perceived based on the cutting or deformation of the hologram image. This can serve to prevent the forgery of hologram application medium, such as identification cards or papers.

The cut may be provided in any of the layers constituting the hologram laminate, preferably, for example, in the hologram layer or protective layer. The cut may be passed through the layer, or alternatively may be one which is not passed through the layer, that is, may be a half cut. The shape of the cut is not particularly limited so far as the cutting or deformation of the hologram layer is accelerated. When the purpose of providing the cut is only to prevent the reuse of the hologram laminate, the cut is preferably fine, for example, in the form of pips on a die. However, when the cut is excessively fine, the visibility of the pattern in the hologram is deteriorated. For this reason, the fineness of the cut is such that, according to the pattern, the visibility is not deteriorated. When the hologram laminate should be completely separated, the fineness of the cut is preferably low for simplification which facilitates the separation of the hologram laminate. The site of the provision of the cut is preferably provided at a site to which force is applied upon an attempt to separate the hologram laminate, such as a site near the position where the separation is to be created.

Several specific examples of the form of the cut are shown in FIG. 24. FIG. 24A shows an embodiment wherein small cuts are provided in the periphery of the hologram laminate. FIG. 24B shows an embodiment wherein small cross cuts are provided in the hologram laminate. FIG. 24C shows an embodiment wherein cuts are provided according to the pattern of the hologram. FIG. 24D shows an embodiment wherein, when the hologram laminate is in a square form, four corners are cut. FIG. 24E shows an embodiment wherein a large cross cut is provided so that the hologram laminate is divided into four parts. FIG. 24F shows an embodiment wherein cuts having an acute angle are provided in the periphery of the hologram laminate.

Volume Hologram Layer

The volume hologram layer is not particularly limited so far as it is a generally used one. Preferred hologram layers include, for example, a reflection type volume hologram not having on its surface concaves and convexes (Lippmann hologram), a transmission type volume hologram, and a hologram wherein a reflection layer has been provided by vapor deposition on the backside of a transmission type volume hologram to bring the hologram to a substantially reflection type.

Among them, the Lippmann hologram has features including that reproduction may be done by environmental light, such as light from room lighting, the wavelength can be selected, the angle can be selected, a three-dimensional object can be recorded and reproduced, and multiple recording is possible. When the Lippmann hologram is used, upon exposure to illumination light, the pattern recorded in the Lippmann hologram is observed as a specific colored pattern floating in the air.

The hologram layer can be easily duplicated by bringing the recording material into intimate contact with an original plate for a volume hologram and then conducting exposure and development. Recording materials include conventional volume hologram recording materials, such as silver salt materials, bichromated gelatin emulsions, photopolymerizable resins, and photocrosslinkable resins. The thickness of the volume hologram layer is generally 0.1 to 50 $\mu$m, preferably 5 to 20 $\mu$m.

Protective Layer

The protective layer for protecting the surface of the hologram layer is not particularly limited so far as the layer does not deteriorates the visibility of the hologram image and has protective effect. Protective layers usable herein include, for example, polyethylene film, polypropylene film, polyethylene fluoride film, polyvinylidene fluoride film, polyvinyl chloride film, polyvinylidene chloride film, ethylene-vinyl alcohol film, polyvinyl alcohol film, polymethyl methacrylate film, polyethersulfone film, polyether ether ketone film, polyamide film, tetrafluoroethyleneperfluoroalkyl vinyl ether copolymer film, polyethylene terephthalate film, and polyimide film. The thickness of the protective film is generally 2 to 200 $\mu$m, preferably 10 to 50 $\mu$m.

Further, in order to enhance the protective properties, if necessary, a hardcoat is preferably provided on the protective layer. The hardcoat is formed, for example, by coating a silicone, fluorosilicone, melaminealkyd, urethane acrylate (ultraviolet curable) or other resin by dipping, spraying, or roll coating to a thickness on a dry basis of, for example, 1 to 50 $\mu$m, preferably 3 to 25 $\mu$m.

Further, the surface of the protective layer or the surface of the hardcoat is preferably subjected to release treatment from the viewpoint of making it difficult to conduct such an act that, in the forgery, for example, a film having high rigidity is applied to the hologram laminate and the highrigidity film also is separated so as not to break the hologram laminate. The release treatment may be carried out by coating a fluoro release agent, a silicone release agent, a stearate release agent, a wax release agent or the like by dipping, spraying, or roll coating.

First Pressure-sensitive Adhesive Layer

The first pressure-sensitive adhesive layer functions to bond the hologram laminate of the present invention to the hologram application medium. Preferably, the first pressure-sensitive adhesive layer, when the hologram laminate is separated from the hologram-applied medium, requires a force on a level such that the hologram layer is cut or deformed (broken). That is, the adhesive strength is higher than the breaking strength of the hologram layer. For some applications of the hologram laminate, in addition to the provision of the adhesive strength on the above level, preferably, the hologram laminate and the first pressure-sensitive adhesive layer can be completely removed from the hologram-applied medium by some means.

Materials for such first pressure-sensitive adhesive layers include, for example, acrylic resin, acrylic ester resin, vinyl acetate resin, copolymers thereof, styrene-butadiene copolymer, naturally occurring rubber, casein, gelatin, rosin ester resin, terpene resin, phenolic resin, coumarone-indene resin, polyvinyl ether resin, and silicone resin pressure-sensitive adhesives. Adhesives usable instead of the pressure-sensitive adhesive include: elastomer adhesives, such as naturally occurring rubber, reclaimed rubber, chloroprene rubber, nitrile rubber, styrene-butadiene rubber, and thermoplastic elastomer; synthetic resin adhesives, such as epoxy resin and polyurehane adhsives; chemically reactive adhesives, such as reactive acrylic and cyanoacrylate adhesives; UV-curable adhesives; EB-curable adhesives; hot-melt adhesives, such as polyamide, polyester, thermoplastic elastomer, and reactive hot-melt adhesives; aqueous adhesives, such as water-soluble adhesives; emulsion adhesives; latex adhesives; and inorganic adhesives. The thickness of the pressure-sensitive adhesive layer is not particularly limited. However, for example, the thickness is preferably 4 to 20 $\mu$m.

Second Pressure-sensitive Adhesive Layer

The second pressure-sensitive adhesive layer functions to bond the hologram layer to the protective layer in the hologram laminate according to the present invention. Specific examples of materials for the second pressure-sensitive adhesive layer include those described above in connection with the first pressure-sensitive adhesive layer. Preferably, the adhesive strength of the second pressure-sensitive adhesive layer is higher than that of the first pressure-sensitive adhesive layer.

Third Pressure-sensitive Adhesive Layer

The third pressure-sensitive adhesive layer functions to bond the hologram layer to the colored layer in the hologram laminate of the present invention. Specific examples of materials for the third pressure-sensitive adhesive layer include those described above in connection with the first pressure-sensitive adhesive layer. Preferably, the adhesive strength of the third pressure-sensitive adhesive layer is higher than that of the first pressure-sensitive adhesive layer.

Colored Layer

According to the hologram laminate of the present invention, a colored layer may be provided on the hologram layer in its application medium side from the viewpoint of enhancing the visibility of the hologram image. Colors of the colored layer include, for example, black, blue, and red. When the visibility of the recorded hologram can be enhanced by improving the contrast, any color may be applied. Preferably, the color is complementary to the color of the hologram image. Colorants include conventional organic pigments, inorganic pigments, and dyes. Examples thereof include: black pigments, such as carbon black and aniline black; color pigments, such as naphthol red F5RK and phthalocyanine blue; black dyes, such as acid black, chromium black, and reactive black; and dyes, such as disperse red, cation blue, and cation yellow. They may be used alone or as a mixture of two or more. Materials for the colored layer include conventional synthetic resins, for example, plastic films as described above in connection with the protective layer. Mixing of the pigment/dye at the time of film forming results in the formation of a colored film. The coloration of the first pressure-sensitive adhesive layer with the pigment/dye can eliminate the need to separately provide the colored layer. This can reduce the thickness of the hologram laminate.

Label for the Preparation of Hologram Laminate

Before the application of the hologram laminate of the present invention onto the application medium, bringing the hologram laminate to the form of a label for the preparation of a hologram laminate is preferred from the viewpoint of good handleability and the like. Labels for the preparation of a hologram laminate include a label wherein a release film has been adhered to the first pressure-sensitive adhesive layer in the hologram laminate and a label wherein, in the above label, a removable pressure-sensitive adhesive sheet is further additionally adhered to the protective layer.

Release Film

The release film is generally separated from the first pressure-sensitive adhesive layer in the hologram laminate just before the application of the hologram laminate to the hologram application medium. Materials for the release film include, for example, plastic films described above in connection with the protective layer. The treatment of the surface thereof with wax, fluorocompound or silicone can provide plastic films having releasbility.

Removable Pressure-sensitive Adhesive Sheet

The removable pressure-sensitive adhesive sheet is generally separated from the protective layer in the hologram laminate after the application of the hologram laminate onto the hologram application medium. The use of the removable pressure-sensitive adhesive sheet can reduce the thickness of the protective layer, and can protect the hologram laminate, which is likely to be cut or deformed by external force, during storage or application. Materials for the removable pressure-sensitive adhesive sheet include, for example, those described above in connection with the first pressure-sensitive adhesive layer. The adhesive strength of the removable pressure-sensitive adhesive sheet is lower than the adhesive strength of the first to third pressure-sensitive adhesive layers. Examples of the removable pressure-sensitive adhesive sheet include one having a layer construction of substrate film/removable pressure-sensitive adhesive layer/release film. In use, the release film is removed therefrom. Substrate films include, for example, plastic films as described above in connection with the protective layer. Materials for the removable pressure-sensitive adhesive layer include, for example, those described above in connection with the first pressure-sensitive adhesive layer. The adhesive strength of the removable pressure-sensitive adhesive layer is lower than that of the first to third pressure-sensitive adhesive layers. Release films usable herein include those described above in connection with the release film.

The hologram application medium is not particularly limited. Examples thereof include documents or cards necessary for preventing the forgery, specifically identification cards or papers, licenses, admission tickets for an examination, bankbooks, credit cards, confidential documents, CDs, CD-ROMs, video softwares, and their packages (the hologram laminate serves as an opening seal for preventing opening by a third party), and the interior of precision machines (the hologram laminate as a sheet for preventing an illegal disassembling). Materials for the application medium include, for example, papers, synthetic papers, synthetic resins, and metals. Examples of the form thereof include films or sheets, cards, booklets, such as passports.

The use of the hologram laminate in these application media can prevent the spreading of unauthorized versions of CDs, CD-ROMS, and video softwares, illegal replacement of the photograph in tickets to an examination and seal impression of passbooks for financial institutions, distribution of inferior articles due to illegal disassembling of internal devices (when used as a genuine certificate label of precision machines) and opening by a third party of confidential documents, high-grade decoration product packages (when used as a sealing label).

EXAMPLES

Example A1

An identification card, provided with a photograph of the face, having a size of a credit card was provided as a substrate, and a hologram seal was applied onto the photograph of the face to seal the photograph by the following method.

In order to provide a material for the formation of a hologram, a photosensitive resin composition (Omnidex 706) was coated onto a 50 μm-thick polyethylene terephthalate film to a thickness of 20 μm, and a 50 μm-thick polyvinyl chloride film was further applied thereto. Thus, a laminate A for a hologram was prepared.

Next, a first pressure-sensitive adhesive having the following composition was provided.

TABLE A1

Pressure-sensitive adhesive 1

| | |
|---|---|
| Acrylic pressure-sensitive adhesive (NISSETSU PE-118, manufactured by Nippon Carbide Industries Co., Ltd.) | 100 pts. wt. |
| Methyl ethyl ketone | 30 pts. wt. |
| Toluene | 15 pts. wt. |
| Ethyl acetate | 15 pts. wt. |
| Isocyanate crosslinking agent (NISSETSU CK-101, manufactured by Nippon Carbide Industries Co., Ltd.) | 16 pts. wt. |

The first pressure-sensitive adhesive having the composition shown in Table A1 was coated by means of a Komma coater onto a silicone separator (thickness 50 μm, SP-PET-05-50-BU, manufactured by Tohcello Co., Ltd.) to a thickness of 12 μm on a dry basis. Separately, a polyethylene terephthalate film (thickness 50 μm, Lumirror T-60, manufactured by Toray Industries, Inc.) was provided. Predetermined letters were gravure printed using a mixture of 100 parts by weight of an acrylic resin binder with 8% of a silicone onto this polyethylene terephthalate film. The print thus obtained was stacked onto the silicone separator with the first pressure-sensitive adhesive coated thereon so that the print faced the first pressure-sensitive adhesive. Thus, a laminate B was prepared.

Next, a second pressure-sensitive adhesive having the following composition was provided.

TABLE A2

Pressure-sensitive adhesive 2

| | |
|---|---|
| Acrylic pressure-sensitive adhesive (NISSETSU PE-118, manufactured by Nippon Carbide Industries Co., Ltd.) | 100 pts. wt. |
| Methyl ethyl ketone | 30 pts. wt. |
| Toluene | 15 pts. wt. |
| Ethyl acetate | 15 pts. wt. |
| Isocyanate crosslinking agent (NISSETSU CK-101, manufactured by Nippon Carbide Industries Co., Ltd.) | 2 pts. wt. |

The same silicone separator (thickness 50 μm, SP-PET-05-50-BU, manufactured by Tohcello Co., Ltd.) as used in the laminate B was provided. The second pressure-sensitive adhesive having the composition shown in Table A2 was coated by means of a Komma coater onto this silicone separator to a thickness of 25 μm on a dry basis. A different silicone separator (thickness 50 μm, SP-PET-02-50-BU, manufactured by Tohcello Co., Ltd.; In separation, this silicone separator requires a larger force than the silicone separator SP-PET-05-50-BU) was stacked onto the silicone separator with the second pressure-sensitive adhesive coated thereon. Thus, a laminate C was prepared. This laminate C is used for the application of the hologram layer onto the substrate 2.

At the outset, the polyvinyl chloride film in the laminate A was removed to expose the surface of the photosensitive resin composition, and an original plate for a volume hologram (having a Lippmann hologram) was brought into intimate contact with the photosensitive resin composition, followed by application of an argon laser having a wavelength of 488 nm from the polyethylene terephthalate film side to form a Lippmann hologram. After the exposure, ultraviolet light was applied thereto at 600 mJ/cm².

The silicone separator (thickness 50 μm, SP-PET-05-50-BU, manufactured by Tohcello Co., Ltd.) was removed from the laminate C, and this assembly was applied onto the hologram layer in its side remote from the polyethylene terephthalate film.

Thus, a laminate having a layer construction of polyethylene terephthalate film/hologram layer/second pressure-sensitive adhesive/silicone separator (symbol "/" representing that layers on both sides are stacked) was prepared.

Subsequently, the polyethylene terephthalate film was separated from the hologram layer. The silicone separator was removed from the laminate B, and the laminate B with the silicone separator removed therefrom was applied onto the hologram layer with the polyethylene terephthalate film removed therefrom. Thus, a hologram seal having a layer construction of printed polyethylene terephthalate film/first pressure-sensitive adhesive/hologram layer/second pressure-sensitive adhesive/silicone separator was prepared. The hologram seal was then heat treated at 140° C. for 15 min.

The silicone separator was removed from the hologram seal, and was then applied onto the photograph in the identification card, followed by standing at room temperature overnight.

After the standing overnight, the appearance of the hologram seal applied onto the identification card remained unchanged, and the printed letters formed on the transparent film was not seen from the surface.

An attempt to separate the applied hologram seal form the photograph caused the separation of the polyethylene terephthalate film as the transparent protective film, and, in this case, the hologram layer was left on the photograph. In addition, the pressure-sensitive adhesive was left in a letter form on the hologram layer, and, also on the transparent film side, the pressure-sensitive adhesive was left in a letter form. In this stage, although an attempt was made to return the transparent film to the original position, the produced letter did not disappear, leaving an evidence of the separation of the transparent film.

Further, an attempt to separate the hologram layer left on the photograph caused elongation of the hologram which in turn caused a change in color to green. This made it impossible to reuse the hologram.

Example A2

The procedure of Example A1 was repeated to prepare a laminate A. Further, a laminate B was prepared in the same manner as in Example A1, except that the pressure-sensitive adhesive 102 shown in Table A2 in Example A1 was used as the first pressure-sensitive adhesive. This laminate B is used in the application of the hologram layer onto the substrate.

Next, the pressure-sensitive adhesive shown in Table A2 in Example A1 was provided as the second pressure-sensitive adhesive, and the procedure of the preparation of the laminate C in Example A1 was repeated to prepare a laminate D.

The laminate A provided above was subjected to exposure of the hologram and ultraviolet irradiation. The silicone separator was removed from the laminate C, and the laminate C with the silicone separator removed therefrom was applied onto the hologram layer in its side remote from the polyethylene terephthalate film to prepare a hologram seal having a layer construction of printed polyethylene terephthalate film/second pressure-sensitive adhesive layer/hologram layer/third pressure-sensitive adhesive layer/silicone separator.

Further, the silicone separator on the third pressure-sensitive adhesive layer in the hologram seal was removed, and, instead of the separated silicone separator, the laminate B was applied to prepare a hologram seal having a layer construction of printed polyethylene terephthalate film/second pressure-sensitive adhesive layer/hologram layer/third pressure-sensitive adhesive layer/polyethylene terephthalate film/first pressure-sensitive adhesive layer/silicone separator.

The silicone separator was removed from the hologram seal, and was then applied onto the photograph in the identification card, followed by standing at room temperature overnight.

After the standing overnight, the appearance of the hologram seal applied onto the identification card remained unchanged, and the printed letters formed on the transparent film was not seen from the surface.

An attempt to separate the applied hologram seal form the photograph caused a letter to be raised and appear between the first pressure-sensitive adhesive layer and the polyethylene terephthalate film. Although an attempt was made to bring the assembly to the original state, the letter, which once appeared, did not disappear, leaving an evidence of the separation.

According to the invention described in claim 1, an attempt to separate a hologram label applied onto an article causes the separation of a transparent protective film as the surface film. Further, in this case, a part of the pressure-sensitive adhesive provided on the transparent protective film is left on the transparent protective film, while the remainder of the pressure-sensitive adhesive is left on the underlying hologram layer. Therefore, a clear evidence of the separation is left. Further, it is impossible to bring the assembly to the original state. This makes it impossible to conduct an illegal act such that the hologram label is illegally separated and replaced with a different hologram label for making a pretense of the genuine state.

According to the invention described in claim 2, in addition to the effect attained by the invention described in claim 1, the effect of preventing the pressure-sensitive adhesive from being partially adhered to the transparent protective film side at the time of separation of the transparent protective film can be improved.

According to the invention described in claim 3, in addition to the effect attained by the invention described in claim 1, the effect of partially adhering the pressure-sensitive adhesive to the transparent protective film side at the time of separation of the transparent protective film can be improved.

According to the invention described in claim 4, in addition to the effect attained by the invention described in any one of claims 1 to 3, an additional effect can be attained such that an attempt to separate the hologram layer causes elongation of the hologram layer which reduces the spacing between interference fringes. This results in a change in color of the hologram layer which becomes a clear evidence of the separation of the hologram layer. Since the color is different from the color of the hologram layer in the genuine state, even though the illegal act could not be found through the change in the transparent protective film, reuse of the hologram layer for illegal purposes can be prevented.

According to the invention described in claim 5, a laminate for various articles can be easily produced with a hologram being applied thereon in such a manner that, after the application of a hologram label onto an article, an attempt to separate the label causes the separation of a transparent protective film as the surface film, and, in this case, a part of the pressure-sensitive adhesive provided on the transparent protective film is left on the transparent protective film with the remainder of the pressure-sensitive adhesive being left on the underlying hologram layer and that, thus, a clear evidence of the separation is left and it is impossible to bring the assembly to the original state, thereby making it impossible to conduct an illegal act such that the hologram label is illegally separated and replaced with a different hologram label for making a pretense of the genuine state.

According to the invention described in claim 6, it is possible to easily produce a laminate which, in addition to the effect of the invention described in claim 5, has the effect of preventing the pressure-sensitive adhesive from being partially adhered to the transparent protective film side at the time of separation of the transparent protective film can be improved.

According to the invention described in claim 7, it is possible to easily produce a laminate which, in addition to the effect of the invention described in claim 5, has the effect of partially adhering the pressure-sensitive adhesive to the transparent protective film side can be improved at the time of the separation of the transparent protective film.

According to the invention described in claim 8, it is possible to easily produce a laminate which, in addition to the effect attained by the invention described in any one of claims 5 to 7, has an additional effect such that an attempt to separate the hologram layer causes elongation of the hologram layer which reduces the spacing between interference fringes, resulting in a change in color of the hologram layer which becomes a clear evidence of the separation of the hologram layer and that, since the color is different from the color of the hologram layer in the genuine state, even though the illegal act could not be found through the change in the transparent protective film, reuse of the hologram layer for illegal purposes can be prevented.

According to the invention described in claim 9, in addition to the effect attained by the invention described in any one of claims 5 to 8, the hologram label is easy to handle by virtue of the additional provision of a release sheet.

According to the invention described in claim 10, the hologram is also separated from the article. Further, in this case, a part of the applied pressure-sensitive adhesive is left on the transparent protective film, while the remainder of the pressure-sensitive adhesive is left on the underlying hologram layer. Therefore, a clear evidence of the separation is left. Further, it is impossible to bring the assembly to the original state. This makes it impossible to conduct an illegal act such that the hologram label is illegally separated and replaced with a different hologram label for making a pretense of the genuine state.

According to the invention described in claim 11, in addition to the effect attained by the invention described in claim 10, the effect of preventing the pressure-sensitive adhesive from being partially adhered to the hologram side at the time of separation of the hologram can be improved.

According to the invention described in claim 12, in addition to the effect attained by the invention described in claim 10, the effect of partially adhering the pressure-sensitive adhesive to the hologram side at the time of the separation of the hologram can be improved.

According to the invention described in claim 13, in addition to the effect attained by the invention described in any one of claims 10 to 12, an additional effect can be attained such that an attempt to separate the hologram layer causes elongation of the hologram layer which reduces the spacing between interference fringes. This results in a change in color of the hologram layer which becomes a clear evidence of the separation of the hologram layer. Since the color is different from the color of the hologram layer in the genuine state, reuse of the hologram layer for illegal purposes can be prevented.

According to the invention described in claim 14, in addition to the effect attained by the invention described in any one of claims 10 to 12, an additional effect can be attained such that an attempt to separate the hologram layer causes elongation of the hologram layer which reduces the spacing between interference fringes. This results in a change in color of the hologram layer which becomes a clear evidence of the separation of the hologram layer. Since the color is different from the color of the hologram layer in the genuine state, reuse of the hologram layer for illegal purposes can be prevented.

According to the invention described in claim 15, in addition to the effect attained by the invention described in claim 14, the effect of preventing the pressure-sensitive adhesive from being partially adhered to the hologram side at the time of separation of the hologram can be improved.

According to the invention described in claim 16, in addition to the effect attained by the invention described in claim 14, the effect of partially adhering the pressure-sensitive adhesive to the hologram side at the time of the separation of the hologram can be improved.

According to the invention described in claim 17, in addition to the effect attained by the invention described in any one of claims 14 to 16, an additional effect can be attained such that an attempt to separate the hologram layer causes elongation of the hologram layer which reduces the spacing between interference fringes. This results in a change in color of the hologram layer which becomes a clear evidence of the separation of the hologram layer. Since the color is different from the color of the hologram layer in the genuine state, reuse of the hologram layer for illegal purposes can be prevented.

According to the invention described in claim 18, in addition to the effect attained by the invention described in any one of claims 14 to 17, an additional effect can be attained such that an attempt to separate the hologram layer causes elongation of the hologram layer which reduces the spacing between interference fringes. This results in a change in color of the hologram layer which becomes a clear evidence of the separation of the hologram layer. Since the color is different from the color of the hologram layer in the genuine state, reuse of the hologram layer for illegal purposes can be prevented.

According to the invention described in claim 19, in addition to the above effect, an additional effect can be attained such that an attempt to separate the hologram layer causes elongation of the hologram layer which reduces the spacing between interference fringes. This results in a change in color of the hologram layer which becomes a clear evidence of the separation of the hologram layer. Since the color is different from the color of the hologram layer in the genuine state, reuse of the hologram layer for illegal purposes can be prevented.

According to the invention described in claim 20, any one of the pressure-sensitive adhesive layers may be constructed so that, at the time of separation, a part of the pressure-sensitive adhesive layer is adhered to and left on the overlying layer with the remainder of the pressure-sensitive adhesive layer being adhered to and left on the underlying layer. Therefore, illegal separation can be prevented according to applications.

According to the invention described in claim 21, it is possible to provide a hologram label wherein the hologram is also separated and, at the same time, an evidence of the separation is left.

According to the invention described in claim 22, it is possible to provide a hologram laminate wherein the underside of the hologram is protected by a transparent film and, in addition, the hologram is also separated and, in this case, an evidence of the separation is left.

According to the invention described in claim 23, it is possible to provide a hologram label wherein the underside of the hologram is protected by a transparent film and, in addition, the hologram is also separated and, in this case, an evidence of the separation is left.

According to the invention described in claim 24, it is possible to provide a hologram laminate wherein three pressure-sensitive adhesive layers can be separated in any predetermined order and, at the time of the separation of any pressure-sensitive adhesive layer, an evidence of the separation is left.

According to the invention described in claim 25, it is possible to provide a hologram label wherein three pressure-sensitive adhesive layers can be separated in any predetermined order and, at the time of the separation of any pressure-sensitive adhesive layer, an evidence of the separation is left.

Example B

A transparent pressure-sensitive adhesive label was first prepared as follows. This transparent pressure-sensitive adhesive label is used in the application of the label directly on an adherend, as well as for a protective film of a hologram.

A pressure-sensitive adhesive composition A having the following composition was coated by means of a Komma coater onto a silicone separator A (thickness 50 $\mu$m, a release film, SP-PET-05, manufactured by Tokyo Serofan Co., Ltd.) to a thickness of 15 $\mu$m on a dry basis. A transparent PET (=polyethylene terephthalate) film (thickness 50 $\mu$m, Lumirror T-60, manufactured by Toray Industries, Inc.) was laminated onto the coated face to prepare a transparent pressure-sensitive adhesive label wherein the transparent PET film, the transparent pressure-sensitive adhesive composition A, and the silicone separator A have been stacked in that order on top of one another.

(Transparent Pressure-sensitive Adhesive Composition A)

| | |
|---|---|
| Acrylic pressure sensitive adhesive (NISSETSU PE-118, manufactured by Nippon Carbide Industries Co., Ltd.) | 100 pts. wt. |
| Isocyanate crosslinking agent (NISSETSU CK-101, manufactured by Nippon Carbide Industries Co., Ltd.) | 16 pts. wt. |
| Methyl ethyl ketone | 30 pts. wt. |
| Toluene | 15 pts. wt. |
| Ethyl acetate | 15 pts. wt. |

Next, a hologram label was prepared.

At the outset, a color Lippmann hologram was recorded, by means of a laser beam source having wavelengths of 476 nm, 532 nm, and 647 nm, on a hologram recording film (HRF 800×001, manufactured by E. I. du Pont de Nemours & Co.) wherein a transparent PET film, a hologram recording material (=a photocurable resin composition layer), and a transparent PET film had been stacked in that order on top of one another. After the recording, one of the transparent PET films was removed, and, instead, a removable pressure-sensitive adhesive (H225E, manufactured by SUN A. KAKEN CO., LTD.) was stacked on the assembly with one of the transparent PET films removed therefrom. The whole assembly was heated at a temperature of 120° C. for 24 min. Thus, a hologram layer sandwiched between the transparent PET film and the removable pressure-sensitive adhesive was obtained.

Subsequently, a transparent pressure-sensitive adhesive for the application of the hologram layer was provided as follows.

The following transparent pressure-sensitive adhesive composition B was coated onto the silicone separator A as used in the preparation of the transparent pressure-sensitive adhesive label. A silicone separator B (thickness 50 $\mu$m, a release film, SP-PET-02, manufactured by Tokyo Serofan Co., Ltd.) was laminated onto the coated face to prepare a double face pressure-sensitive adhesive sheet wherein the silicone separator A, the transparent pressure-sensitive adhesive composition B, and the silicone separator B had been stacked in that order on top of one another.
(Transparent Pressure-sensitive Adhesive Composition B)

| | |
|---|---|
| Acrylic pressure-sensitive adhesive (NISSETSU PE-118, manufactured by Nippon Carbide Industries Co., Ltd.) | 100 pts. wt. |
| Isocyanate crosslinking agent (NISSETSU CK-101, manufactured by Nippon Carbide Industries Co., Ltd.) | 1 pt. wt. |
| Methyl ethyl ketone | 30 pts. wt. |
| Toluene | 15 pts. wt. |
| Ethyl acetate | 15 pts. wt. |

The removable pressure-sensitive adhesive was separated from the hologram prepared above. The silicone separator A was separated from the double face pressure-sensitive adhesive sheet, and the sheet on its side exposed by the separation was put on top of the hologram on its side exposed by the separation. Thus, a hologram label intermediate was prepared wherein the transparent PET film, the hologram layer, the transparent pressure-sensitive adhesive composition B, and the silicone separator B had been stacked in that order on top of one another.

The transparent PET film was separated from the hologram label intermediate. The silicone separator A in the transparent pressure-sensitive adhesive label prepared above was separated, and the transparent pressure-sensitive adhesive label on its side exposed by the separation of the silicone separator A was stacked onto the hologram label intermediate on its side exposed by the separation of the transparent PET film to prepare a laminate for the application of a hologram wherein the transparent PET film, the transparent pressure-sensitive adhesive composition A, the hologram layer, the transparent pressure-sensitive adhesive composition B, and the silicone separator B had been stacked in that order on top of one another.

The silicone separator A was separated from the transparent pressure-sensitive adhesive label provided above, and the transparent pressure-sensitive adhesive label was then laminated onto the surface of a photograph of the face as a substrate for a credit card in such a manner that the surface of the photograph came into contact with the transparent pressure-sensitive adhesive composition A side.

An autograph was provided on the laminated transparent pressure-sensitive adhesive label in its transparent PET film face. The silicone separator B is separated from the laminate for the application of a hologram prepared above, and the laminate was stacked onto the autograph so that the transparent pressure-sensitive adhesive composition B came into contact with the autograph portion.

Thus, a laminate as a final product was prepared wherein the autograph and the hologram had been stacked in that order on the portion of the photograph of the face in the credit card.

In the final product thus obtained, the photograph of the face, the autograph portion, and the hologram are present in one place in such a state that they are put on top of one another. In this case, they are strongly adhered to one another, making it difficult to prevent the forgery of the product.

Since the adhesive strength between the autograph portion and the hologram is higher than the adhesive strength between the photograph of the face and the autograph portion, an attempt to forcibly separate the surface caused separation between the photograph of the face and the transparent pressure-sensitive adhesive composition B, making it impossible to combine other illegal signature with the hologram.

According to the invention described in claim 26, information and the volume hologram layer are stacked in a laminate form onto an adherend substrate. Therefore, as compared with the case where information is recorded on the adherend substrate 204 and a hologram is formed by the side of the record, inherent information is protected by the hologram for each adherend substrate 4, contributing enhanced forgery preventive effect.

According to the invention described in claim 27, at least one of the lamination of a transparent film 203 and an adherend substrate 204 and the lamination of a volume hologram layer 201 and information 202 is carried out through a pressure-sensitive adhesive layer. This facilitates the lamination.

According to the invention described in claim 28, since a transparent protective film 206 is provided on the volume hologram layer 201, the volume hologram layer 201 can be protected against soiling and abrasion.

According to the invention described in claim 29, the transparent protective film 206 is stacked onto the volume hologram layer 201 through a pressure-sensitive adhesive layer. In this structure, heating is not involved in the lamination of the volume hologram layer 201 and the transparent protective film 206. Therefore, the lamination can be easily carried out without adverse effect on the hologram.

According to the invention described in claim 30, the transparent film 203 as the protective film, the volume hologram layer 201, the transparent film 203, and the adherend substrate 204 are stacked in that order on top of one another through pressure-sensitive adhesive layers respectively between adjacent layers. Therefore, in the preparation of the laminate, heating for bonding is not required, and, in addition, the adhesive strength can be advantageously set for each pressure-sensitive adhesive layer.

According to the invention described in claim 31, the adhesive strength between the volume hologram layer 201 and the transparent film 203 is larger than the adhesive strength between the transparent film 203 and the adherend substrate 204. By virtue of this constitution, an attempt to conduct separation causes the volume hologram layer 201 and the information 202 to be separated in an integral state. This contributes to enhanced forgery preventive effect.

According to the invention described in claim 32, the recording of the information 202 and the repetition of the lamination twice can easily provide a hologram laminate having high forgery preventive effect.

According to the invention described in claim 33, no special heating is required in the lamination of the transparent film 203 onto the adherend substrate 204. This facilitates the lamination.

According to the invention described in claim 34, since the transparent protective film 206 is stacked onto the volume hologram layer 201, in the lamination of the volume hologram layer 201, the upper surface of the hologram can be protected against soiling and abrasion.

According to the invention described in claim 35, the transparent protective film 206 is stacked onto the volume hologram layer 201 through a pressure-sensitive adhesive layer. Therefore, when the hologram label is provided, the volume hologram layer 201 is adhered to the transparent protective film 206 by pressing. This can reduce heating which has a fear of adverse effect on the hologram.

According to the invention described in claim 36, a hologram laminate having the transparent protective film 206 in its the outermost surface can be prepared using labels wherein pressure-sensitive adhesive layers are interposed respectively between adjacent two layers. Therefore, adverse effect of heating can be eliminated.

According to the invention described in claim 37, the adhesive strength between the volume hologram layer 201 and the transparent film 203 is larger than the adhesive strength between the transparent film 203 and the adherend substrate 204. By virtue of this constitution, an attempt to conduct separation, the hologram and the information to be separated in an integral state. This makes it difficult to conduct forgery by rewriting of the information 202.

Example C1

(Preparation of Pressure-sensitive Adhesive Solution)

A pressure-sensitive adhesive solution was prepared according to the following composition.

| | |
|---|---|
| Acrylic pressure-sensitive adhesive (NISSETSU PE-118, manufactured by Nippon Carbide Industries Co., Ltd.) | 100 pts. wt. |
| MEK | 30 pts. wt. |
| Toluene | 15 pts. wt. |
| Ethyl acetate | 15 pts. wt. |
| Isocyanate crosslinking agent (NISSETSU CK-101, manufactured by Nippon Carbide Industries Co., Ltd.) | 2 pts. wt. |

(Preparation of Protective Layer/Pressure-sensitive Adhesive Layer/Release Film A)

The pressure-sensitive adhesive solution was immediately coated by means of a Komma coater onto a release film A (thickness 50 $\mu$m, SP-PET05, manufactured by Tohcello Co., Ltd.) to a thickness of 20 $\mu$m on a dry basis. A stretched polypropylene (OPP) film (thickness 20 $\mu$m, OPU-2#20, manufactured by Tohcello Co., Ltd.) was laminated onto the coating.

(Preparation of Release Film A/Pressure-sensitive Adhesive Layer/release Film B)

A pressure-sensitive adhesive solution was prepared in the same manner as described above, except that the amount of the isocyanate crosslinking agent added was changed to 4 parts by weight. The pressure-sensitive adhesive solution thus prepared was immediately coated by means of a Komma coater onto a release film A (thickness 50 $\mu$m, SP-PET05, manufactured by Tohcello Co., Ltd.) to a thickness of 20 $\mu$m on a dry basis. A release film B (thickness 50 $\mu$m, SP-PET02, manufactured by Tohcello Co., Ltd.) was laminated onto the coating.

(Preparation of Hologram Layer)

One PET film in the hologram recording film (HRF 800×001, manufactured by E. I. du Pont de Nemours & Co.) composed of a polyethylene terephthalate (PET) film/ hologram recording material (15 $\mu$m) PET film was separated, and then brought into intimate contact with an original plate for a hologram. Thereafter, a color Lippmann hologram was recorded by means of a laser beam source having wavelengths of 476 nm, 532 nm, and 647 nm.

(Preparation of Hologram Laminate)

After recording the hologram, the hologram layer was separated from the original plate. The release film A was separated from the release film A/pressure-sensitive adhesive layer/release film B, and the laminate with the release film A removed therefrom was laminated onto the hologram layer on its side exposed by the separation of the original plate to prepare PET/hologram layer/pressure-sensitive adhesive layer/release film B.

The PET film was separated from the laminate. The release film A was separated from the OPP/pressure-sensitive adhesive layer/release film A prepared above, and the laminate with the release film A removed therefrom was laminated onto the laminate with the PET film removed therefrom to prepare a label for the preparation of a hologram laminate formed of OPP/pressure-sensitive adhesive layer/hologram layer/pressure-sensitive adhesive layer/ release film B.

(Provision of Cut)

Figure 24A:
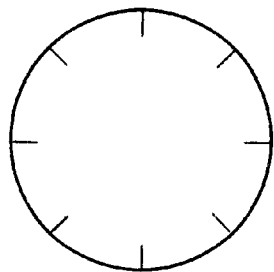
FIGS. 24A to 24F are diagrams showing specific examples of the shape of cuts provided in a hologram laminate according to the present invention.
Figure 24B:
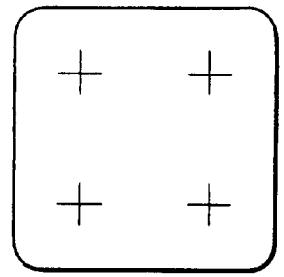
Figure 24C:
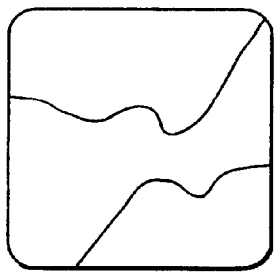
Figure 24D:
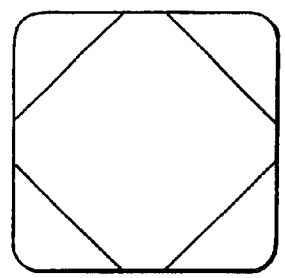

As shown in FIG. 24D, four corners of the label for the preparation of a hologram laminate prepared above were half cut to a depth of 55 $\mu$m from the upper side of the label by means of a double edge for a cut. A removable pressure-sensitive adhesive sheet (H225E, manufactured by SUN A. KAKEN CO., LTD.) was stacked thereon to complete a final label for the preparation of a hologram laminate.

The release film B was separated from the label for the preparation of a hologram laminate thus obtained, and the label with the release film B removed therefrom was applied onto a photograph of the face on an identification card, and the removable pressure-sensitive adhesive sheet was further separated to prepare a hologram laminate. An attempt to separate the hologram laminate from the photograph of the face caused the hologram laminate to be broken at the cut portion in the four corners, making it impossible to reuse the hologram laminate. Further, the hologram laminate in its portion left on the photograph could be easily removed.

Example C2

(Preparation of Hologram Layer)

One PET film in the hologram recording film (HRF 800×001, manufactured by E. I. du Pont de Nemours & Co.) composed of a polyethylene terephthalate (PET) film/ hologram recording material (15 $\mu$m) PET film was separated, and then brought into intimate contact with an original plate for a hologram. Thereafter, a color Lippmann hologram was recorded by means of a laser beam source having wavelengths of 476 nm, 532 nm, and 647 nm.

(Preparation of Hologram Laminate)

After recording the hologram, the hologram layer was separated from the original plate. One release film was separated from a double face pressure-sensitive adhesive sheet formed of release film/pressure-sensitive adhesive layer (about 20 $\mu$m)/release film (PA-10, manufactured by Lintec Corporation), and the laminate with the release film removed therefrom was laminated onto the hologram layer on its side exposed by the separation of the original plate to prepare PET/hologram layer/pressure-sensitive adhesive layer/release film.

The PET film was separated from this laminate. The release film was separated from a pressure-sensitive adhesive sheet formed of PET (25 μm)/pressure-sensitive adhesive layer (about 20 μm)/release film (PET25PL core, manufactured by Lintec Corporation). Both the laminates were then laminated onto top of each other to prepare a label, for the preparation of a hologram laminate, formed of PET/pressure-sensitive adhesive layer/hologram layer/pressure-sensitive adhesive layer/release film.

(Provision of Cut)

Figure 24E:
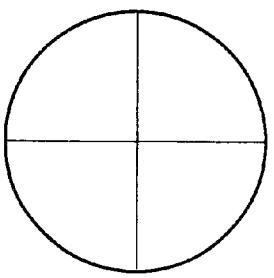

As shown in FIG. 24E, a cross cut was provided in the label for the preparation of a hologram laminate prepared above to a depth of 45 μm from the upper side of the label by means of a double edge for a cut. A removable pressure-sensitive adhesive sheet (H225E, manufactured by SUN A. KAKEN CO., LTD.) was stacked thereon to complete a final label for the preparation of a hologram laminate.

The release film was separated from the label for the preparation of a hologram laminate thus obtained, and the label with the release film removed therefrom was applied onto a dial glass of a clock, and the removable pressure-sensitive adhesive sheet was further separated to prepare a hologram laminate. An attempt to separate the hologram laminate from the glass caused the hologram laminate to be broken at the cross cut portion, making it impossible to reuse the hologram laminate. In this case, the hologram laminate could be easily separated from the glass.

Example C3

(Preparation of Hologram Layer)

One PET film in the hologram recording film (HRF 800×001, manufactured by E. I. du Pont de Nemours & Co.) composed of a polyethylene terephthalate (PET) film/hologram recording material (15 μm) PET film was separated, and then brought into intimate contact with an original plate for a hologram. Thereafter, a color Lippmann hologram was recorded by means of a laser beam source having wavelengths of 476 nm, 532 nm, and 647 nm.

(Preparation of Hologram Laminate)

After recording the hologram, the hologram layer was separated from the original plate. One release film was separated from a double face pressure-sensitive adhesive sheet formed of release film/pressure-sensitive adhesive layer (about 20 μm)/black PET (50 μm)/pressure-sensitive adhesive layer (about 20 μm)/release film (Black PET(w)PL Core, manufactured by Lintec Corporation), and the laminate with the release film removed therefrom was laminated onto the hologram layer on its side exposed by the separation of the original plate to prepare PET/hologram layer/pressure-sensitive adhesive layer/black PET/pressure-sensitive adhesive layer/release film.

The PET film was separated from this laminate. The release film was separated from a pressure-sensitive adhesive sheet formed of PET (25 μm)/pressure-sensitive adhesive layer (about 20 μm)/release film (PET25PL core, manufactured by Lintec Corporation). Both the laminates were then laminated onto top of each other to prepare a label, for the preparation of a hologram laminate, formed of PET/pressure-sensitive adhesive layer/hologram layer/ pressure-sensitive adhesive layer/release film.

(Provision of Cut)

Figure 24F:
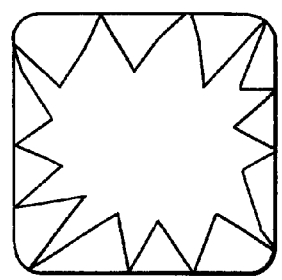

As shown in FIG. 24F, a cut having an acute angle was provided in the periphery of the label for the preparation of a hologram laminate prepared above to a depth of 130 μm from the upper side of the label by means of a double edge for a cut. A removable pressure-sensitive adhesive sheet (H225E, manufactured by SUN A. KAKEN CO., LTD.) was stacked thereon to complete a final label for the preparation of a hologram laminate.

The release film was separated from the label for the preparation of a hologram laminate thus obtained, and the label with the release film removed therefrom was applied onto a plastic CD (compact disc) case, and the removable pressure-sensitive adhesive sheet was further separated to prepare a hologram laminate. An attempt to separate the hologram laminate from the case caused the hologram laminate to be broken at the peripheral cut portion, making it impossible to reuse the hologram laminate. In this case, the hologram laminate could be easily separated from the case.

Comparative Example C

Labels for the preparation of a hologram laminate were prepared in the same manner as in Example C, except that no cut was provided. The same test as in Example C was carried out using a plastic CD case as the application medium. As a result, the hologram laminates were easily separated in such a state that could be reused.

The volume hologram laminate according to the present invention, when attempted to be separated from the hologram-applied medium, surely causes breaking of the hologram layer. This makes it difficult to reuse the hologram laminate. The hologram laminate in its broken portion left on the medium can be easily removed from the application medium. Thereafter, after the separation, no adhesive is left, and there is no trouble in use after that. Further, there is no significant limitation on the adhesion of the application medium for carrying out the application and causing the breaking and removal of the hologram laminate.

Thus, the volume hologram laminate and the label for the preparation of a volume hologram laminate according to the present invention can advantageously prevent particularly the forgery of a hologram application medium, more specifically the forgery of a hologram application medium carried out by separating the hologram laminate from the hologram application medium and again bonding the hologram laminate to the hologram application medium.

What is claimed is:

1. A hologram laminate comprising: a substrate; a hologram layer provided on the substrate through a first pressure-sensitive adhesive layer; and a transparent film provided on the hologram layer through a second pressure-sensitive adhesive layer, the adhesive strength between the substrate and the hologram layer being larger than the adhesive strength between the hologram layer and the transparent film, the second pressure-sensitive adhesive layer having a first portion and a second portion, the first portion having an adhesive property such that the adhesive strength between the first portion and the transparent film is larger than the adhesive strength between the first portion and the hologram layer and, hence, when the transparent film is peeled off, the first portion is left on the transparent film side, the second portion having an adhesive property such that the adhesive strength between the second portion and the transparent film is smaller than the adhesive strength between the second portion and the hologram layer and, hence, when the transparent film is peeled off, the second portion is left on the hologram layer.

2. The hologram laminate according to claim 1, wherein a layer for lowering the adhesive strength between the transparent film and the second pressure-sensitive adhesive layer is partially provided between the transparent film and the second pressure-sensitive adhesive layer.

3. The hologram laminate according to claim 1, wherein a layer for enhancing the adhesive strength between the transparent film and the second pressure-sensitive adhesive layer is partially provided between the transparent film and the second pressure-sensitive adhesive layer.

4. The hologram laminate according to claim 1, wherein the adhesive strength between the hologram layer and the substrate is larger than 1% tensile strength of the hologram layer.

5. A hologram label comprising a first pressure-sensitive adhesive layer as the lowermost layer, a hologram layer, a second pressure-sensitive adhesive layer, and a transparent film as the uppermost layer stacked in that order, the second pressure-sensitive adhesive layer having a first portion and a second portion, the first portion having an adhesive property such that the adhesive strength between the first portion and the transparent film is larger than the adhesive strength between the first portion and the hologram layer and, hence, when the transparent film is peeled off, the first portion is left on the transparent film side, the second portion having an adhesive property such that the adhesive strength between the second portion and the transparent film is smaller than the adhesive strength between the second portion and the hologram layer and, hence, when the transparent film is peeled off, the second portion is left on the hologram layer.

6. The hologram label according to claim 5, wherein a layer for lowering the adhesive strength between the second pressure-sensitive adhesive layer and the transparent film is partially provided between the second pressure-sensitive adhesive layer and the transparent film.

7. The hologram label according to claim 5, wherein a layer for enhancing the adhesive strength between the second pressure-sensitive adhesive layer and the transparent film is partially provided between the second pressure-sensitive adhesive layer and the transparent film.

8. The hologram label according to claim 5, wherein the adhesive strength between the hologram layer and the substrate is larger than 1% tensile strength of the hologram layer.

9. The hologram label according to claim 5, which further comprises a release sheet stacked on the underside of the first pressure-sensitive adhesive layer.

10. A hologram laminate comprising: a substrate; and, provided on the substrate in the following order, a first pressure-sensitive adhesive layer, a first transparent film, a second pressure-sensitive adhesive layer, and a hologram layer, a second transparent film being stacked on the hologram layer through a third pressure-sensitive adhesive layer, the adhesive strength between the substrate and the first transparent film being larger than the adhesive strength between the hologram layer and the second transparent film, the third pressure-sensitive adhesive layer having a first portion and a second portion, the first portion having an adhesive property such that the adhesive strength between the first portion and the second transparent film is larger than the adhesive strength between the first portion and the hologram layer and, hence, when the second transparent film is peeled off, the first portion is left on the second transparent film side, the second portion having an adhesive property such that the adhesive strength between the second portion and the second transparent film is smaller than the adhesive strength between the second portion and the hologram layer and, hence, when the second transparent film is peeled off, the second portion is left on the hologram layer.

11. The hologram laminate according to claim 10, wherein a layer for lowering the adhesive strength between the second transparent film and the third pressure-sensitive adhesive layer is partially provided between the second transparent film and the third pressure-sensitive adhesive layer.

12. The hologram laminate according to claim 10, wherein a layer for enhancing the adhesive strength between the second transparent film and the third pressure-sensitive adhesive layer is partially provided between the second transparent film and the third pressure-sensitive adhesive layer.

13. The hologram laminate according to claim 10, wherein the adhesive strength between the first transparent film and the substrate is larger than 1% tensile strength of the hologram layer.

14. A hologram label comprising a first pressure-sensitive adhesive layer, a first transparent film, a second pressure-sensitive adhesive layer, a hologram layer, a third pressure-sensitive adhesive layer, and a second transparent film stacked in that order on top of one another, the adhesive strength between the substrate and the first transparent film being larger than the adhesive strength between the hologram layer and the second transparent film, the third pressure-sensitive adhesive layer having a first portion and a second portion, the first portion having an adhesive property such that the adhesive strength between the first portion and the second transparent film is larger than the adhesive strength between the first portion and the hologram layer and, hence, when the second transparent film is peeled off, the first portion is left on the second transparent film side, the second portion having an adhesive property such that the adhesive strength between the second portion and the second transparent film is smaller than the adhesive strength between the second portion and the hologram layer and, hence, when the second transparent film is peeled off, the second portion is left on the hologram layer.

15. The hologram label according to claim 14, wherein a layer for lowering the adhesive strength between the third pressure-sensitive adhesive layer and the second transparent film is partially provided between the third pressure-sensitive adhesive layer and the second transparent film.

16. The hologram label according to claim 14, wherein a layer for enhancing the adhesive strength between the third pressure-sensitive adhesive layer and the second transparent film is partially provided between the third pressure-sensitive adhesive layer and the second transparent film.

17. The hologram label according to claim 14, wherein the adhesive strength between the first transparent film and the substrate is larger than 1% tensile strength of the hologram layer.

18. The hologram label according to claim 14, which further comprises a release sheet stacked on the underside of the first pressure-sensitive adhesive layer.

19. A hologram laminate comprising: a substrate; a hologram layer stacked on the substrate through a first pressure-sensitive adhesive layer; and a transparent film stacked on the hologram layer through a second pressure-sensitive adhesive layer, the adhesive strength between the substrate and the hologram layer being smaller than the adhesive strength between the hologram layer and the transparent film, the first pressure-sensitive adhesive layer having a first portion and a second portion, the first portion having an adhesive property such that the adhesive strength between the first portion and the hologram layer is larger than the adhesive strength between the first portion and the substrate and, hence, when the hologram layer is separated from the substrate, the first portion is left on the hologram layer side, the second portion having an adhesive property such that the adhesive strength between the second portion and the hologram layer is smaller than the adhesive strength between the second portion and the substrate and, hence, when the hologram layer is separated from the substrate, the second portion is left on the substrate.

20. A hologram laminate comprising: a substrate; a hologram layer stacked on the substrate through a first pressure-sensitive adhesive layer; and a transparent film stacked on the hologram layer through a second pressure-sensitive adhesive layer, the adhesive strength between the substrate and the hologram layer being larger or smaller than the adhesive strength between the hologram layer and the transparent film, both the first and second pressure-sensitive adhesive layers having a portion which, at the time of separation, is left on the overlying layer side and a portion which, at the time of separation, is left on the underlying layer side.

21. A hologram label comprising a first pressure-sensitive adhesive layer, a hologram layer, a second pressure-sensitive adhesive layer, and a transparent film stacked in that order on top of one another, the first pressure-sensitive adhesive layer having a first portion and a second portion, the first portion having an adhesive property such that the adhesive strength between the first portion and the hologram layer is larger and, hence, when the hologram layer is peeled off, the first portion is left on the hologram layer side, the second portion having an adhesive property such that the adhesive strength between the second portion and the hologram layer is smaller.

22. A hologram laminate comprising: a substrate; and, provided on the substrate in the following order, a first pressure-sensitive adhesive layer, a first transparent film, a second pressure-sensitive adhesive layer, and a hologram layer, a second transparent film being stacked on the hologram layer through a third pressure-sensitive adhesive layer, the adhesive strength between the substrate and the first transparent film being smaller than the adhesive strength between the hologram layer and the second transparent film, the first pressure-sensitive adhesive layer having a first portion and a second portion, the first portion having an adhesive property such that the adhesive strength between the first portion and the first transparent film is larger than the adhesive strength between the first portion and the substrate and, hence, when the first transparent film is peeled off, the first portion is left on the first transparent film side, the second portion having an adhesive property such that the adhesive strength between the second portion and the first transparent film is smaller than the adhesive strength between the second portion and the substrate and, hence, when the first transparent film is peeled off, the second portion is left on the substrate.

23. A hologram label comprising a first pressure-sensitive adhesive layer, a first transparent film, a second pressure-sensitive adhesive layer, a hologram layer, a third pressure-sensitive adhesive layer, and a second transparent film stacked in that order on top of one another, the adhesive strength between the substrate and the first transparent film being smaller than the adhesive strength between the hologram layer and the second transparent film, the first pressure-sensitive adhesive layer having a first portion and a second portion, the first portion having an adhesive property such that the adhesive strength between the first portion and the first transparent film is larger and, hence, when the first transparent film is peeled off, the first portion is left on the first transparent film side, the second portion having an adhesive property such that the adhesive strength between the second portion and the second transparent film is smaller.

24. A hologram laminate comprising: a substrate; and, provided on the substrate in the following order, a first pressure-sensitive adhesive layer, a first transparent film, a second pressure-sensitive adhesive layer, and a hologram layer, a second transparent film being stacked on the hologram layer through a third pressure-sensitive adhesive layer, the first to third pressure-sensitive adhesive layers having an adhesive property such that, for each of the first to third pressure-sensitive adhesive layers, the adhesive strength between the pressure-sensitive adhesive layer and a layer overlying the pressure-sensitive adhesive layer is different from the adhesive strength between the pressure-sensitive adhesive layer and a layer underlying the pressure-sensitive adhesive layer and each of the first to third pressure-sensitive adhesive layers has a portion which, at the time of separation in the pressure-sensitive adhesive layer, is left on the side of a layer overlying the pressure-sensitive adhesive layer and a portion which, at the time of separation in the pressure-sensitive adhesive layer, is left on a layer underlying the pressure-sensitive adhesive layer.

25. A hologram label comprising a first pressure-sensitive adhesive layer, a first transparent film, a second pressure-sensitive adhesive layer, a hologram layer, a third pressure-sensitive adhesive layer, and a second transparent film stacked in that order on top of one another, the first to third pressure-sensitive adhesive layers having different adhesive strengths and each having a portion which, at the time of separation in the pressure-sensitive adhesive layer, is left on the side of a layer overlying the pressure-sensitive adhesive layer and a portion which, at the time of separation in the pressure-sensitive adhesive layer, is not left on the side of the layer overlying the pressure-sensitive adhesive layer.

26. A hologram laminate comprising at least a volume hologram layer, an information-recorded transparent film, and an adherend substrate stacked in that order on top of one another from the outermost surface side.

27. The hologram laminate according to claim 26, wherein a transparent pressure-sensitive adhesive layer is stacked between the volume hologram layer and the information-recorded transparent film and/or between the information-recorded transparent film and the adherend substrate.

28. The hologram laminate according to claim 26, which further comprises a transparent protective film stacked on the surface of the volume hologram layer.

29. The hologram laminate according to claim 28, wherein the transparent protective film is stacked onto the volume hologram layer through a transparent pressure-sensitive adhesive layer.

30. A hologram laminate comprising a first transparent film, a first transparent pressure-sensitive adhesive layer, a volume hologram layer, a second transparent pressure-sensitive adhesive layer, an information-recorded second transparent film, a third transparent pressure-sensitive adhesive layer, and an adherend substrate stacked in that order on top of one another from the outermost surface side.

31. The hologram laminate according to claim 26, wherein the peel strength of the second transparent pressure-sensitive adhesive layer is larger than the peel strength of the third transparent pressure-sensitive adhesive layer.

32. A hologram composite comprising a volume hologram layer fixed in at least a part of a decorated substrate.

33. The hologram composite according to claim 32, wherein the substrate has been decorated by coloration or by imparting a pattern onto the substrate.

34. The hologram composite according to claim 32, wherein the decorated substrate partially has cut off portions and the volume hologram layer is fitted and fixed into the cut off portions.

35. The hologram composite according to claim 32, which further comprises a transparent protective layer stacked on the whole upper surface thereof and/or the whole lower surface thereof.

36. The hologram composite according to claim 32, wherein the decoration and/or recorded information are provided on the upside of the substrate in its portion fitted with the volume hologram layer.

37. The hologram composite according to claim 32, wherein the decoration and/or recorded information are provided on the upside of the substrate in its portion not fitted with the volume hologram layer.

38. A hologram laminate according to claim 32, wherein the volume hologram layer is stacked on at least a part of the decorated substrate.

39. The hologram laminate according to claim 38, wherein the substrate has been decorated by coloration or by imparting a pattern onto the substrate.

40. The hologram laminate according to claim 38, wherein the volume hologram layer has been stacked through a transparent pressure-sensitive adhesive layer.

41. The hologram laminate according to claim 38, which further comprises a transparent protective layer stacked on the surface of the volume hologram layer.

42. The hologram laminate according to claim 41, wherein the transparent protective layer has been stacked on the volume hologram layer through a transparent pressure-sensitive adhesive layer.

43. A hologram laminate comprising: a decorated substrate; and, stacked on at least a part of the decorated substrate in the following order, a first transparent pressure-sensitive adhesive layer, a volume hologram layer, a second transparent pressure-sensitive adhesive layer, and a transparent protective layer.

44. The hologram laminate according to claim 38, which has information recorded above the stacked volume hologram layer.

45. A volume hologram laminate comprising at least a first pressure-sensitive adhesive layer, a volume hologram layer, and a protective layer stacked in that order on top of another, a cut being provided in at least one of the layers constituting the volume hologram laminate.

46. The volume hologram laminate according to claim 45, wherein the cut is provided in the volume hologram layer.

47. The volume hologram laminate according to claim 45, wherein the cut is provided in the protective layer.

48. The volume hologram laminate according to claim 45, wherein the cut is provided in the volume hologram layer and the protective layer.

49. The volume hologram laminate according to claim 45, wherein the cut is provided in the first pressure-sensitive adhesive layer, the volume hologram layer, and the protective layer.

50. The volume hologram laminate according to claim 45, wherein the volume hologram layer and the protective layer have been stacked on top of each other through a second pressure-sensitive adhesive layer.

51. The volume hologram laminate according to claim 50, wherein the cut is provided in the first pressure-sensitive adhesive layer, the volume hologram layer, the second pressure-sensitive adhesive layer, and the protective layer.

52. A volume hologram laminate comprising at least a first pressure-sensitive adhesive layer, a colored layer, a second pressure-sensitive adhesive layer, a volume hologram layer, and a protective layer stacked in that order on top of each other, a cut being provided in at least one of the layers constituting the volume hologram laminate.

53. A label for the preparation of a volume hologram laminate, comprising at least a release film, a first pressure-sensitive adhesive layer, a volume hologram layer, and a protective layer stacked in that order on top of another, a cut being provided in at least one of the layers constituting the volume hologram laminate.

54. A label for the preparation of a volume hologram laminate, comprising at least a release film, a first pressure-sensitive adhesive layer, a volume hologram layer, a protective layer, and a removable pressure-sensitive adhesive sheet stacked in that order on top of one another, a cut being provided in at least one of the layers constituting the volume hologram laminate.

* * * * *